United States Patent [19]

Morizumi et al.

[11] Patent Number: 5,668,588
[45] Date of Patent: Sep. 16, 1997

[54] SPIRAL SCANNING IMAGE RECORDING APPARATUS AND IMAGE RECORDING METHOD

[75] Inventors: Yoshiaki Morizumi; Kiyoomi Mitsuki, both of Kyoto, Japan

[73] Assignee: Dainippon Screen Mfg. Co., Ltd., Kyoto, Japan

[21] Appl. No.: 220,010

[22] Filed: Mar. 30, 1994

[30] Foreign Application Priority Data

Apr. 1, 1993 [JP] Japan .................................. 5-100384
Mar. 11, 1994 [JP] Japan .................................. 6-041473

[51] Int. Cl.$^6$ .............................. B41J 2/47; G01D 15/14; G02B 26/00; G02B 27/00
[52] U.S. Cl. .......................... 342/242; 347/169; 347/240; 347/237; 358/489
[58] Field of Search .................................. 347/169, 240, 347/237, 247, 251, 242; 358/489, 493

[56] References Cited

U.S. PATENT DOCUMENTS 4,905,025  2/1990  Sakamoto et al. .

FOREIGN PATENT DOCUMENTS 58-111566  7/1983  Japan .
2 129 650  5/1984  United Kingdom .

Primary Examiner—Benjamin R. Fuller
Assistant Examiner—Raquel Yvette Gordon
Attorney, Agent, or Firm—Lowe, Price, LeBlanc & Becker

[57] ABSTRACT

A CPU calculates an optimum inclination angle, an optimum moving speed ($V_X$) and an optimum displacement time of delay timing on the basis of input signals commanding resolution, a rotation cycle (T) and the number of beams, supplied from an operating part, and outputs a control signal ($V_{CONT4}$) providing the inclination angle to a motor (9). As the result, an LED holder (30) rotates with respect to a central axis (37) at the inclination angle and stops. A zoom lens (24) is adjusted by a control signal ($V_{CONT3}$) providing a magnification which is responsive to the resolution. A motor (7) is driven by a control signal ($V_{CONT2}$), to drive an exposure head (20) at the moving speed ($V_X$). A cylinder (36) rotates by a control signal ($V_{CONT1}$) in a subscanning direction (Y) at the rotation cycle (T). As the result, an image forming region (34) is inclined with respect to the central axis (37) at the inclination angle.

30 Claims, 32 Drawing Sheets

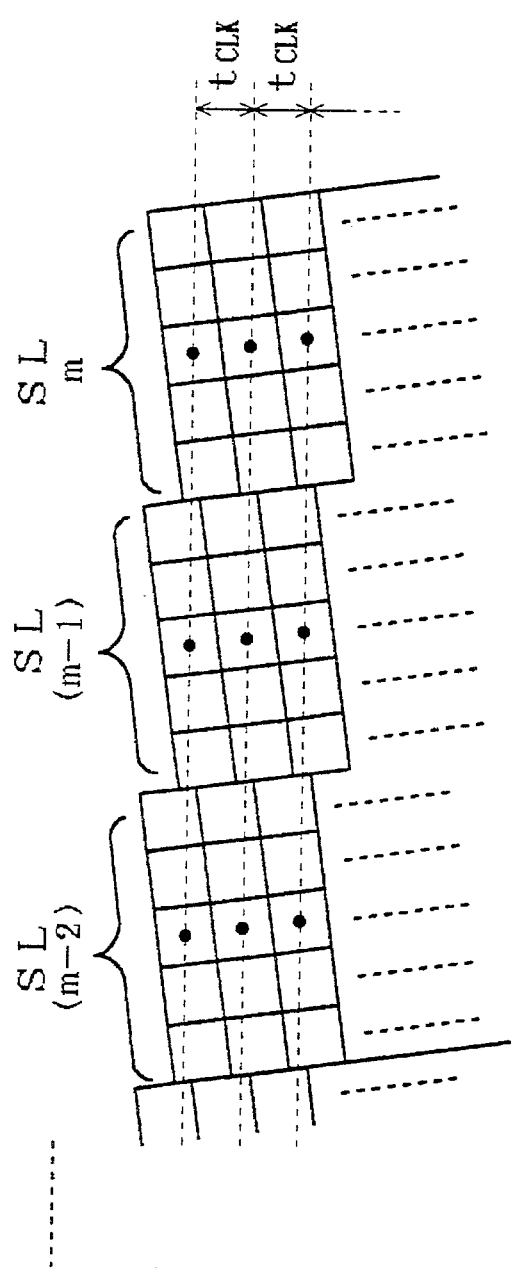
F I G. 7 (a)
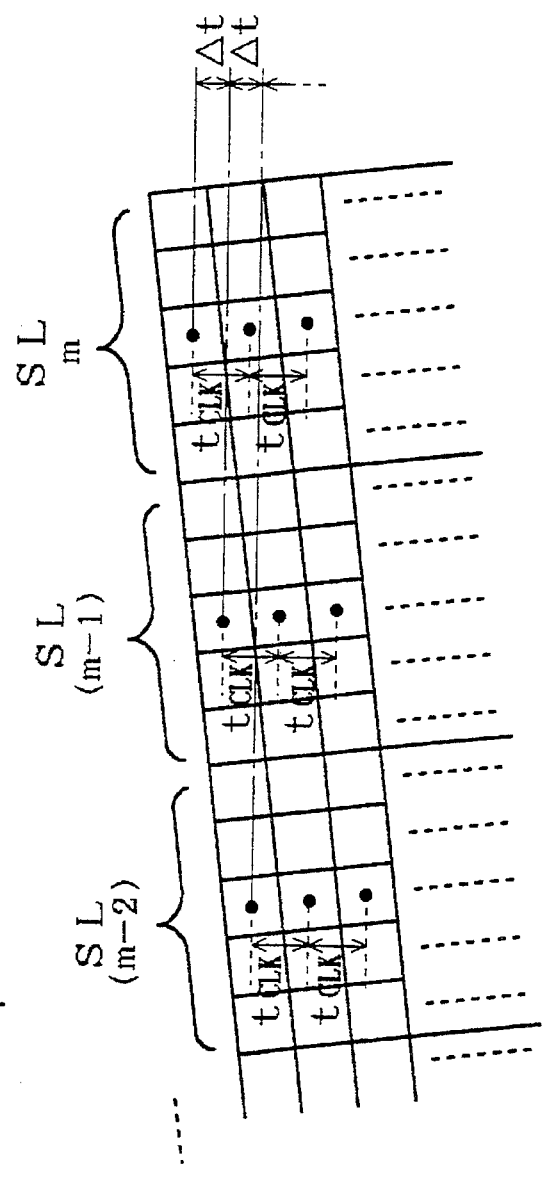
F I G. 7 (b)
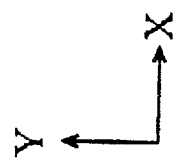

FIG. 10(a)  $V_{ZP}$
FIG. 10(b)  $V_{SCLK}$
FIG. 10(c)  $V_{TM}$
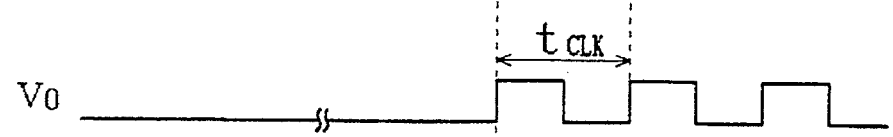
FIG. 10(d)  $V_O$    $t_{CLK}$
FIG. 10(e)  $V_{CLK}$ SL1
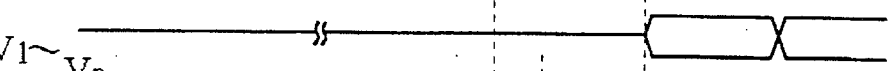
FIG. 10(f)  $V_1 \sim V_n$    $(m-1) \cdot \Delta t$
FIG. 10(g)  $\Delta t_{d1}$
$V_{CLK}$ SL2
FIG. 10(h)  $V_1 \sim V_n$    $(m-2) \cdot \Delta t$
$\Delta t_{d2}$
FIG. 10(i)  $V_{CLK}$ SL3
FIG. 10(j)  $V_1 \sim V_n$    $(m-3) \cdot \Delta t$
$\Delta t_{d3}$
FIG. 10(k)  $V_{CLK}$ SLm
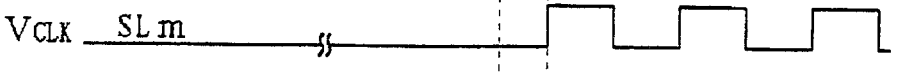
FIG. 10(l)  $V_1 \sim V_n$
$\Delta t_{dm}$ (n:ODD NUMBER OF AT LEAST 3)
(d0:CENTER TO CENTER PITCH OF LEDs)

( d : BEAM-TO-BEAM PITCH )

FIG. 25(a) $V_{ZP}$ 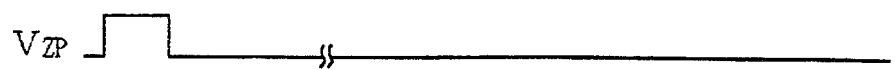
FIG. 25(b) $V_{SCLK}$ 
FIG. 25(c) $V_{TM}$ 
FIG. 25(d) $V_0$ 
FIG. 25(e) $V_{CLK}$ (BL1) 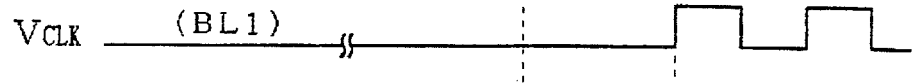
FIG. 25(f) $V_1 \sim V_n$ 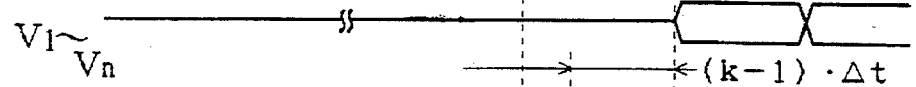
FIG. 25(g) $V_{CLK}$ (BL2) 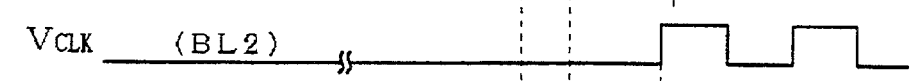
FIG. 25(h) $V_1 \sim V_n$ 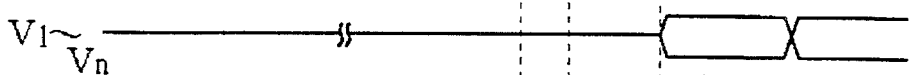
FIG. 25(i) $V_{CLK}$ (BL3) 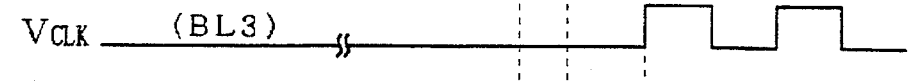
FIG. 25(j) $V_1 \sim V_n$ 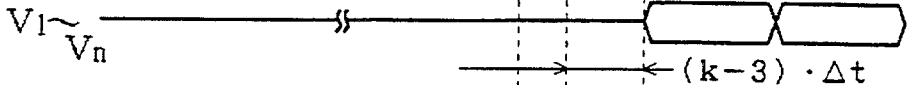
FIG. 25(k) $V_{CLK}$ (BLk) 
FIG. 25(l) $V_1 \sim V_n$ 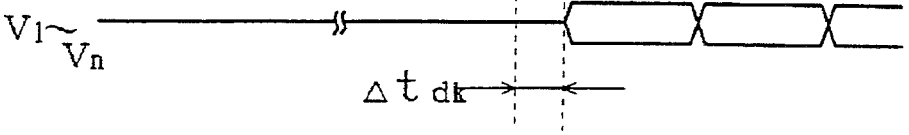

FIG. 28(a) INPUT IN LINE MEMORY 2A
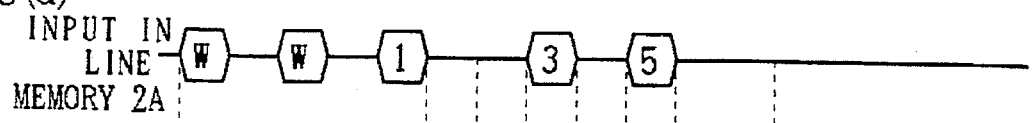
FIG. 28(b) INPUT IN LINE MEMORY 2B
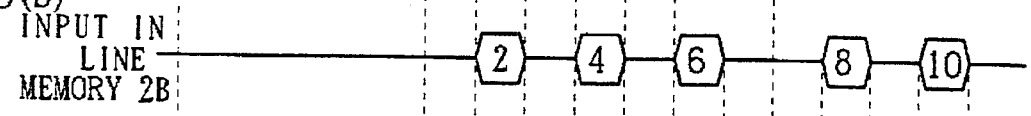
FIG. 28(c) OUTPUT TO LINE MEMORY 2C
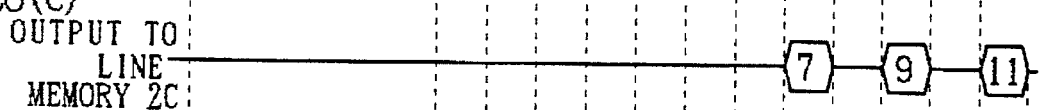
FIG. 28(d) $V_{S1}$
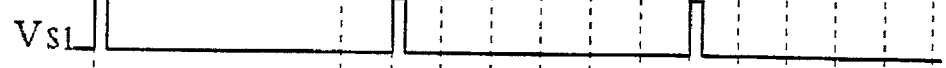
FIG. 28(e) $V_{S2}$
FIG. 28(f) OUTPUT TO TOGGLE LINE MEMORY 2
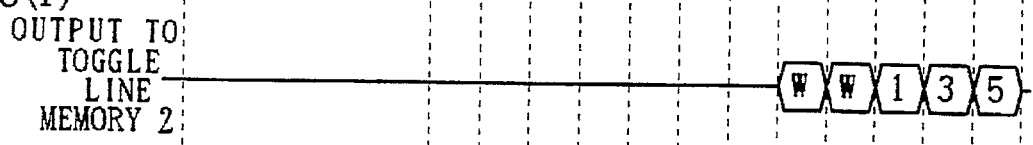
FIG. 28(g) $V_{ZP}$
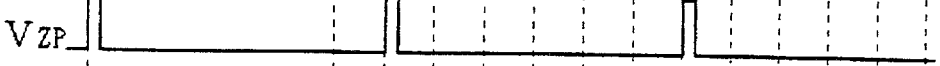
FIG. 28(h) $V_{TM}$
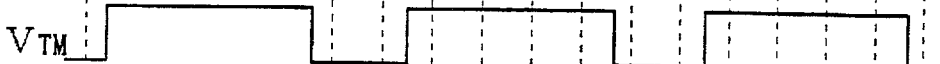
FIG. 28(i) $V_{IMA1}$
FIG. 28(j) $V_{CLK}$
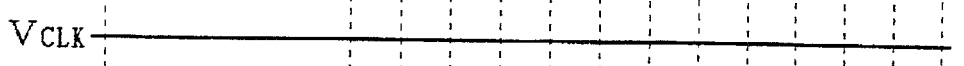
FIG. 28(k) TIME
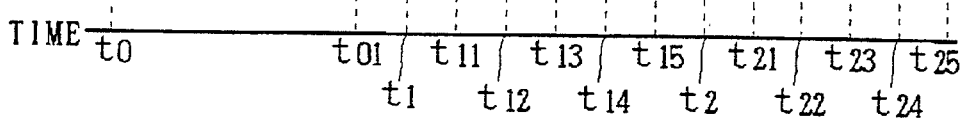

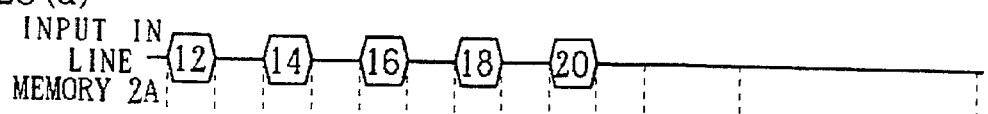
FIG. 29(a) INPUT IN LINE MEMORY 2A
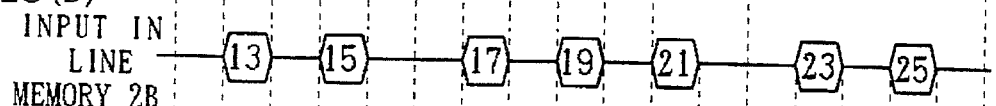
FIG. 29(b) INPUT IN LINE MEMORY 2B
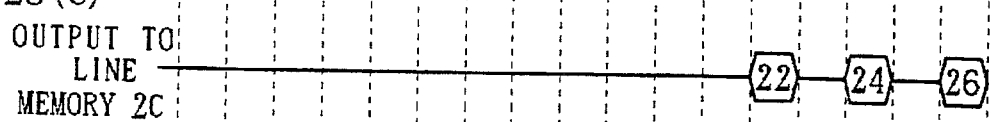
FIG. 29(c) OUTPUT TO LINE MEMORY 2C
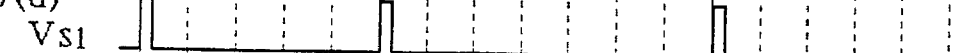
FIG. 29(d) $V_{S1}$
FIG. 29(e) $V_{S2}$
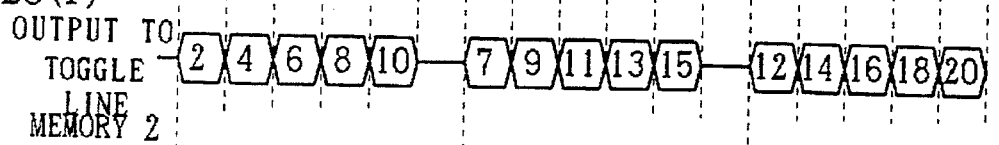
FIG. 29(f) OUTPUT TO TOGGLE LINE MEMORY 2
FIG. 29(g) $V_{ZP}$
FIG. 29(h) $V_{TM}$
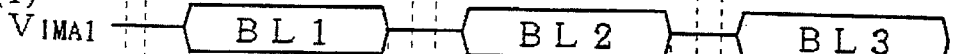
FIG. 29(i) $V_{IMA1}$
FIG. 29(j) $V_{CLK}$
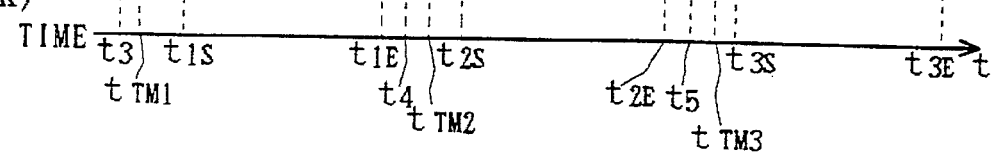
FIG. 29(k) TIME

SPIRAL SCANNING IMAGE RECORDING APPARATUS AND IMAGE RECORDING METHOD

BACKGROUND OF THE INVENTION

1. Field of the Invention

The present invention relates to an image recording apparatus corresponding to high-speed scanning with a multibeam, and more particularly, it relates to an image recording apparatus employing a spiral multibeam scanning system.

2. Background of the Invention

In general, multibeam exposure is widely carried out in correspondence to increase of an image recording speed. FIG. 33(a) shows a scanning method which is generally employed in such multibeam exposure. Referring to FIG. 33(a), an exposure head 40 comprising a plurality of (n) light emitting elements moves in a subscanning direction X along a central axis 37 of a cylinder 36. On the other hand, the cylinder 36 rotates in a main scanning direction −Y in a prescribed rotation cycle. Consequently, a plurality of light beams which are emitted form the exposure head 40 are imaged on a film 35 through a lens 41, whereby exposure pixels 42 are scanned and formed n the main scanning direction Y following the rotation of the cylinder 36. When scanning with the light beams following single rotation of the cylinder 36 in the main scanning direction −Y is completed, the exposure head 40 moves in the subscanning direction X, to again carry out scanning with the light beams in the main scanning direction Y. This scanning is repeated m times, so that the film 35 is scanned with n by m light beams, as shown in FIG. 34(a). Referring to FIG. 34(a), it is assumed that the exposure head 40 shown in FIG. 33(a) has n light emitting elements. It is also assumed that the number of scanning line areas SL (corresponding to areas exposed by the exposure head 40 in single main scanning) is m. Referring to FIG. 34(a), therefore, first, second, third, ..., (m−1)-th and m-th scanning line areas SL from the left side are denoted by SL1, SL2, SL3, ..., SL(m−1) and SLm respectively. The scanning line areas are hereinafter denoted in this manner.

In the method shown in FIG. 34(a), however, the cylinder 36 (see FIG. 33(a)) rotates by a turn while the exposure head 40 moves in the subscanning direction X, and no scanning is carried out in the main scanning direction Y during this rotation. Thus, the cylinder 36 rotates in vain. Consequently, implementation of a higher speed is hindered by such excessive rotation of the cylinder 36.

In order to solve this problem, there has been proposed a method of spirally scanning the film with light beams by continuously feeding the exposure head. As shown in FIG. 34(b), an image forming region 34a on the film is in the form of a parallelogram in this case and scanning line areas SL are inclined at an angle θ with respect to the main scanning direction Y, and hence an image as formed is distorted. This inclination angle θ is increased as the number n of beams is increased. In order to prevent such image distortion, therefore, it is necessary to bring the respective scanning line areas SL into rectangular shapes as shown in FIG. 35(a). Thus, it is necessary to incline arrangement of exposure pixels which are imaged on the film at the aforementioned angle θ with respect to the central axis 37 (see FIG. 33(a)) of the cylinder 36 in continuous feeding of the exposure head in the subscanning direction X.

Such a technique is disclosed in Japanese Patent Laying-Open Gazette No. 58-111566 (1983). In this technique, the exposure head 43 having n light emitting elements itself is inclined at the angle θ with respect to the central axis 37 (see FIG. 33(b)). Referring to FIG. 33(b), numeral 45 denotes exposure pixels which are imaged on the film 35, and numeral 44 denotes a lens. In this case, scanning line areas SL which are formed on the film 35 are displaced from those adjacent thereto, as shown in FIG. 35(a). As disclosed in the aforementioned gazette, it is possible to correct such displacement by delaying exposure timing in the main scanning direction Y every scanning line area SL. As the result of such correction, it is possible to form an image having neither image distortion nor displacement, as shown in FIG. 35(b).

While the aforementioned prior art discloses a principle which is related to spiral multibeam scanning, the same cannot properly cope with change in resolution of exposure pixels. While a proper magnification is set every image recording, the resolution of exposure pixels which are formed on the film is also inevitably changed upon change of the magnification. Consequently, the width ΔX0 (see FIG. 35(a) or 35(b)) of each scanning line area is also changed and the inclination angle θ is influenced by this. Following such change of the inclination angle θ, it is necessary to also take influence on both the moving speed of the exposure head in the subscanning direction and exposure timing in the main scanning direction into consideration. The aforementioned prior art has no disclosure about these points.

The aforementioned prior art is on the premise that the cylinder uniformly rotates in the main scanning direction and the exposure head is uniformly translated in the subscanning direction in a state inclined at a prescribed angle with respect to the subscanning direction. In practice, however, driving signals for controlling the rotation of the cylinder and the movement of the exposure head are not regularly maintained at ideal constant levels but slightly fluctuate within certain ranges about set values. Further, these driving signals are also influenced by change in the ambient temperature to fluctuate. Therefore, the rotational speed (hence, the rotation cycle) of the cylinder and the moving speed of the exposure head in the subscanning direction fluctuate during scanning with the light beams. The aforementioned prior art scans the film with a plurality of light beams along the main scanning direction while simultaneously scanning the same with these light beams also along the subscanning direction. Due to the aforementioned change of the speed, therefore, pitches between adjacent scanning lines in boundary portions between adjacent pairs of scanning line areas differ from those of the scanning lines belonging to the scanning line areas. Such difference leads to stripe-shaped image irregularity in the boundary portions. Even if the aforementioned change of the speed itself is small, such image irregularity substantially regularly takes place every boundary, and hence the image irregularity is rendered extremely conspicuous to deteriorate the quality of the recorded image.

To this end, awaited is spiral multibeam scanning previously taking fluctuation of the rotation speed of the cylinder and that of the moving speed of the exposure head into consideration, while it is necessary to make the respective parts in the apparatus correctly controllable in response to the value of resolution of exposure pixels (the number of exposure pixels or scanning lines per unit length in the direction of arrangement of the exposure pixels). The aforementioned prior art has no disclosure and no teaching in this point either.

SUMMARY OF THE INVENTION

In consideration of the aforementioned points, an object of the present invention is to implement a multibeam spiral scanning type image recording apparatus which can properly change an inclination angle in response to change of resolution, and which can properly control a moving speed in a subscanning direction and setting of delay timing every scanning line area in a main scanning direction.

Another object of the present invention is to provide an apparatus which can record an image with no irregularity regardless of slight fluctuation in a rotation cycle of a cylinder or a moving speed of an exposure head along a subscanning direction while properly enabling control of respective parts with respect to setting of resolution.

Still another object of the present invention is to implement an apparatus and a method which can correctly incline the direction of arrangement of a plurality of light beams at an inclination angle θ with respect to subscanning direction.

According to the present invention, a spiral scanning image recording apparatus comprises (a) a rotator continuously rotating in a main scanning direction, (b) a photosensitive material which is mounted on a major surface of the rotator, (c) means for storing an image signal, (d) means which is movable in a subscanning direction which is perpendicular to the main scanning direction for emitting a plurality of light beams which are modulated in response to the image signal outputted from the (c) means, (e) means for inputting an input signal commanding resolution corresponding to a number of exposure pixels, to be imaged on the photosensitive material, to be finally included per unit length in a direction of arrangement thereof, (f) means for deciding a magnification, an inclination angle which is an intersection angle between a direction of arrangement of imaging of the plurality of light beams on the photosensitive material and the subscanning direction, and a moving speed of the (d) means in the subscanning direction with respect to a rotation speed of the rotator, which corresponds to the resolution, on the basis of the input signal, and for generating first, second and third control signals commanding the magnification, the inclination angle and the moving speed as decided respectively, (g) means which is movable in the subscanning direction for imaging the plurality of light beams on the photosensitive material in response to the magnification commanded by the first control signal, (h) means which is movable in the subscanning direction for inclining the direction of arrangement of the plurality of light beams which are emitted from the (d) means with respect to the subscanning direction in response to the second control signal so that the direction of imaging arrangement of the plurality of light beams is inclined by the inclination angle with respect to the subscanning direction, and (i) means for continuously moving the (d) means with the (g) means and (h) means in the subscanning direction at the moving speed in response to the third control signal.

The present invention is also directed to an image recording method. According to the present invention, an image recording method of recording an image by spirally scanning a photosensitive material, which is mounted on a first major surface of a rotator continuously rotating in a main scanning direction, with a plurality of light beams which is modulated by an image signal comprises (a) a step of arranging a light emitting unit emitting the plurality of light beams, an arrangement direction control unit which is capable of inclining an arrangement direction of the plurality of light beams which are emitted form the light emitting unit, corresponding to an arrangement direction of an image which is formed by applying the plurality of light beams onto a virtual screen, with respect to a subscanning direction which is perpendicular to the main scanning direction, and an imaging unit, which is variable in magnification, for imaging the plurality of light beams which are inclined in arrangement by the arrangement direction control unit on the photosensitive material, on a second major surface of an exposure head having the second major surface and movable in the subscanning direction, (b) a step of preparing a memory unit storing the image signal, (c) a step of inputting an input signal commanding resolution corresponding to a number of exposure pixels, to be imaged on the photosensitive material, to be included per unit length in an arrangement direction thereof, (d) a step of setting a magnification value corresponding to the resolution in the imaging unit on the basis of the input signal, (e) a step of electrically deciding an inclination angle, corresponding to an intersection angle between the arrangement direction of the plurality of light beams and the subscanning direction, and a moving speed of the exposure head, which correspond to the resolution, on the basis of the input signal for generating first and second control signals providing the inclination angle and the moving speed respectively, (f) a step of controlling the arrangement direction control unit for inclining the arrangement direction of the plurality of light beams with respect to the subscanning direction by the inclination angle on the basis of the first control signal, (g) a step of moving the exposure head in the subscanning direction at the moving speed on the basis of the second control signal, and (h) a step of reading the image signal from the memory unit and applying the image signal to the light emitting unit every rotation of the rotator, thereby scanning the photosensitive material with the modulated plurality of light beams.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7(a) illustrates displacement between adjacent scanning lines areas;

FIG. 7(b) illustrates adjacent scanning line areas having no displacement;

FIG. 10(a) is a timing chart showing the relative relation between a zero pulse signal and other signals with respect to each scanning line area;

FIG. 10(b) is a timing chart showing the relative relation between a printing reference clock signal and other signals with respect to each scanning line area;

FIG. 10(c) is a timing chart showing the relative relation between a trimming mask signal and other signals with respect to each scanning line area;

FIG. 10(d) is a timing chart showing the relative relation between a reference signal and other signals with respect to each scanning line area;

FIG. 10(e) is a timing chart showing the relative relation between a printing clock signal and other signals in a first scanning line area;

FIG. 10(f) is a timing chart showing the relative relation between each image signal and other signals in the first scanning line area;

FIG. 10(g) is a timing chart showing the relative relation between the printing clock signal and other signals in a second scanning line area;

FIG. 10(h) is a timing chart showing the relative relation between each image signal and other signals in the second scanning line area;

FIG. 10(i) is a timing chart showing the relative relation between the printing clock signal and other signals in a third scanning line area;

FIG. 10(j) is a timing chart showing the relative relation between each image signal and other signals in the third scanning line area;

FIG. 10(k) is a timing chart showing the relative relation between the printing clock signal and other signals in an m-th scanning line area;

FIG. 10(l) is a timing chart showing the relative relation between each image signal and other signals in an m-th scanning line area;

FIG. 25(a) is a timing chart showing the relative relation between a zero pulse signal and other signals with respect to each block line;

FIG. 25(b) is a timing chart showing the relative relation between a printing reference clock signal and other signals with respect to each block line;

FIG. 25(c) is a timing chart showing the relative relation between a trimming mask signal and other signals with respect to each block line;

FIG. 25(d) is a timing chart showing the relative relation between a reference signal and other signals with respect to each block line;

FIG. 25(e) is a timing chart showing the relative relation between a printing clock signal and other signals in a first block line;

FIG. 25(f) is a timing chart showing the relative relation between each image clock signal and other signals in the first block line;

FIG. 25(g) is a timing chart showing the relative relation between a printing clock signal and other signals in a second block line;

FIG. 25(h) is a timing chart showing the relative relation between each image clock signal and other signals in the second block line;

FIG. 25(i) is a timing chart showing the relative relation between a printing clock signal and other signals in a third block line;

FIG. 25(j) is a timing chart showing the relative relation between each image clock signal and other signals in the third block line;

FIG. 25(k) is a timing chart showing the relative relation between a printing clock signal and other signals in an m-th block line;

FIG. 25(l) is a timing chart showing the relative relation between each image clock signal and other signals in the m-th block line;

FIG. 28(a) or 29(a) is a timing chart showing an image signal inputted in a line memory 2A;

FIG. 28(b) or 29(b) is a timing chart showing an image signal inputted in a line memory 2B;

FIG. 28(c) or 29(c) is a timing chart showing an image signal inputted in a line memory 2C;

FIG. 28(d) or 29(d) is a timing chart showing a selector signal;

FIG. 28(e) or 29(e) is a timing chart showing a selector signal;

FIG. 28(f) or 29(f) is a timing chart showing an image signal outputted from a toggle line memory;

FIG. 28(g) or 29(g) is a timing chart showing a zero pulse signal;

FIG. 28(h) or 29(h) is a timing chart showing a trimming mask signal;

FIG. 28(i) or 29(i) is a timing chart showing an image signal for a first light emitting diode;

FIG. 28(j) or 29(j) is a timing chart showing a printing clock signal;

FIG. 28(k) or 29(k) shows the time base;

DESCRIPTION OF THE PREFERRED EMBODIMENTS

I. First Embodiment (1) Structure of Image Recording Apparatus 100

A. Structures of Cylinder 36 and Exposure Head 20

Figure 1:
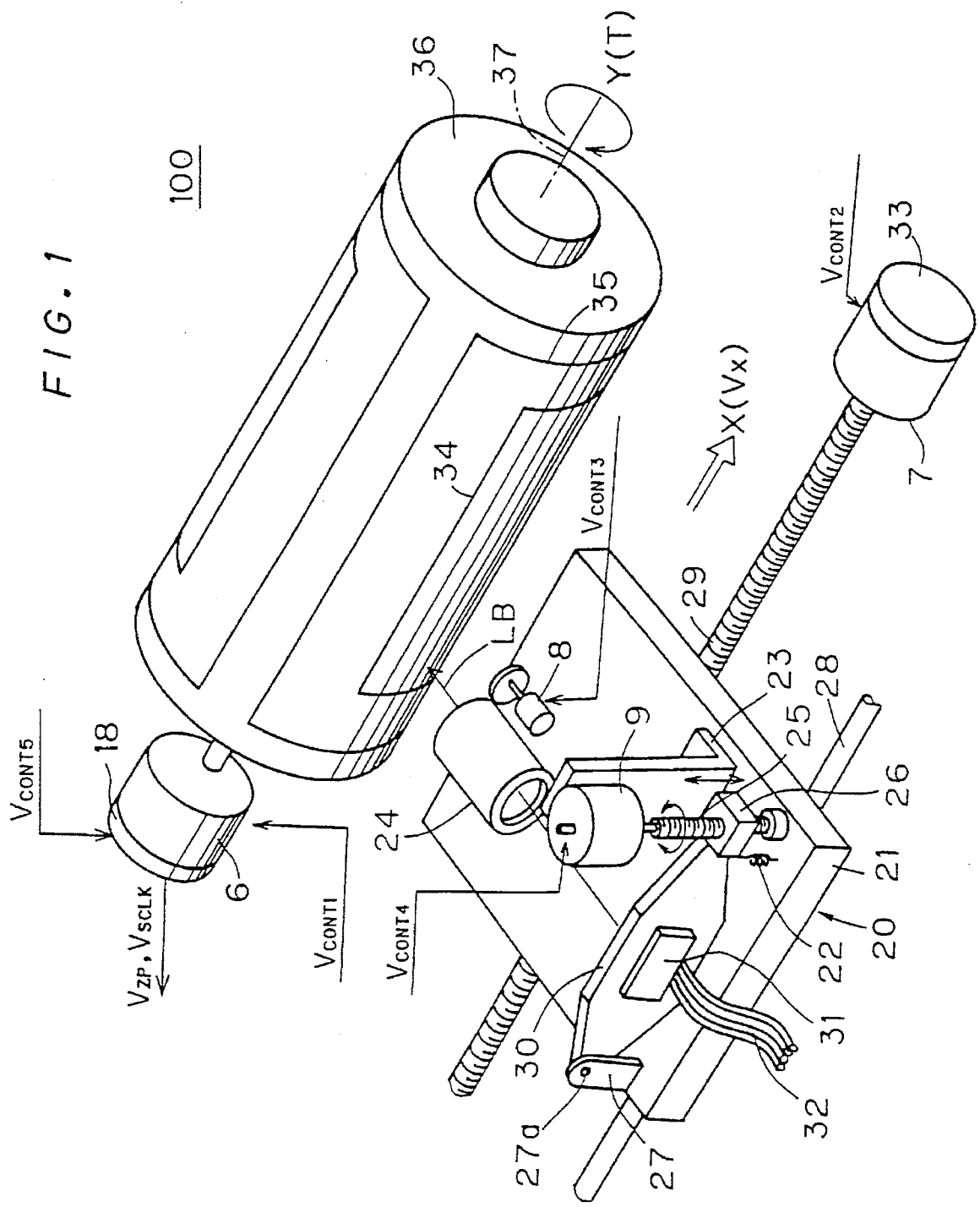
FIG. 1 illustrates the relation between an exposure head and a cylinder in an image recording apparatus according to a first embodiment of the present invention.

FIG. 1 is a perspective view showing mechanical structures of an exposure head 20 and a cylinder 36 (rotator) in an image recording apparatus 100 according to a first embodiment of the present invention. The cylinder 36 rotates about its central axis 37 in a constant rotation cycle T. The direction of this rotation is called a main scanning direction Y.

On the other hand, the exposure head 20 shown in FIG. 1 moves in a direction X (subscanning direction) which is parallel to the central axis 37 of the cylinder 36 at a constant moving speed $V_X$. Consequently, light beams LB which are emitted from the exposure head 20 spirally scan the cylinder 36. The structures of the exposure head 20 and the cylinder 36 are now described in detail.

(A-1) Structure of Cylinder 36

A film 35 serving as a photosensitive material is bonded onto the surface of the cylinder 36. Further, a cylinder rotating motor (hereinafter simply referred to as a motor) 6 is provided on an end of the cylinder 36, so that the cylinder 36 rotates in the main scanning direction Y by driving force of the motor 6. A rotary encoder 18 which is mounted on the motor 6 detects the rotational position of the cylinder 36, and outputs a zero pulse signal $V_{ZP}$ and a printing reference clock signal $V_{SCLK}$ to a control part 10 which is described later with reference to FIG. 4. The zero pulse signal $V_{ZP}$ is a pulse signal synchronizing with rotation of the cylinder 36, which generates one pulse every rotation of the cylinder 36. The printing reference clock signal $V_{SCLK}$ is a clock signal of a pixel unit cycle (time required for the cylinder 36 to rotate by an amount of rotation corresponding to a size of one exposure pixel along the main scanning direction Y), which is generated by a multiplication circuit part (consisting of a PLL circuit and the like) provided in the rotary encoder 18. A multiplication number of the multiplication circuit (18A in FIG. 5) is set by a control signal $V_{CONT5}$ described later. According to this embodiment, a region 34 defines an image forming region. This region 34 is slightly inclined with respect to the central axis 37.

(A-2) Structure of Exposure Head 20

The exposure head 20, which is mounted on a ball screw 29 provided with a subscanning feed motor (hereinafter simply referred to as a motor) 7 on one end thereof and a rail 28, receives torque of the motor 7 to move in the subscanning direction X along the rail 28. At this time, a moving speed $V_X$ is controlled to an optimum constant value which is provided by a mathematical expression 5 described later. More strictly, the moving speed $V_X$ slightly fluctuates in a small range about the constant value, as already described above.

The exposure head 20 has the following internal structure: First, an L-shaped bracket 23 is fixed onto a movable carriage 21 of the exposure head 20, and an LED rotating motor (servo motor; hereinafter simply referred to as a motor) 9 is mounted on an upper end of the bracket 23. This motor 9 is driven by a control signal $V_{CONT4}$ described later. Further, a screw 25 is mounted on an end of a rotating axis of the motor 9. This screw 25 is mounted on the movable carriage 21.

Figure 2:
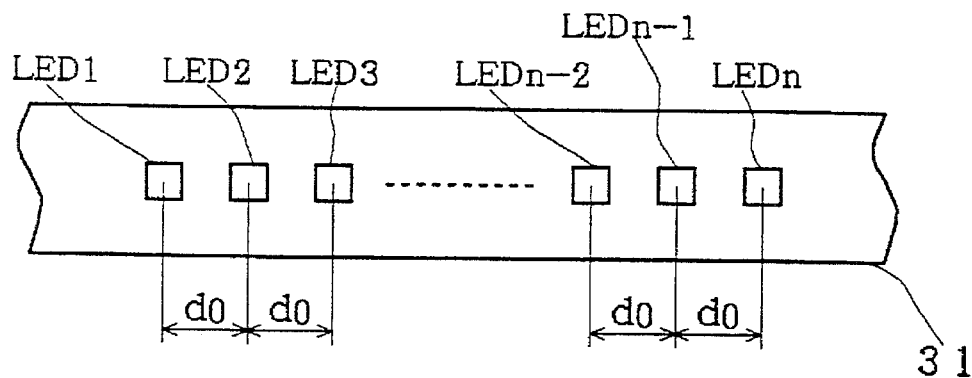
FIG. 2 illustrates exemplary arrangement of n light emitting diodes.

On the other hand, an end of an LED holder (light emitting unit part) 30 is pivotally supported by a support part 27 which is fixed onto the movable carriage 21. n light emitting diodes LED1 to LEDn for serving as light emitting elements are mounted on a central portion 31 of the LED holder 30 to be aligned with each other at a center distance $d_0$. FIG. 2 schematically shows the state of this arrangement.

As shown in FIG. 1, the other end of the LED holder 30 is mounted on a nut 26 which is threadingly engaged with the screw 25. Further, an end of a spring 22, whose other end is mounted on the movable carriage 21, is fixed to a lower surface of the nut 26. When the nut 26 vertically moves along the screw 25 by torque of the motor 9, therefore, the LED holder 30 rotates about an axis 27a (parallel to an optical axis of a zoom lens 24 described later) of the support part 27 in response to the vertical movement. As the result, the direction of arrangement of the n light emitting diodes is inclined by the angle of rotation of the LED holder 30 with respect to the subscanning direction X or the central axis 37. This angle of rotation is hereinafter called an inclination angle θ.

In addition, the zoom lens 24 for serving as an imaging unit is provided on the movable carriage 21. Further, the central portion 31 of the aforementioned LED holder 30 is arranged on an optical axis of the zoom lens 24. The magnification of the zoom lens 24 is adjusted by a magnification change motor (hereinafter simply referred to as a motor) 8 which is also fixed onto the movable carriage 21. n light beams which are incident upon the zoom lens 24 are imaged in sizes responsive to the magnification which is set in the zoom lens 24. While the light beams LB are at the beam-to-beam pitch $d_0$ in a stage before incidence upon the zoom lens 24, the zoom lens 24 reduces the beam-to-beam pitch (center-to-center pitch) between the light beams LB so that a center-to-center distance between n images which are formed on the film 35 coincides with an inverse number of resolution described later in response to the magnification previously adjusted by the motor 8.

Figure 3:
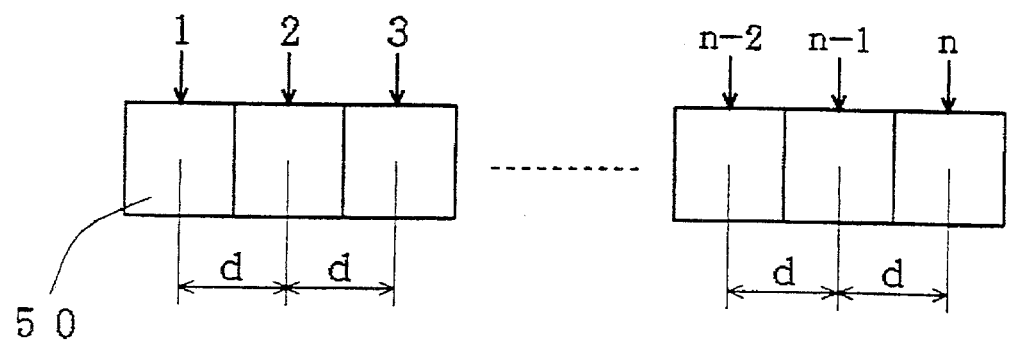
FIG. 3 illustrates resolution.

FIG. 3 shows an exemplary state of arrangement of exposure pixels by the n light beams LB which are imaged on the film 35. Referring to FIG. 3, d ($d < d_0$) denotes a center-to-center distance between the exposure pixels 50 on the film 35 (FIG. 1). This center-to-center distance d corresponds to the width of each exposure pixel 50. The center-to-center distance d is hereinafter referred as a beam-to-beam pitch d.

B. Electrical Structure (B-1) Overall Structure

Figure 4:
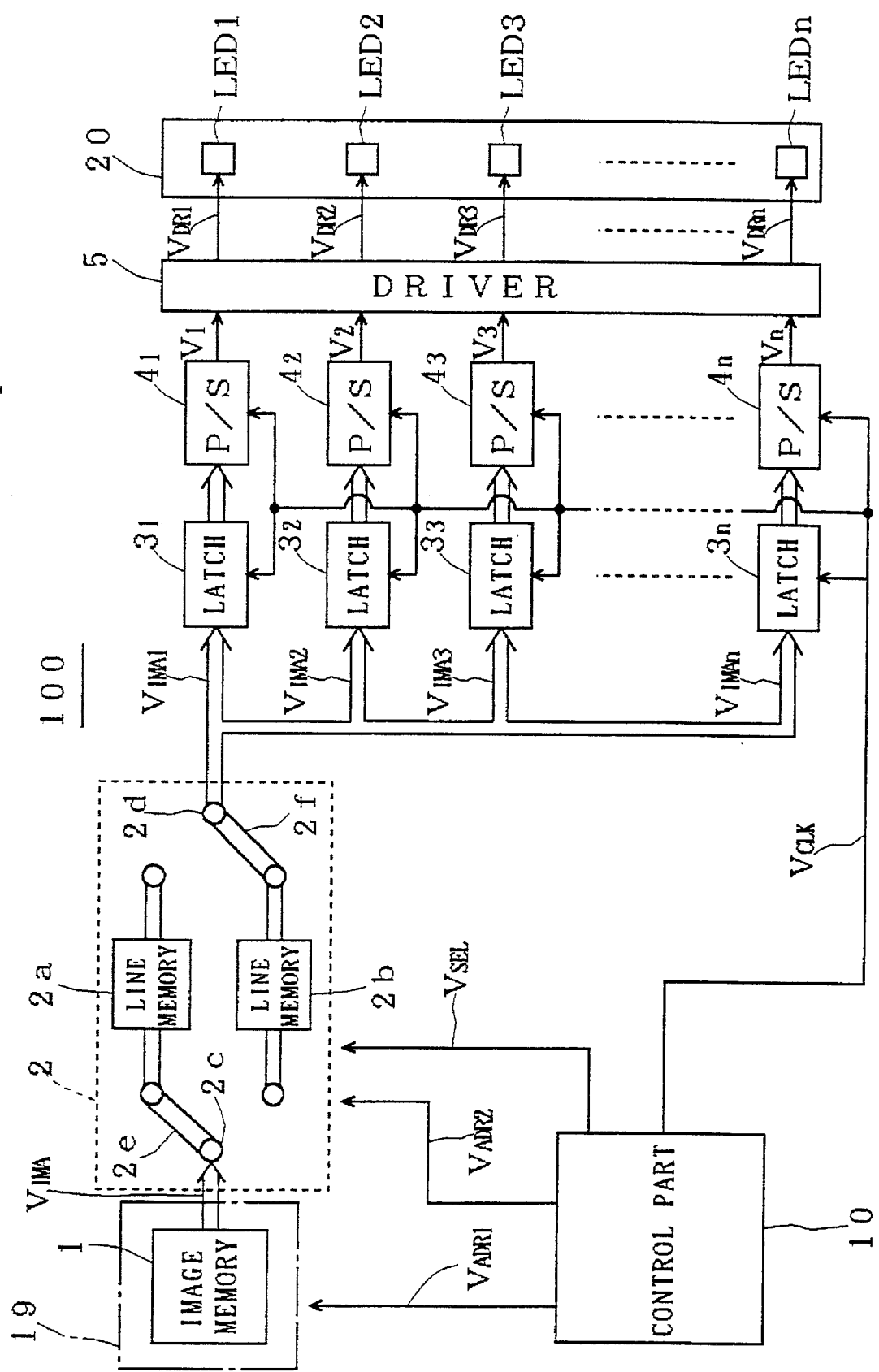
FIG. 4 is a block diagram showing an electrical structure of the image recording apparatus.

FIG. 4 is a block diagram schematically showing the electrical structure of the image recording apparatus 100. First, an image memory 1 provided in a work station 19 previously stores an image signal $V_{DMA}$ to be recorded. An output terminal of this image memory 1 is connected to an input terminal 2c of a toggle line memory 2. The toggle line memory 2 has two line memories 2a and 2b, and an output terminal 2d of this toggle line memory 2 is connected to respective input terminals of n latches $3_1$ to $3_n$. Two switches 2e and 2f of the toggle line memory 2 are switched in response to a switching signal $V_{SEL}$ outputted by the control part 10 respectively. The two line memories 2a and 2b are so employed that an image signal corresponding to a next scanning line area is written in a second one of the line memories while an image signal stored in a first one of the line memories is read out.

Respective image signals $V_{IMA1}$ to $V_{IMAn}$ stored in the n latches $3_1$ to $3_n$ correspond to image signals for the n light emitting diodes LED1 to LEDn respectively. Output terminals of the latches $3_1$ to $3_n$ are connected to input terminals of n parallel-to-serial converters (hereinafter simply referred to as P-S converters) $4_1$ to $4_n$ respectively. Further, the latches $3_1$ to $3_n$ and the P-S converters $4_1$ to $4_n$ are connected to the control part 10. In addition, output terminals of the n P-S converters $4_1$ to $4_n$ are connected to a driver 5, so that serially converted image signals $V_1$ to $V_n$ which are inputted in the driver 5 are converted to optimum driving signals $V_{DR1}$ to $V_{DRn}$ respectively and applied to the respective light emitting diodes LED1 to LEDn.

The control part 10 outputs an address signal $V_{ADR1}$ to the image memory 1, an address signal $V_{ADR2}$ and the switching signal $V_{SEL}$ to the toggle line memory 2, and a printing clock signal $V_{CLK}$ to the latches $3_1$ to $3_n$ and the P-S converters $4_1$ to $4_n$ respectively. The structure of the control part 10 is now described in detail.

(B-2) Structure of Control Part 10

Figure 5:
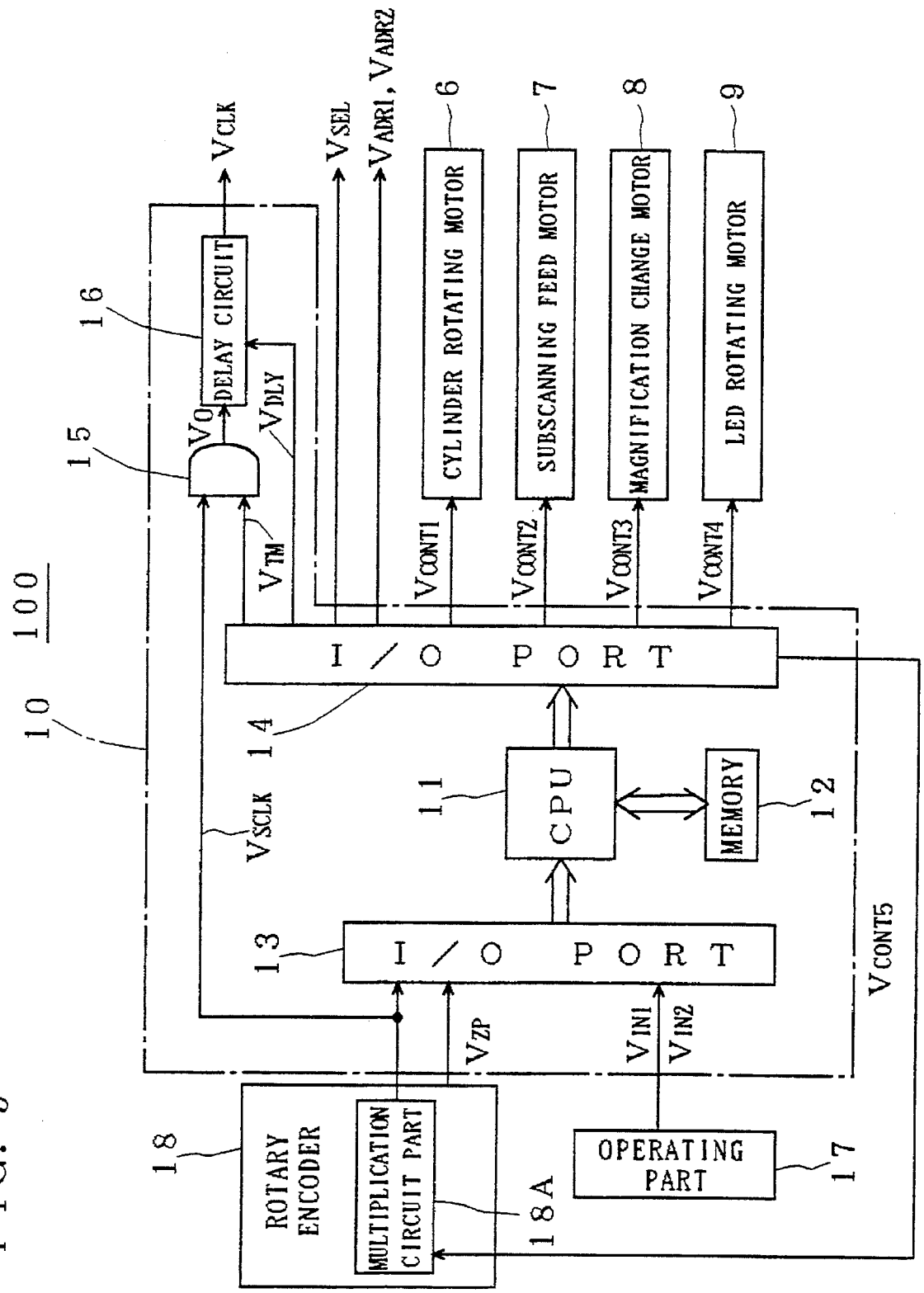
FIG. 5 is a block diagram showing an electrical structure of a control part.

FIG. 5 is a block diagram showing the structure of the control part 10 and its peripheral portion. The control part 10 is formed around a CPU 11. Further, the rotary encoder 18 and an operating part 17 are connected to the control part 10. The rotary encoder 18 outputs the zero pulse signal $V_{ZP}$ and the printing reference clock signal $V_{SCLK}$ to the CPU 11 through an I/O port 13. The operating part 17 also outputs input signals $V_{IN1}$ and $V_{IN2}$ to the CPU 11 through the I/O port 13. This operating part 17 comprises input means such as a keyboard. The input signals $V_{IN1}$ and $V_{IN2}$ received from the operating part 17 is stored in a memory 12.

On the other hand, the motors 6 to 9 and the multiplication circuit part 18A provided in the rotary encoder 18 are connected to an output side of the control part 10. The CPU 11 outputs control signals $V_{CONT1}$ to $V_{CONT4}$ to the respective motors 6 to 9 and the control signal $V_{CONT5}$ to the multiplication circuit part 18A through an I/O port 14. Further, the CPU 11 counts the printing reference clock signals $V_{SCLK}$, forms a trimming mask signal $V_{TM}$ and outputs the same to one input terminal of an AND gate circuit 15. The trimming mask signal $V_{TM}$ is a signal providing start and end positions of a trimming range. Another input terminal of the AND gate circuit 15 is connected to the rotary encoder 18 to receive the printing reference clock signal $V_{SCLK}$ while a reference signal $V_0$ is outputted to an input terminal of a delay circuit 16 from its output terminal. An output terminal of the delay circuit 16 is connected to the aforementioned n latches $3_1$ to $3_n$ and n P-S converters $4_1$ to $4_n$. The delay circuit 16 receives a delay signal $V_{DLY}$ (signal commanding a delay time) outputted by the CPU 11 to output the printing clock signal $V_{CLK}$ obtained by delaying the reference signal $V_0$.

(2) Inclination Angle θ and Method of Correcting Displacement of Scanning Line Area Study is now made on the relation between the resolution M and the inclination angle θ and that between the resolution M and an amount of displacement correction of scanning lines. It is assumed that M (/mm) represents the resolution, n represents the number of the light emitting diodes, R (mm) represents the radius of the cylinder 36, m represents the number of the scanning line areas, d (mm/) represents the beam-to-beam pitch, L (mm) represents the width of each scanning line area, and T (sec.) represents the rotation cycle of the cylinder 36.

Figure 6:
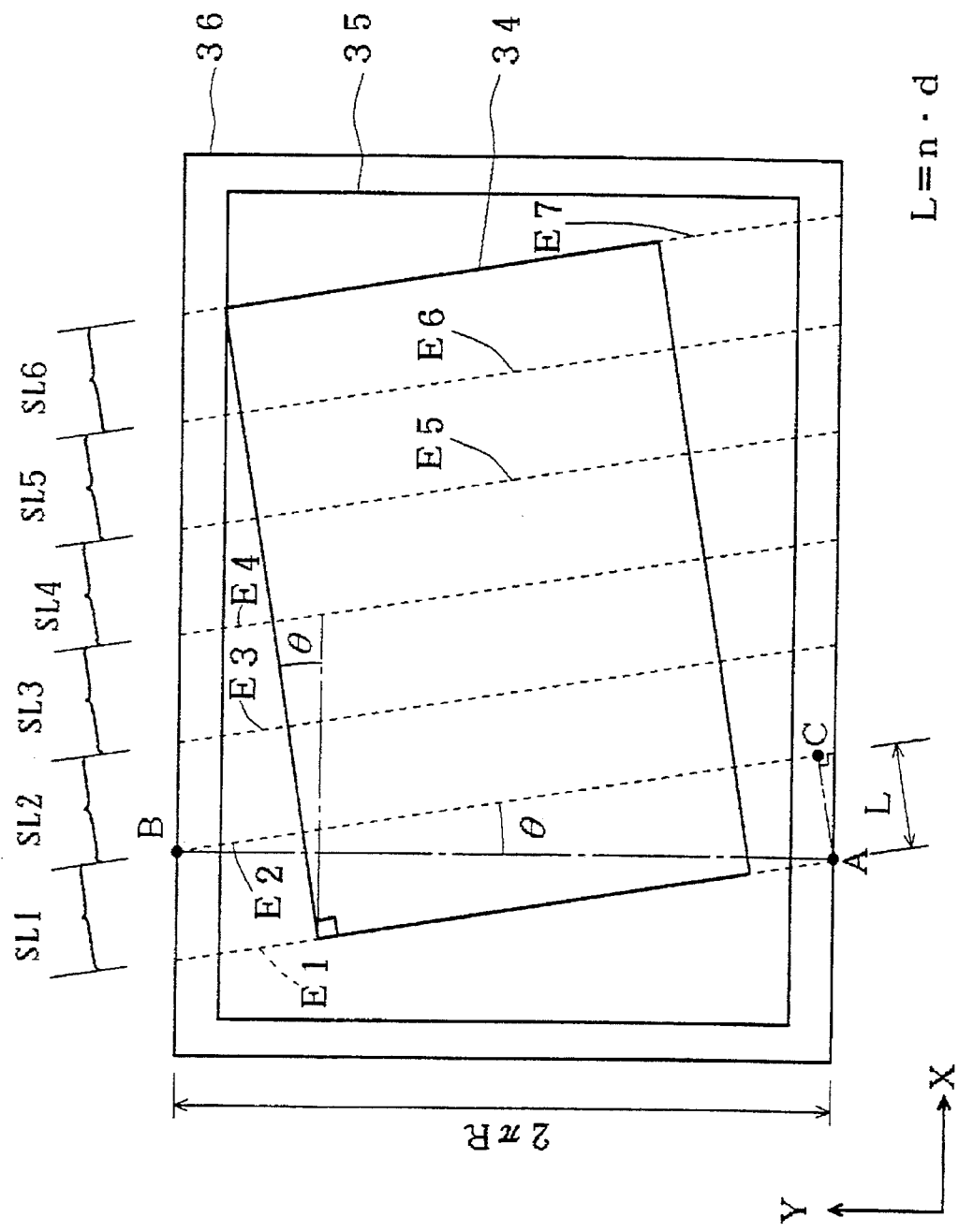
FIG. 6 illustrates derivation of an inclination angle.

① As to Inclination Angle θ:

FIG. 6 shows an image forming region 34 formed on the film 35 which is fixed to the cylinder 36 when the number m of the scanning line areas is "6". This figure illustrates the cylinder 36 in a developed manner. Broken lines Ej (j=1, 2, ..., m+1) appearing in this figure show a locus of exposure by the light emitting diode LED1. Since the image recording apparatus 100 is a spiral scanning type recording apparatus, an end point A of the broken line E1 must coincide with a start point B of the broken line E2. Further, a line AB is parallel to the main scanning direction Y, and has a length of 2πR. Assuming that a point C denotes an intersection between a perpendicular from the point A and the broken line E2, a line AC has a length of L (=n·d=n/M). Noting a triangle ABC, it is understood that the inclination angle θ is expressed as follows:

$$\theta = \sin^{-1}[n \cdot d/(2\pi R)] = \sin^{-1}[n/(2\pi R \cdot M)] \quad (1)$$

Thus, the inclination angle θ depends on the width L of each scanning line area, i.e., the resolution M (or the beam-to-beam pitch d) and the number n of the light emitting diodes. In general, the number n of the light emitting diodes remains unchanged, and hence the inclination angle θ depends only on the resolution M (or the beam-to-beam pitch d) in this case.

② As to Amount of Displacement Correction of Scanning Line Areas

Figure 8:
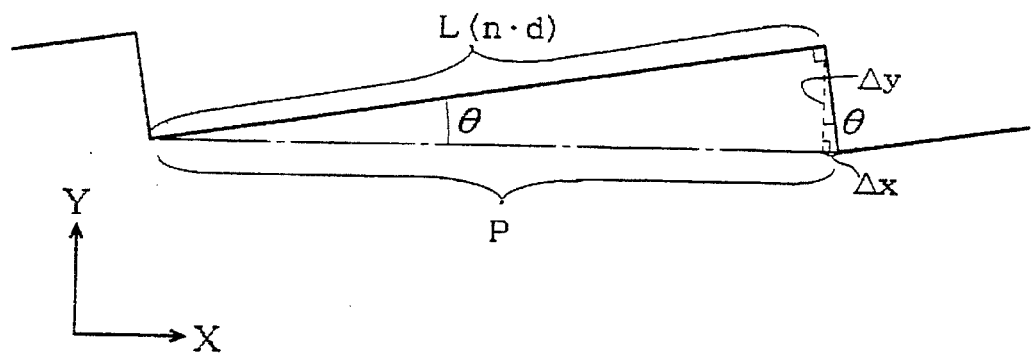
FIG. 8 is an enlarged view showing a portion connecting adjacent scanning lines.

An amount of displacement correction is now derived on the basis of FIGS. 7(a), 7(b) and 8. FIGS. 7(a) and 7(b) show the respective scanning lines on the assumption that the direction of arrangement of the exposure pixels is at the inclination angle θ and the number n of the light beams LB is 5, for simplifying the description. FIG. 7(a) shows such a state that no displacement correction is carried out, and FIG. 7(b) shows such a state that displacement between the scanning line areas is corrected by displacement correction. FIG. 8 shows a connected portion between an adjacent pair of scanning lines shown in FIG. 7(a) in an enlarged manner.

As understood from FIGS. 7(a) and 7(b), a time interval (cycle of the printing reference clock $V_{SCLK}$) $t_{CLK}$ for outputting the respective light beams is expressed as follows:

$$t_{CLK} = d \cdot T \cdot \cos\theta/(2\pi R) = T \cdot \cos\theta/(2\pi R \cdot M) \quad (2)$$

Further, an amount Δy of displacement between adjacent scanning line areas along the main scanning direction Y is expressed as follows:

$$\Delta y = n \cdot d \cdot \sin\theta = n \cdot \sin\theta/M \quad (3)$$

Hence, a time Δt (also called displacement time of delay timing) required for rotating the cylinder 36 by the aforementioned amount Δy of displacement is related to the resolution M by the following expression 4:

$$\begin{aligned} \Delta t &= T - \Delta y/(2\pi R) \\ &= n \cdot d \cdot T \cdot \sin\theta/(2\pi R) \\ &= n \cdot T \cdot \sin\theta/(2\pi R \cdot M) \end{aligned} \quad (4)$$

Thus, the exposure starting time for each scanning line area in the main scanning direction Y may be delayed by the aforementioned time Δt. On the other hand, the moving speed $V_X$ of the exposure head 20 in the subscanning direction X is related to the resolution M by the following expression 5:

$$\begin{aligned} V_X &= P/T = L/(T \cdot \cos\theta) = n \cdot d/(T \cdot \cos\theta) \\ &= n/(M \cdot T \cdot \cos\theta) \end{aligned} \quad (5)$$

Figure 9:
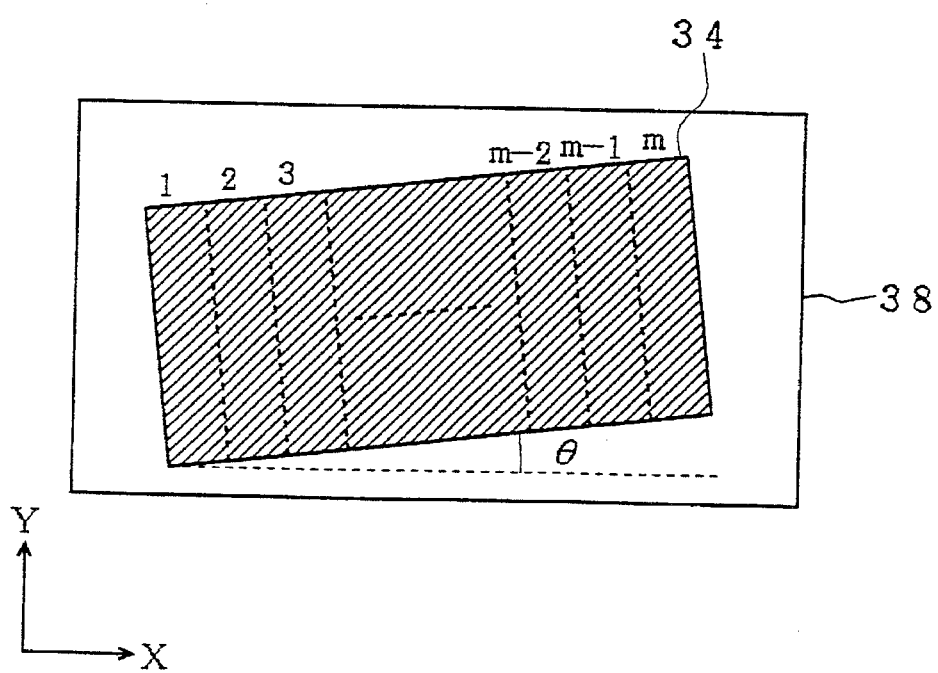
FIG. 9 illustrates a printed image forming region.

In other words, the inclination angle θ, the displacement time Δt of delay timing in the main scanning direction Y and the moving speed $V_X$ of the exposure head 20 must be properly adjusted every time the magnification of the zoom lens 24 is changed. Due to such adjustment, it is possible to record images (those inclined by the inclination angle θ with respect to the central axis 37 of the cylinder 36) causing no displacement between adjacent scanning line areas on the prescribed image forming region 34 (see FIG. 9).

③ Method of Correcting Δy

A method of correcting the amount Δy of displacement is now described with reference to FIGS. 10(a) to 10(l). FIGS. 10(a) to 10(l) are timing charts illustrating the relative relation of the printing reference clock signal $C_{CLK}$ every scanning line area.

In order to correct the amount Δy of displacement, outputs of the image signals $V_1$ to $V_n$ required for printing the exposure pixels may be successively quickened every scanning line area by the time Δt, as described above. With reference to the first scanning line area SL1, output timing of the image signal in the second scanning line area SL2 may be quickened by the time Δt as compared with that in the scanning line area SL1 and that in the third scanning line area SL3 may be quickened by a time (2Δt), while that of each of the scanning line areas following the fourth one may be quickened by the time Δt as compared with that of a preceding one. Consequently, it is necessary to quicken output timing for the final scanning line area m by a time Δt (m−1) as compared with the first scanning line area SL1.

FIGS. 10(a) to 10(l) show such relation. FIGS. 10(a), 10(b), 10(c) and 10(d) show the zero pulse signal $V_{ZP}$, the printing reference clock signal $V_{SCLK}$, the trimming mask signal $V_{TM}$ and the reference signal $V_O$ respectively. The trimming mask signal $V_{TM}$ goes high in a constant interval, regardless of the scanning line areas. FIGS. 10(e), 10(g), 10(i) and 10(k) show the printing clock signals $V_{CLK}$ in the scanning line areas SL1, SL2, SL3 and SLm respectively. Further, FIGS. 10(f), 10(h), 10(j) and 10(l) show data of image signals with respect to the scanning line areas SL1, SL2, SL3 and SLm respectively.

Each delay time for the printing clock signal $V_{CLK}$ can be set through the AND gate circuit 15 receiving the trimming mask signal $V_{TM}$ and the printing reference clock signal $V_{SCLK}$, and the delay signal $V_{DLY}$ commanding the delay time, as shown in FIG. 3. The delay signal $V_{DLY}$ provides a delay time $\Delta t_{di}$ ($\Delta t_{d1}, \ldots, \Delta t_{dm-2}, \Delta t_{dm-1}, \Delta t_{dm}$) based on the expression 4 every scanning line area (SL1, ..., SL(m−2), SL(m−1), SLm).

According to this embodiment, the image recording apparatus 100 is properly structured to perform proper operations on the basis of the results of the aforementioned study ①, ② and ③.

(3) Operation of Image Recording Apparatus 100

Figure 11:
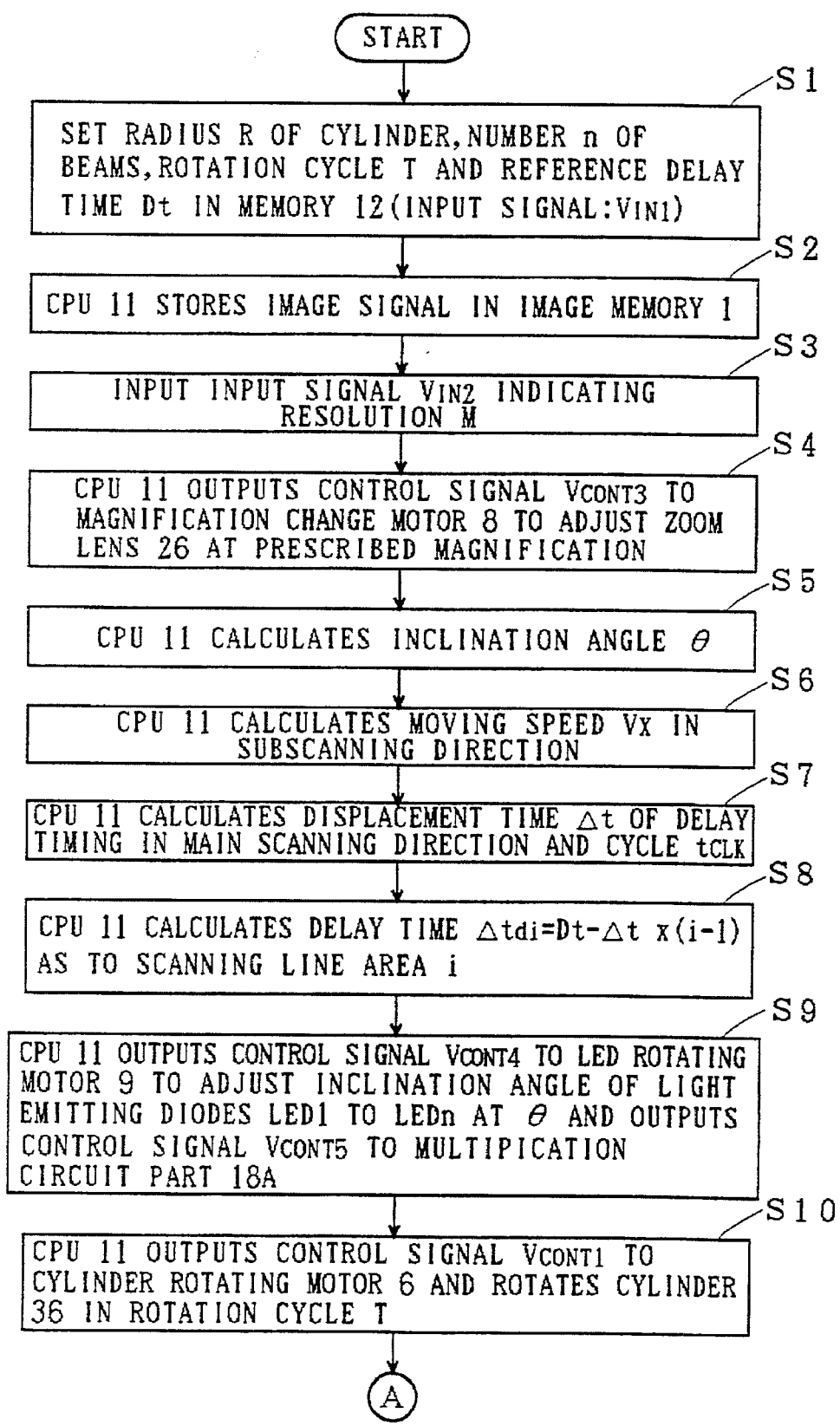
FIG. 11 is a flow chart showing the operation of the image recording apparatus.
Figure 12:
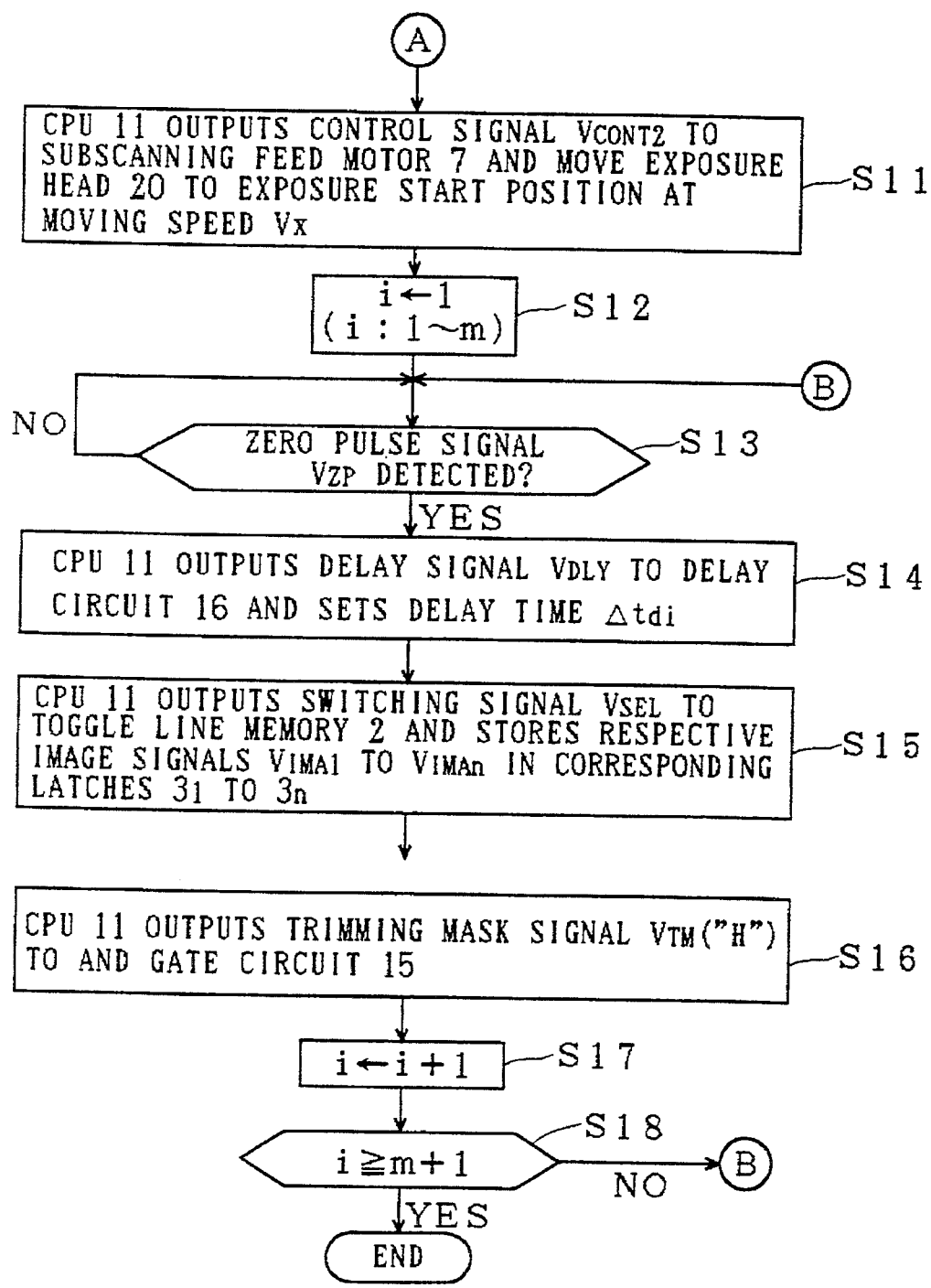
FIG. 12 is a flow chart showing the operation of the image recording apparatus.

The operation procedure of the image recording apparatus 100 is now described on the basis of flow charts shown in FIGS. 11 and 12 and timing charts shown in FIGS. 13(a) to 13(f).

A. Preparation Step

Steps S1 to S10 are steps showing preparation stages for image recording scanning.

At the step S1, various data required for image recording are inputted in the CPU 11 as the input signal $V_{IN1}$. Namely, the radius R of the cylinder 36, the number n (corresponding to the number of the light emitting diodes) of the beams, the rotation cycle T of the cylinder 36 and a reference delay time $D_1$ are inputted from the operating part 17 as the input signal $V_{IN1}$, and stored in the memory 12 through the CPU 11. The reference delay time $D_1$, which indicates a scanning start position of the scanning line area SL1, is so set that the delay time $\Delta t_{dm}$ for the scanning line area SLm is at zero or a positive value. These data are required in arithmetic processing described later.

At the step S2, the image signal $V_{IMA}$ to be recorded is stored in the image memory 1. This storage operation is processed in the work station 60.

At the step S3, the input signal $V_{IN2}$ indicating the resolution M is inputted by the operating part 17, and stored in the memory 12. This resolution M, which corresponds to the inverse number (M=1/d) of the beam-to-beam pitch d as described above, decides the magnification of the zoom lens 24.

At the step S4, an operator drives an operation start switch (not shown) provided in the operating part 17, whereby the CPU 11 decides the control signal $V_{CONT3}$ providing a magnification corresponding to the aforementioned resolution M, i.e., a magnification value which can implement the relation d=1/M, and outputs the control signal $V_{CONT3}$ to the motor 8. The motor 8 is driven in response to the control signal $V_{CONT3}$, for adjusting the zoom lens 24 to a prescribed magnification.

At the step S5, the CPU 11 calculates the inclination angle θ on the basis of the expression 1. Further, the CPU 11 calculates the moving speed $V_X$ in the subscanning direction X from the expression 5 (step S6), and calculates the displacement time Δt of delay timing in the main scanning direction Y on the basis of the expression 4 while calculating the cycle $t_{CLK}$ from the expression 2 (step S7).

At the step S8, the CPU 11 calculates a delay time $\Delta t_{di}$ for an i-th scanning line area on the basis of the reference delay time $D_1$, the displacement time Δt of the delay timing and the number m of the scanning line areas which are stored in the memory 12. This delay time $\Delta t_{di}$ is calculated as follows:

$$\Delta t_{di} = D_1 - \Delta t \times (i-1) \tag{6}$$

At the step S9, the CPU 11 generates the control signal $V_{CONT4}$ providing the calculated inclination angle θ, and outputs the control signal $V_{CONT4}$ to the motor 9. Thus, the LED holder 30 is inclined at the inclination angle θ with respect to the central axis 37. Further, the CPU 11 decides a multiplication number which can implement the calculated cycle $t_{CLK}$, and outputs the control signal $V_{CONT5}$ commanding this multiplication number to the multiplication circuit part 18A provided in the rotary encoder 18. Thus, the multiplication circuit part 18A is prepared for forming the printing reference clock signal $V_{SCLK}$ from the zero pulse signal $V_{ZP}$.

At the step S10, the CPU 11 generates the control signal $V_{CONT1}$ providing the inputted rotation cycle T, and outputs the control signal $V_{CONT1}$ to the motor 6. Thus, the cylinder 36 rotates in the main scanning direction Y in the rotation cycle T.

Further, the CPU 11 generates the control signal $V_{CONT2}$ providing the calculated moving speed $V_X$, and outputs the control signal $V_{CONT2}$ to the motor 7. Thus, the exposure head 20 moves in the subscanning direction X at the moving speed $V_X$ (step S11). Thereafter the rotation speed of the cylinder 36 is stabilized and the position of the exposure head 20 in the subscanning direction X reaches an exposure start position. This reaching is detected by the rotary encoder 33. The preparation stage is completed through the aforementioned steps.

B. Scanning Procedure

In order to generalize the following description, it is assumed here that an i-th (i=1, 2, ..., m) scanning line area is to be scanned (step S12). Therefore, the first scanning line area SL1 is set as the scanning line area SLi.

Steps S13 to S17 show the scanning procedure in relation to the scanning line area SLi. First, The CPU 11 detects the zero pulse signal $V_{ZP}$ which is outputted from the rotary encoder 18, so that the process advances to the step S14 (step S13).

At the step S14, the CPU 11 generates the delay signal $V_{DLY}$ providing the delay time $\Delta t_{di}$, and outputs the signal $V_{DLY}$ to the delay circuit 16, to set the delay time $\Delta t_{di}$.

At the step S15, the CPU 11 outputs the switching signal $V_{SEL}$ to the toggle line memory 2. At this time, th line memory 2a already stores the image signal $V_{IMA}$ in relation to the scanning line area SLi. Therefore, the toggle line memory 2 receiving the switching signal $V_{SEL}$ operates as follows: In response to the switching signal $V_{SEL}$ which rises from a low level to high level, the input terminal switch 2e is connected to an input terminal of the line memory 2b, while the output terminal switch 2f is switched toward the line memory 2a. The image signal $_{IMA}$ (image signal in relation to the scanning line area i) which is stored in the line memory 2a is read out while an image signal in relation to the next scanning line area SL(i+1) is read out from the image memory 1 and written in the line memory 2b. This image signal is read from the line memory 2a and written in the line memory 2b by the address signal $V_{ADR2}$ which is also outputted from the CPU 11 in synchronization with the switching signal $V_{SEL}$. The image signal $V_{IMA}$ is read from the image memory 1 by addressing of the address signal $V_{ADR1}$ outputted from the CPU 11. The image signal $V_{IMA}$ includes the image signals $V_{IMA1}$ to $V_{IMAn}$ corresponding to the light emitting diodes LED1 to LEDn respectively. These image signals $V_{IMA1}$ to $V_{IMAn}$ are stored in the latches $3_1$ to $3_n$ respectively.

Thereafter the CPU 11 detects that the cylinder 36 reaches a start position of a trimming region from the result of counting of the printing reference clock signal $V_{SCLK}$ at the step S16, and outputs the result of the detection as the trimming mask signal $V_{TM}$. In synchronization with rise of the trimming mask signal $V_{TM}$ from a low level to a high level, the printing reference clock signal $V_{SCLK}$ also rises from a low level to a high level and repeats such rise at the time interval $t_{CLK}$ provided by the expression 2, whereby the reference signal $V_0$ from the AND gate circuit 15, i.e., an undelayed printing clock signal, is at a low level in a period between rise of the zero pulse signal $V_{ZP}$ and that of the trimming mask signal $V_{TM}$ and thereafter obtains the cycle $t_{CLK}$ in synchronization with the printing reference clock signal $V_{SCLK}$.

The CPU 11 also detects an end position of a trimming range, and outputs the result as the trimming mask signal $V_{TM}$ (corresponding to fall from a high level to a low level).

The delay circuit 16 receives the reference signal $V_0$ and the delay signal $V_{DLY}$, produces a signal which is delayed by the delay time $\Delta t_{di}$ with respect to the reference signal $V_0$, and outputs this signal as the printing clock signal $V_{CLK}$.

The printing clock signal $V_{CLK}$ is inputted in the latches $3_1$ to $3_n$ and the P-S converters $4_1$ to $4_n$ respectively. The latches $3_1$ to $3_n$ hold the corresponding image signals $V_{IMA1}$ to $V_{IMn}$ in units of eight bits (for eight pixels). Further, each of the latches $3_1$ to $3_n$ has a frequency dividing circuit (not shown) for frequency-dividing the received printing clock signal $V_{CLK}$ by eight. Consequently, the latches $3_1$ to $3_n$ output 8-bit image signals in response to the timing of the signals obtained by frequency-dividing the printing clock signal $V_{CLK}$.

On the other hand, the P-S converters $4_1$ to $4_n$ convert the image signals for eight pixels to 1-bit (for one pixel) image signals $V_1$ to $V_n$ (serial signals) respectively. The serial-converted image signals $V_1$ to $V_n$ (1-bit signals) are applied to the light emitting diodes LED1 to LEDn respectively through the driver 5. As the result, the light emitting diodes LED1 to LEDn emits light beams in response to the levels of the driving signals $V_{DR1}$ to $V_{DRO}$.

When scanning in the scanning line area SLi is completed through the aforementioned steps, "1" is added to the variable i at the step S17 and the process returns to the step S13, to carry out scanning in the next scanning line area. The scanning procedure in the next scanning line area is also carried out through the steps S13 to S17. The operation of the image recording apparatus 100 is terminated upon completion of scanning in the final scanning line area m (step S18).

Figure 13:
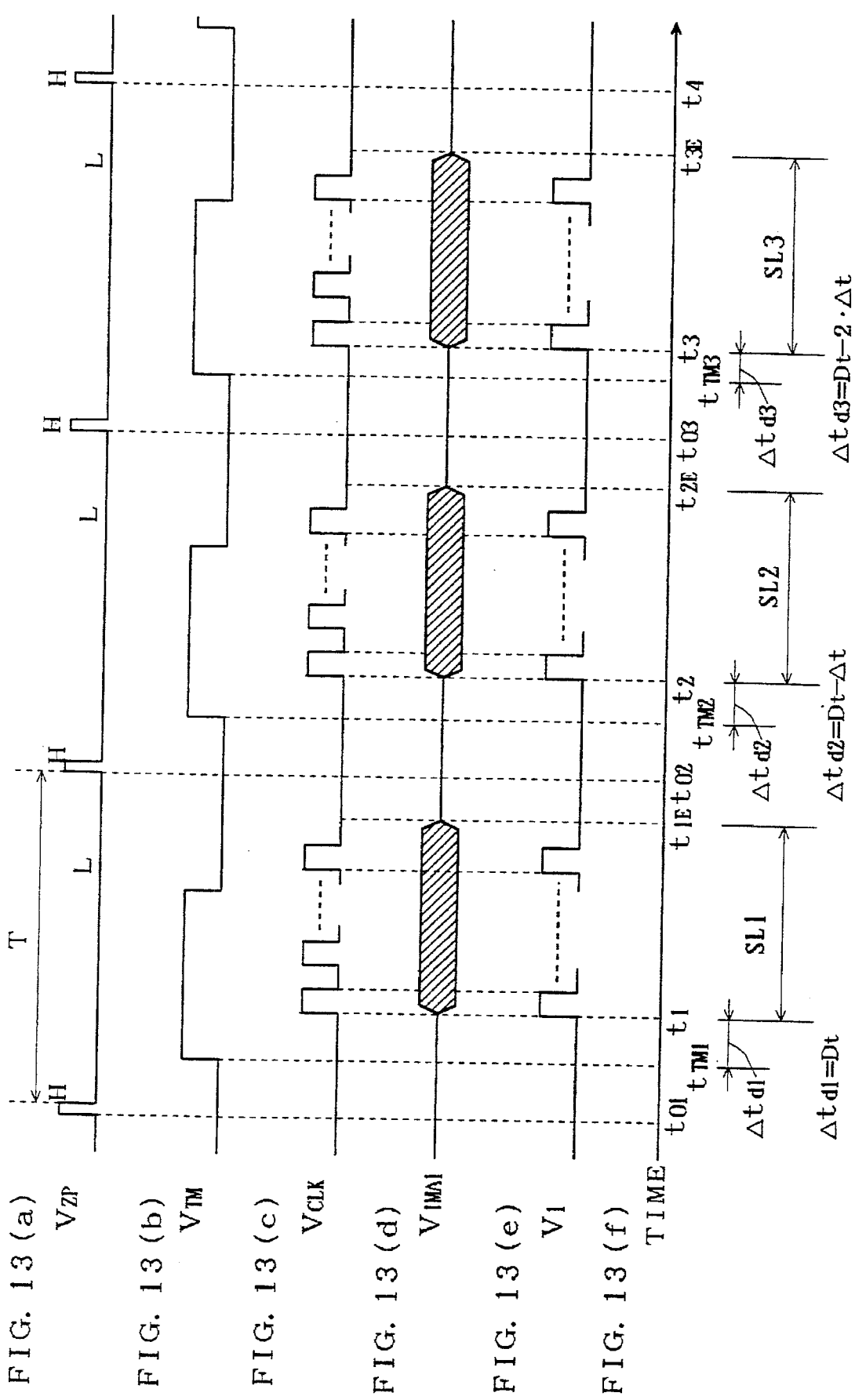
FIG. 13(a) is a timing chart showing a zero pulse signal.
FIG. 13(b) is a timing chart showing a trimming mask signal.
FIG. 13(c) is a timing chart showing a printing clock signal.
FIG. 13(d) is a timing chart showing an image signal with respect to a first light emitting diode.
FIG. 13(e) is a timing chart showing a binarized image signal applied to the first light emitting diode.
FIG. 13(f) shows the time base.

In order to further clarify the aforementioned operation procedure, description is now made on the basis of the timing charts shown in FIGS. 13(a) to 13(f). FIGS. 13(a), 13(b), 13(c), 13(d) and 13(e) show the zero pulse signal $V_{ZP}$, the trimming mask signal $V_{TM}$, the printing clock signal $V_{CLK}$, the image signal $V_{IMA1}$ which is outputted from the latch $3_1$, and the image signal $V_1$ which is parallel-to-serial converted by the P-S converter $4_1$. FIG. 13(f) shows the time base.

It is assumed that the rotary encoder 18 detects a reference position and the zero pulse signal $V_{ZP}$ rises from a low level to a high level at a time $t_{01}$. It is also assumed that the trimming mask signal $V_{TM}$ thereafter rises from a low level to a high level at a time $t_{TM1}$. The delay time $\Delta t_{dI}$ in the scanning line area SL1 is provided by $\Delta t_{d1}$=Dt, so that the printing clock signal $V_{CLK}$ is outputted at a time which is delayed form the time $t_{TM1}$ by the aforementioned delay time $\Delta t_{d1}$, i.e., at a time $t_1$. Thus, scanning in the scanning line area SL1 is started, and completed at a time $t_{1E}$.

Then, the zero pulse signal $V_{ZP}$ again rises from a low level to a high level at a time $t_{02}$ upon single rotation of the cylinder 36, and the trimming mask signal $V_{TM}$ again rises from a low level to a high level at a time $t_{TM2}$, whereby the printing clock signal $V_{CLK}$ rises to a high level at a time $t_2$ which is delayed from the time $t_{TM2}$ by a delay time $\Delta t_{d2}$ ($\Delta t_{d2} < \Delta t_{d1}$), to repeat high and low levels in the cycle $t_{CLK}$. Scanning in the scanning line area SL2 is carried out from the time $t_2$ to a time $t_{2E}$. The delay time $\Delta t_{d2}$ is provided by $\Delta t_{d2}$=Dt−$\Delta$t. This also applies to the scanning line areas following the scanning line area SL3. In this case, the respective delay times $\Delta t_{d3}$ to $\Delta t_{dm-1}$ satisfy the relation of $\Delta t_{d3} > \Delta t_{d4} > \ldots > \Delta t_{dm-1}$, and the delay time $\Delta t_{dm}$ for the final scanning line area SLm is $\Delta t_{dm}$=Dt−$\Delta$t(m−1).

It is necessary to set the reference delay time, i.e., the delay time Dt for the scanning line area SL1, at a value exceeding $\Delta$t(m−1). The number m of the scanning line areas and the displacement time $\Delta$t of delay timing are varied with the size of the image forming region in the subscanning direction X, the inclination angle θ and the like, and hence the reference delay time Dt may be set also in consideration of these points, or rendered variable with change thereof.

Due to the aforementioned structure and the procedure, it is possible to carry out scanning of m by n in the main scanning direction, to record images with no displacement between adjacent scanning line areas. The image forming region 34 as obtained is inclined with respect to the central axis 37 of the cylinder 36 at the inclination angle θ, as shown in FIG. 11. Although the image forming region 34 is thus inclined, no distortion is caused in the image formed in this region 34.

① According to the first embodiment, it is possible to decide an inclination angle of each scanning line area at a proper value in response to the value of resolution, thereby correctly controlling the direction of arrangement of images formed by a plurality of light beams on a photosensitive material.

②  According to the first embodiment, further, it is possible to decide a proper moving speed in a subscanning direction in response to the value of resolution, thereby correctly controlling movement of light emitting unit in a subscanning direction. Thus, an image forming region which is formed on the photosensitive material has no displacement in relation to the subscanning direction, even if the value of the resolution is varied.

③ According to the first embodiment, further, it is possible to decide a relative delay time in a main scanning direction in response to the value of resolution every scanning line. Thus, it is possible to implement an image forming region having no displacement in relation to the main scanning direction even if the value of the resolution is varied.

II. Second Embodiment

An image recording apparatus according to a second embodiment of the present invention is adapted to spirally scan a photosensitive material which is arranged on a rotator with a plurality of light beams for recording images. This apparatus employs the so-called interlace scanning system of interpolating respective ones of second half scanning lines resulting from scanning of the photosensitive material with the light beams in i-th rotation of the rotator with first half scanning lines by scanning in next (i+1)-th rotation thereby recording images. The second embodiment of the present invention is now described with reference to the drawings.

(1) Structure of Image Recording Apparatus 200

A. Structures of Cylinder 36 and Exposure Head 20

Figure 14:
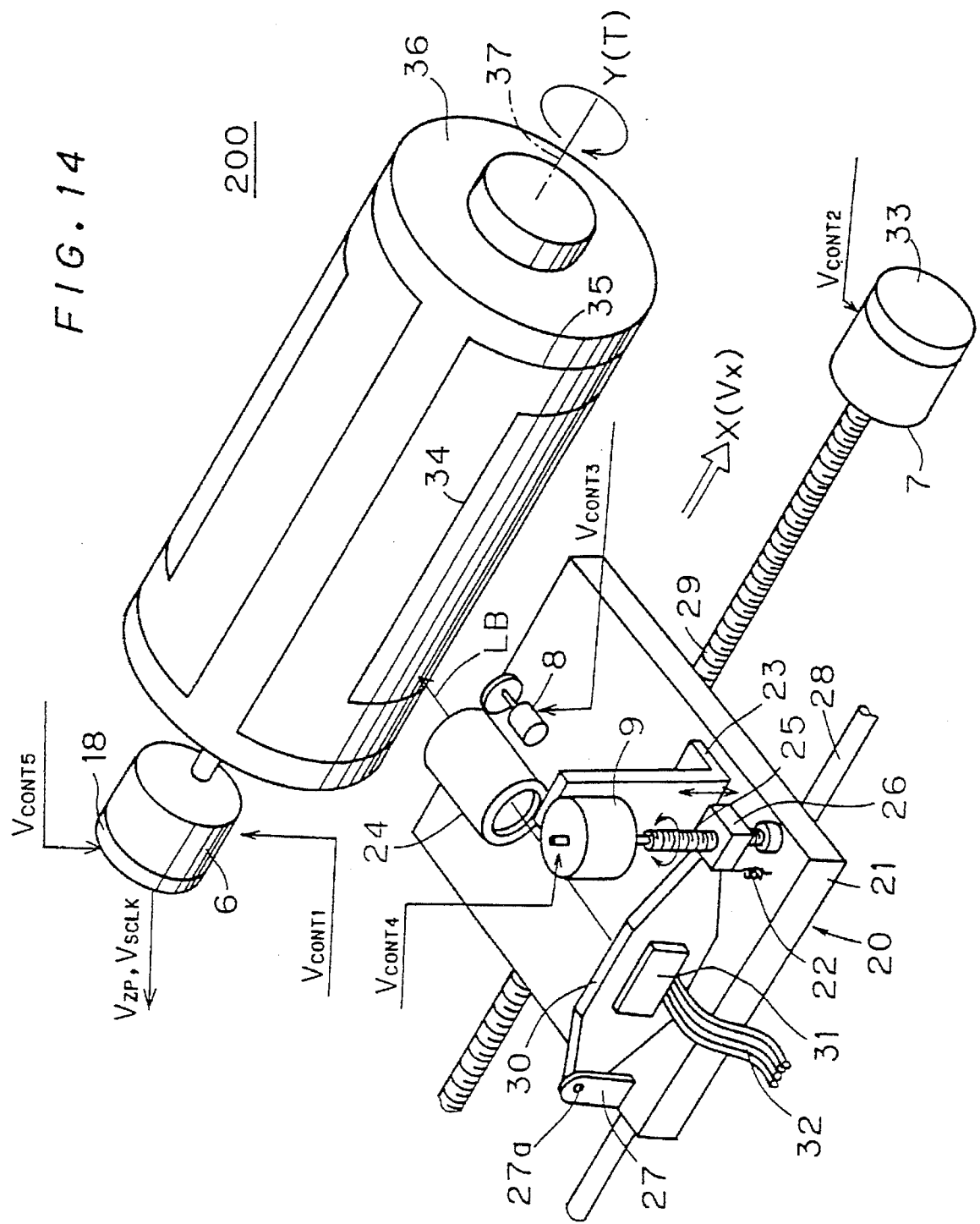
FIG. 14 illustrates the relation between an exposure head and a cylinder in an image recording apparatus according to a second embodiment of the present invention.
Figure 15:
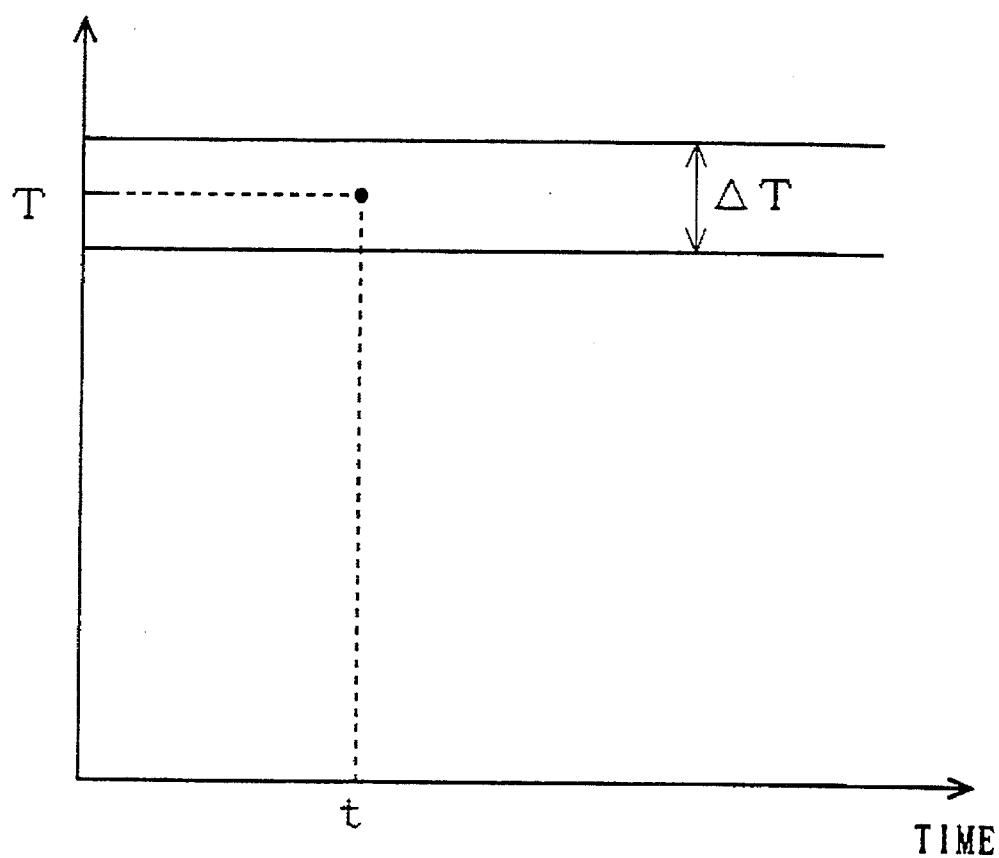
FIG. 15 illustrates slight fluctuation of a rotation cycle of the cylinder.

FIG. 14 is a perspective view showing mechanical structures of an exposure head 20 and a cylinder 36 (rotator) in an image recording apparatus 200 according to the second embodiment of the present invention. Operations of these elements are similar to those of the first embodiment. Therefore, description of the exposure head 20 and the cylinder 36 are omitted. The cylinder 36 rotates about its central axis 37 in a constant rotation cycle, while the actual rotation cycle slightly fluctuates in a small range about the constant cycle T. FIG. 15 typically illustrates this point. The rotation cycle, which is maintained at the set value T at a certain time t, slightly fluctuates in a range of (T−ΔT/2) to (T+ΔT/2) with a lapse of time. Symbol ΔT represents the range of the slight fluctuation.

Figure 16:
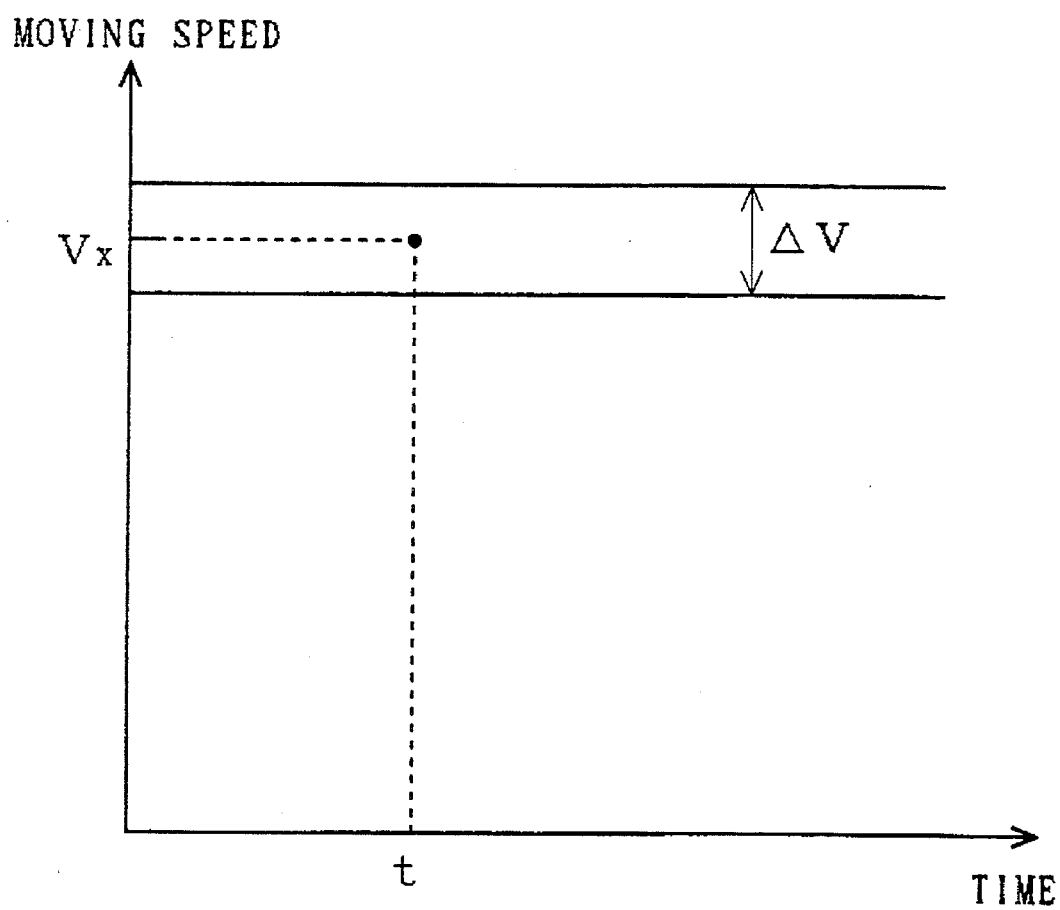
FIG. 16 illustrates slight fluctuation of a moving speed of the exposure head.
Figure 17:
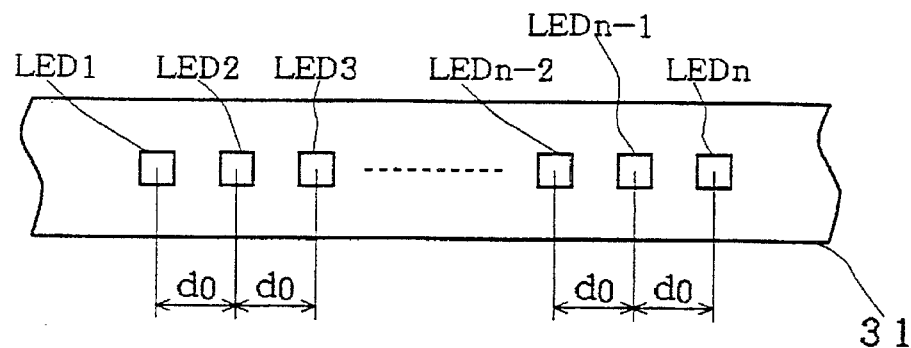
FIG. 17 illustrates exemplary arrangement of n light emitting diodes.

The exposure head 20 shown in FIG. 14 ideally moves in a direction X (subscanning direction) which is parallel to the central axis 37 of the cylinder 36 at a constant moving speed $V_X$, while the moving speed of the exposure head 20 also slightly fluctuates about the constant value $V_X$ in practice. FIG. 16 also typically illustrates this point. Referring to FIG. 16, a range ΔV of slight fluctuation results from the fact that a control signal level fluctuates or drifts by a slight amount during scanning. Consequently, light beams B which are emitted from the exposure head 20 spirally scan the cylinder 36 while being accompanied by the slight fluctuation of the rotation cycle T and that of the moving speed $V_X$ of the exposure head.

n (n: odd number of at least 3) light emitting diodes LED1 to LEDn serving as light emitting elements are mounted on a central portion 31 of an LED holder 30 to be aligned with each other at a center distance $d_0$. FIG. 17 typically shows the state of this arrangement.

The magnification of a zoom lens 24 is adjusted by a magnification change motor (hereinafter simply referred to as a motor) 8. The n light beams LB which are incident upon the zoom lens 24 are imaged in sizes responsive to the magnification set in the zoom lens 24. While the light beams LB are at a beam-to-beam pitch (center-to-center pitch) $d_0$ in a stage before incidence upon the zoom lens 24, the zoom lens 24 reduces the beam-to-beam pitch between the light beams LB so that a center-to-center distance between n images formed on a film 35 coincides with a value double an inverse number of resolution described later in response to the magnification which is previously adjusted by the motor 8.

Figure 18:
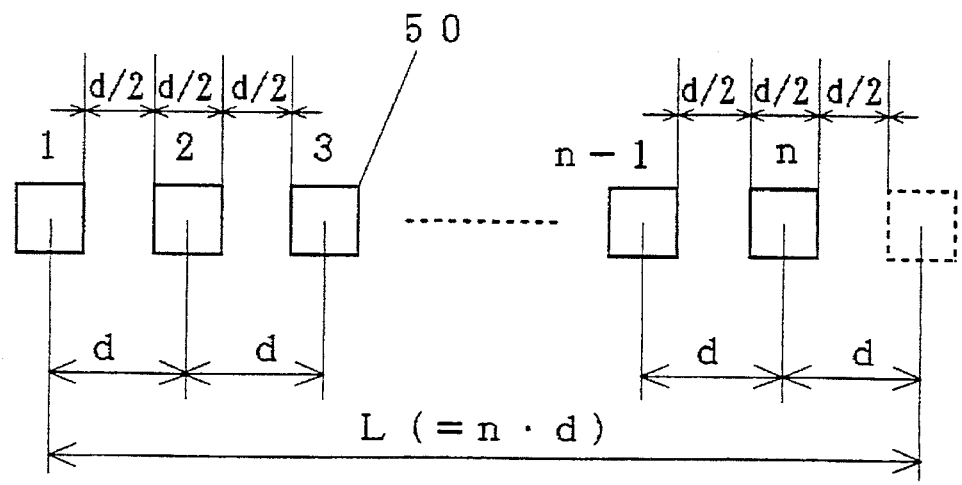
FIG. 18 illustrates arrangement of exposure pixels.

FIG. 18 shows an exemplary state of arrangement of exposure pixels 50 by the n light beams LB which are imaged on the film 35. FIG. 18 shows the enter-to-center distance between the exposure pixels 50 which are imaged on the film 35 (FIG. 14) as a distance d (d<$d_0$). Further, this center-to-center distance d corresponds to a value twice the width (d/2) of each exposure pixel 50. Thus, the n light beams LB are so imaged that another exposure pixel can be inserted between each adjacent pair of exposure pixels 50. The center-to-center distance d between each adjacent pair of exposure pixels 50 is hereinafter referred to as the beam-to-beam pitch d.

B. Electrical Structure

Figure 19:
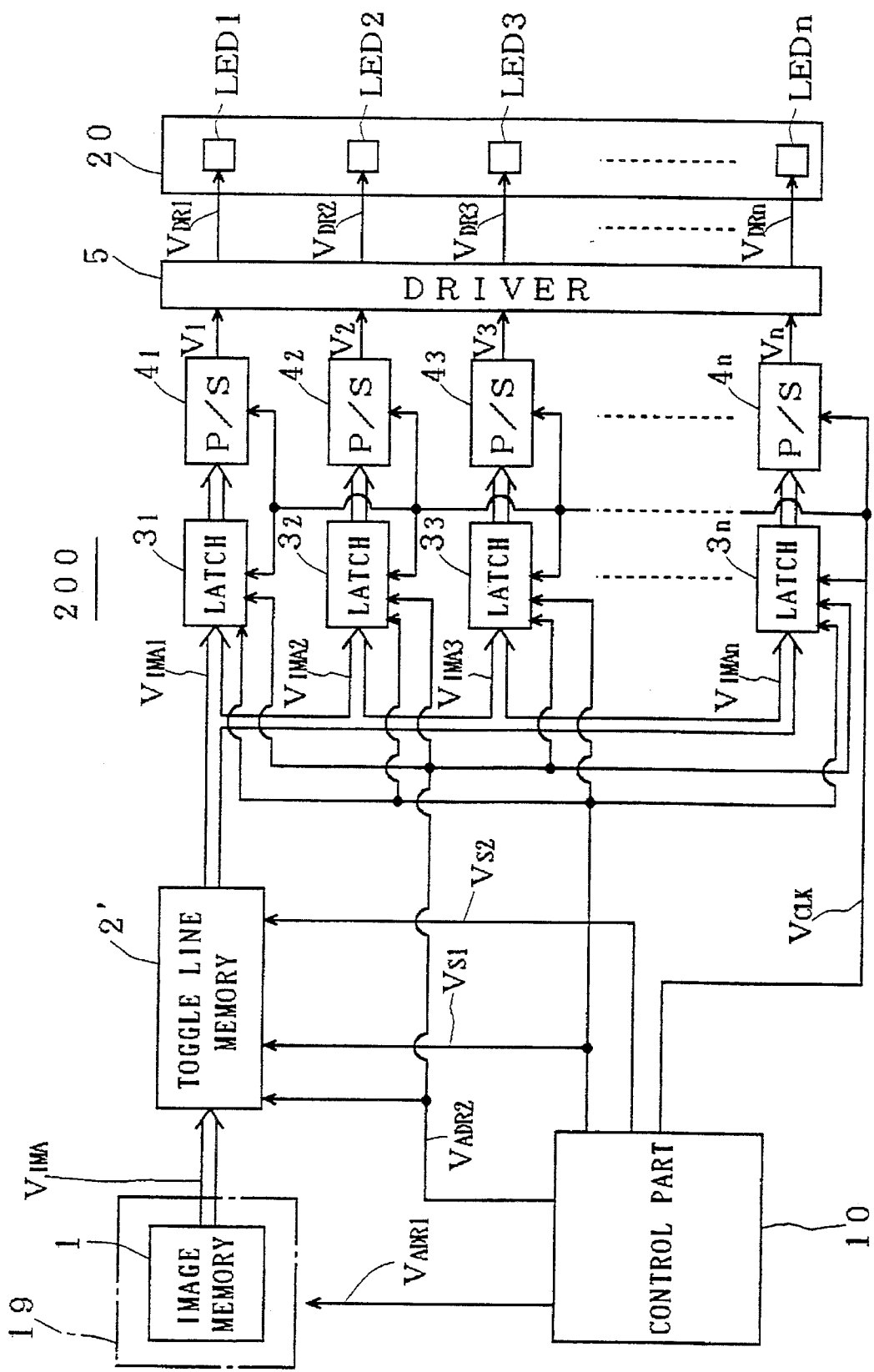
FIG. 19 is a block diagram showing an electrical structure of the image recording apparatus.

FIG. 19 is a block diagram typically showing an electrical structure of the image recording apparatus 200. First, an image memory 1 provided in a work station 19 previously stores image signals $V_{IMA}$ to be recorded. An output terminal of this image memory 1 is connected to a toggle line memory 2'. An output terminal of the toggle line memory 2' is connected to respective input terminals of n latch circuits $3_1$ to $3_n$.

Further, output terminals of the respective latch circuits $3_1$ to $3_n$ are connected to input terminals of n parallel-to-serial converters (hereinafter referred to as P-S converters) $4_1$ to $4_n$, and output terminals of the P-S converters $4_1$ to $4_n$ are connected to input terminals of the light emitting diodes LED1 to LEDn respectively through a driver 5.

A control part 10 is adapted to control the aforementioned elements 1, 2', $3_1$ to $3_n$ and $4_1$ to $4_n$. This control part 10 outputs an address signal $V_{ADR1}$ to the image memory 1, to control reading of the image signals $V_{IMA}$ from the image memory 1. Thus, the image signal $V_{IMA}$ related to scanning lines to be scanned on the film 35 (FIG. 14) is successively read from the image memory 1, and outputted to the toggle line memory 2'. The control part 10 outputs selector signals $V_{S1}$ and $V_{S2}$ and an address signal $V_{ADR2}$ to the toggle line memory 2'.

Figure 20:
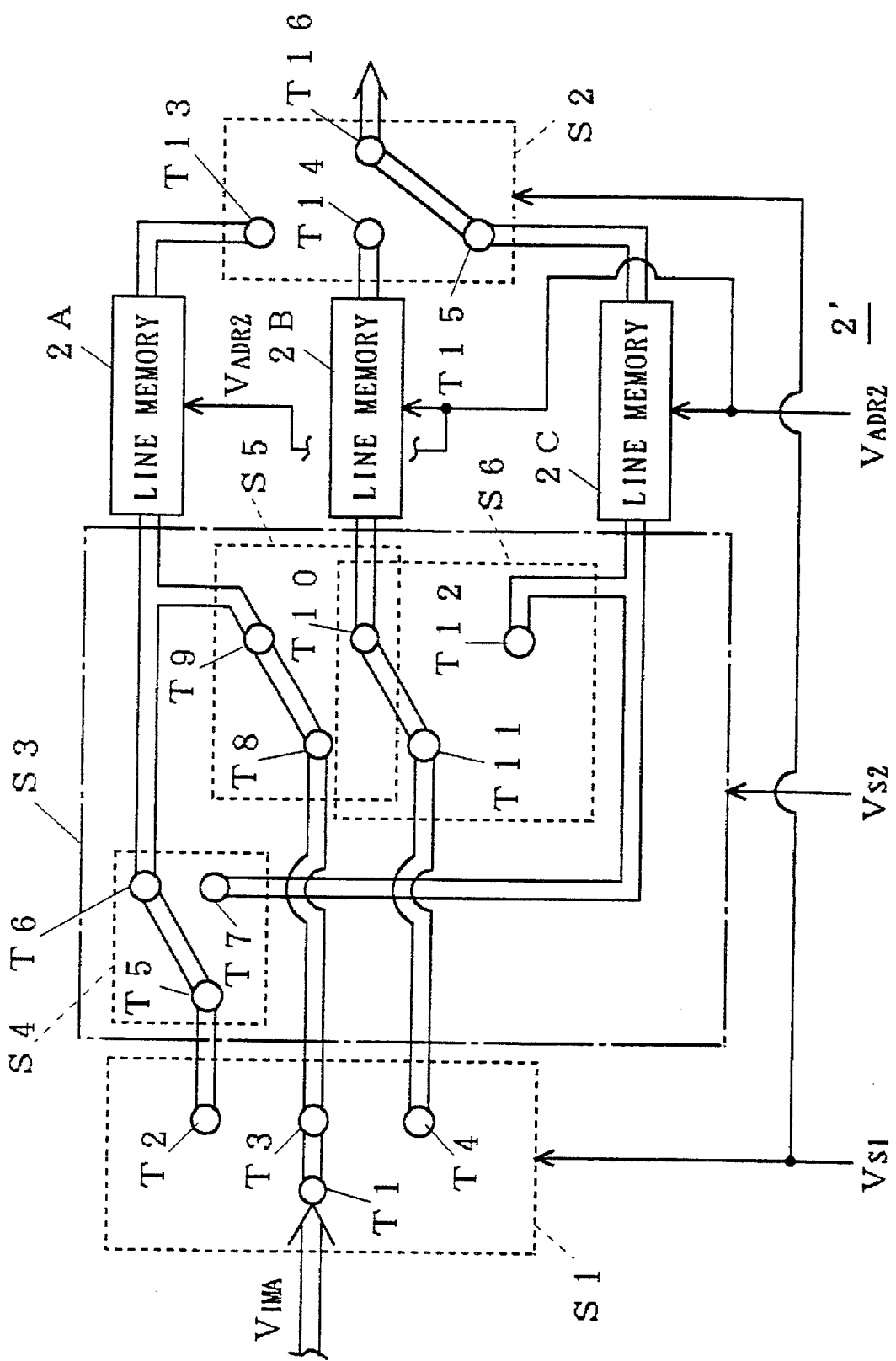
FIG. 20 is a block diagram showing a structure of a toggle line memory.

FIG. 20 is a block diagram typically showing an internal structure of the toggle line memory 2'. The toggle line memory 2' has three line memories 2A, 2B and 2C and three switching circuits S1, S2 and S3, while the switching circuit S3 is formed by three switching circuits S4 to S6. An input terminal T1 and an output terminal T16 are connected to an output terminal of the image memory 1 (FIG. 19) and input terminals of the latch circuits $3_1$ to $3_n$ (FIG. 19) respectively. The switching circuits S1 and S2 have three terminals T2 to T4 and three terminals T13 to T15 respectively, to carry out switching operations in response to rise of the selector signal $V_{S1}$ from a low level to a high level. The terminals T2 to T4 are connected to input terminals T5, T8 and T11 of the switching circuits S4, S5 and S6 respectively. Further, the terminals T13 to T15 are connected to output terminals of the line memories 2A to 2C respectively. On the other hand, the three switching circuits S4 to S6 included in the switching circuit S3 carry out switching operations in response to rise of the selector signal $V_{S2}$ from a low level to a high level. Terminals T6 and T7 of the switching circuit S4 are connected to input terminals of the line memories 2A and 2C respectively. On the other hand, the switching circuits S5 and S6 have a terminal T10 in common, and the terminals T9, T10 and T12 are connected to the input terminals of the line memories 2A, 2B and 2C successively write the image signals $V_{IMA}$ as transmitted in response to addressing supplied by the address signal $V_{ADR2}$, while successively reading the image signals $V_{IMA}$ as stored.

The toggle line memory 2' thus comprises the three line memories 2A to 2C and the three switching circuits S1 to S3, for the following reasons: First, while an image signal $V_{IMA}$ in relation to a certain block line (the term "block line" indicates a scanning region which is scanned once with n light beams in parallel with each other, as described later in more detail) is written in the toggle line memory 2', an already stored image signal $V_{IMA}$ in relation to a preceding block line is simultaneously made simultaneously readable from the toggle line memory 2'. Second, the image memory 1 (FIG. 19) successively reads the image signals in order from that related to the first scanning line to that related to the last (m×n)-th scanning line from its storage regions and outputs the same as the image signals $V_{IMA}$, and hence the toggle line memory 2' must select an image signal belonging to a desired block line from the image signals $V_{IMA}$ as transmitted, to separately stored the image signals $V_{IMA}$ after selection in the line memories 2A to 2C. Thus, the toggle line memory 2' has the three switching circuits S1 to S3. Consequently, image signals to belong the respective block lines are successively written in the line memories 2A to 2C respectively. This point is further clarified in detail in the following description with reference to timing charts shown in FIGS. 28(a) to 28(k) and 29(a) to 29(k). The concept of the aforementioned scanning lines is also clarified from the following description.

Referring again to FIG. 19, the control part 10 outputs the address signal $V_{ADR2}$, the selector signal $V_{S1}$ and a printing clock signal $V_{CLK}$ to the respective latch circuits $3_1$ to $3_n$. Further, the printing clock signal $V_{CLK}$ is also inputted in the P-S converters $4_1$ to $4_n$ respectively.

Figure 21:
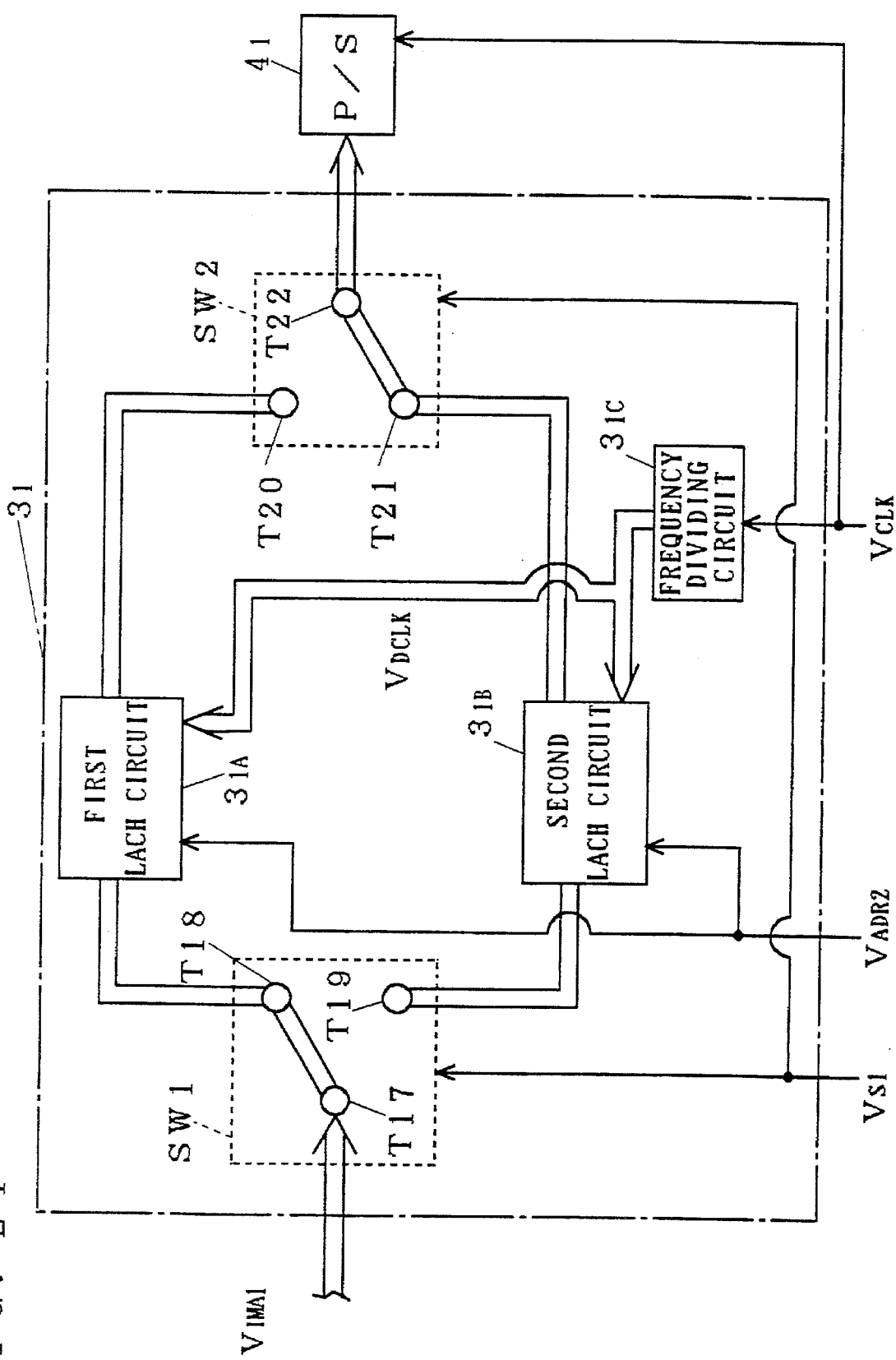
FIG. 21 is a block diagram showing a structure of a latch circuit.

FIG. 21 is a block diagram typically showing an internal structure of the latch circuit $3_1$ with the P-S converter $4_1$. The remaining latch circuits $3_2$ to $3_n$ are identical in structure to the latch circuit $3_1$, as a matter of course. Therefore, the structure of the latch circuit $3_1$ alone is now described to omit redundant description. As shown in FIG. 21, the latch circuit $3_1$ has first and second latch circuits $3_{1A}$ and $3_{1B}$, two switching circuits SW1 and SW2, and a frequency dividing circuit $3_{1C}$. In the switching circuit SW1, a terminal T17 is adapted to receive an image signal $V_{IMA1}$ (parallel signal) corresponding to the first light emitting diode LED1 (FIG. 19), while terminals T18 and T19 are connected to input terminals of the first and second latch circuits $3_{1A}$ and $3_{1B}$ respectively. In the switching circuit SW2, on the other hand, a terminal T22 serves as an output terminal of the latch circuit $3_1$, while terminals T20 and T21 are connected to output terminals of the first and second latch circuits $3_{1A}$ and $3_{1B}$ respectively. The switching circuits SW1 and SW2 carry out switching operations in response to rise of the selector signal $V_{S1}$. The first and second latch circuits $3_{1A}$ an $3_{1B}$ latch the received image signal $V_{IMA1}$ in response to timing of the address signal $V_{ADR2}$. On the other hand, the frequency dividing circuit $3_{1C}$ frequency-divides the printing clock signal $V_{CLK}$ by 8, to generate a clock signal $V_{DCLK}$.

The printing clock signal $V_{CLK}$ is thus frequency-divided by 8 for the following reason: Since the first and second latch circuits $3_{1A}$ and $3_{1B}$ hold the image signal $V_{IMA}$ in units of eight bits (corresponding to image data for eight pixels), the aforementioned two clock signals are required so that it is possible to read the image signal $V_{IMA1}$ as image data in the units of eight bits and convert the same to a 1-bit image signal (serial signal) by the P-S converter $4_1$ of the next stage.

The latch circuit $3_1$ is structured in the aforementioned manner, in order to simultaneously read an image signal $V_{IMA1}$ which is related to a preceding block line and P-S convert the same while latching a transmitted image signal $V_{IMA1}$ which is related to a certain block line and to apply the converted image signal $V_1$ to the first light emitting diode LED1 through the driver 5 (FIG. 19). Referring to FIG. 21, the first latch circuit $3_{1A}$ currently latches the image signal $V_{IMA1}$, while the second latch circuit $3_{1B}$ outputs a latched image signal $V_{IMA1}$ at the timing of the clock signal $V_{DCLK}$. The structure of the control part 10 is hereafter described in detail.

(B-2) Structure of Control Part 10

Figure 22:
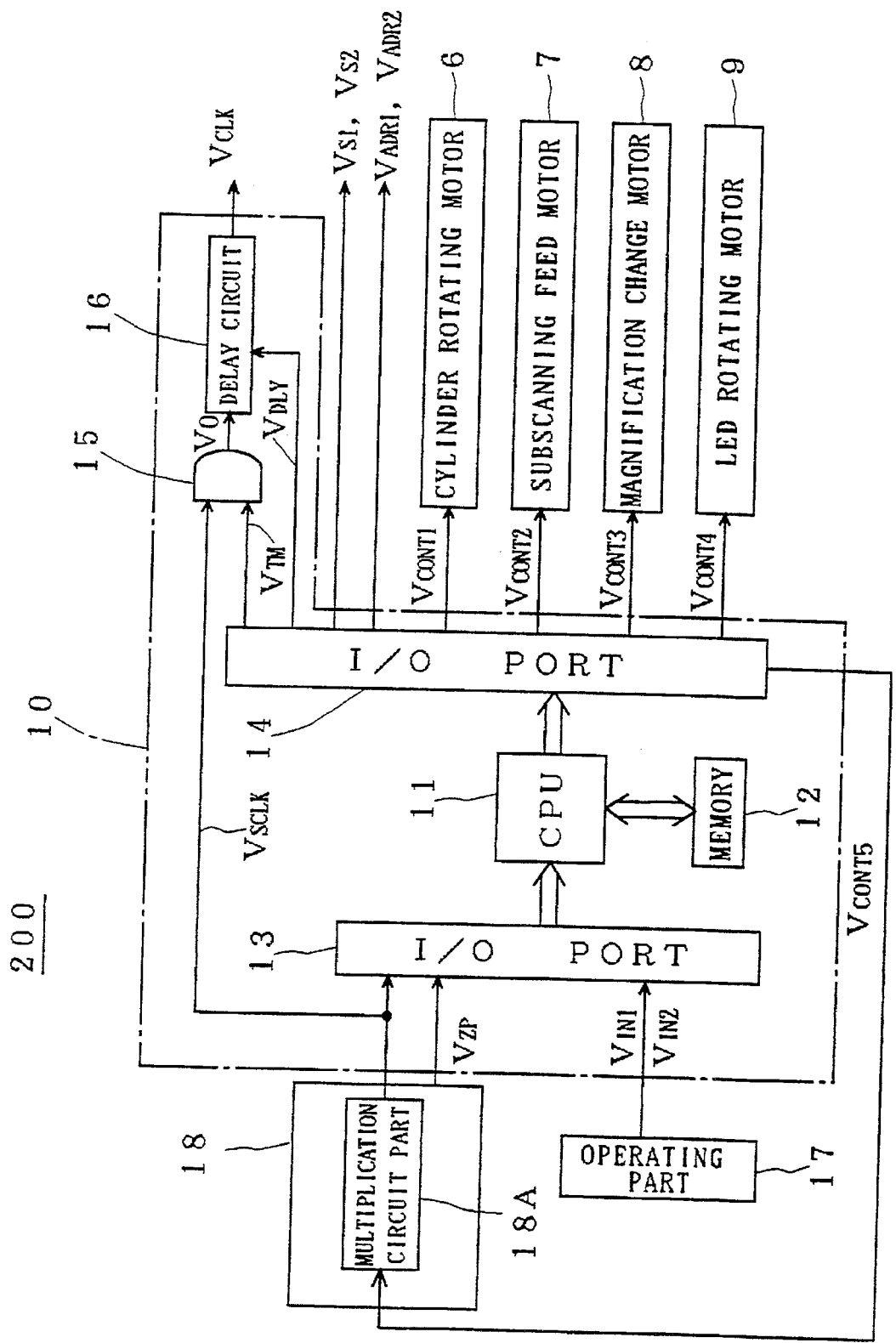
FIG. 22 is a block diagram showing an electrical structure of a control part.

FIG. 22 is a block diagram showing structures of the control part 10 and its peripheral portions. The control part 10 is formed around a CPU 11. A rotary encoder 18 and an operating part 17 are connected to this control part 10. The rotary encoder 18 outputs a zero pulse signal $V_{ZP}$ and a printing reference clock signal $V_{SCLK}$ which is generated by a multiplication circuit part 18A provided in its interior to the CPU 11 through an I/O port 13. The operating part 17 also outputs input signals $V_{IN1}$ and $V_{IN2}$ to the CPU 11 through the I/O port 13. This operating part 17 comprises input units (not shown) such as a keyboard, a mouse and a touch panel key. The input signals $V_{IN1}$ and $V_{IN2}$ received from the operating part 17 are stored in a memory 12 through the CPU 11.

On the other hand, motors 6 to 9 and the multiplication circuit part 18A are connected to an output side of the control part 10. The CPU 11 outputs control signals $V_{CONT1}$ to $V_{CONT4}$ to the respective motors 6 to 9 through an I/O port 14. Further, the CPU 11 counts the printing reference clock signal $V_{SCLK}$ and generates a trimming mask signal $V_{TM}$, to output the same to an input terminal of an AND gate circuit 15. The trimming mask signal $V_{TM}$ is adapted to provide start and end positions of a trimming range. Another input terminal of the AND circuit 15 is connected to the rotary encoder 18 to receive the printing reference clock signal $V_{SCLK}$, while an output terminal of the rotary encoder 18 outputs a reference signal $V_0$ to an input terminal of a delay circuit 16. An output terminal of the delay circuit 16 is connected to the n latches $3_1$ to $3_n$ shown in FIG. 19, and the delay circuit 16 receives a delay signal (the signal commanding a delay time) $V_{DLY}$ outputted by the CPU 11, to output a printing clock signal $V_{CLK}$ obtained by delaying the reference signal $V_0$.

(2) Inclination Angle θ and Method of Correcting Displacement of Scanning Line Area Study is now made on the relation between resolution of the interlace-scanned light beams LB (corresponding to the number of scanning lines or exposure pixels per unit length in a direction of arrangement of images) and an inclination angle θ and that between the resolution and an amount of displacement correction of scanning lines areas. Description is now made with such definition that M (/mm) represents the resolution, n represents the number of the light emitting diodes, R (mm) represents the radius of the cylinder 36, m represents the number of the scanning line areas, k (k=m+1) represents the number of the block lines, d (mm/) represents the beam-to-beam pitch, L (mm) represents the width of each block line, and T (sec./rev.) represents the rotation cycle of the cylinder 36 (FIG. 14), where n is an odd number of at least 3. The aforementioned block line corresponds to a scanning region including n scanning lines which are obtained by scanning the object with the n light beams emitted from the n light emitting diodes LED1 to LEDn shown in FIG. 17. Each scanning line is an exposure region obtained by imaging each light beam or scanning an exposure pixel. Each scanning line area corresponds to a scanning region including n scanning lines to be obtained by simultaneously scanning n images in the main scanning direction Y assuming that n light beams are imaged on the film 35 (FIG. 14) at a beam-to-beam pitch corresponding to the inverse number of the resolution M. A relational expression of d=2/M holds since the image recording apparatus 200 (FIG. 14) employs the interlace scanning system. Therefore, an area including an adjacent pair of scanning line areas corresponds to a block line. The block lines and the scanning lines are hereafter properly generically referred to as block lines BL and scanning line areas SL respectively.

① As to inclination Angle θ

Figure 23:
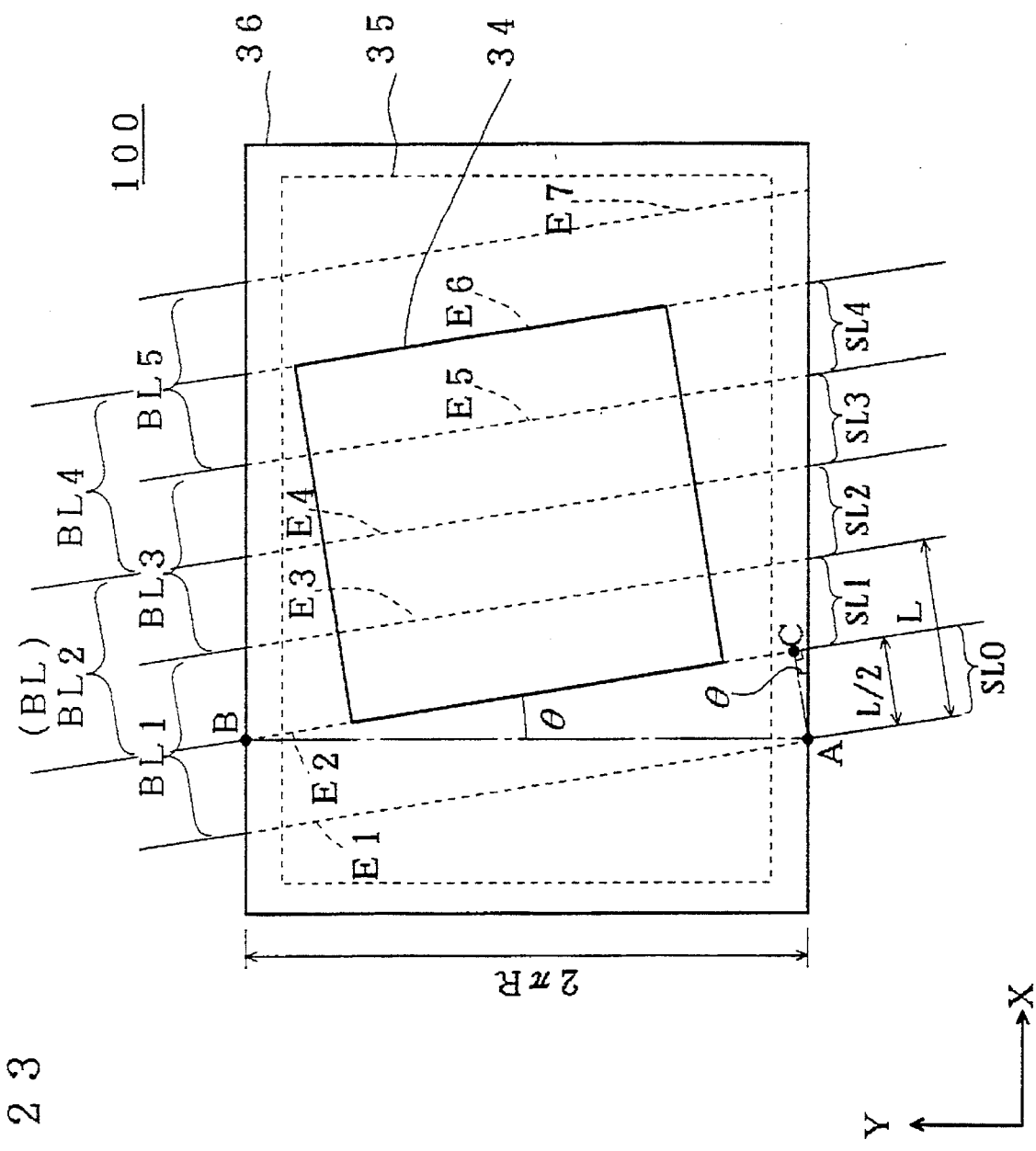
FIG. 23 illustrates an image forming region with five block lines.

FIG. 23 shows an image forming region 34 which is formed on the film 35 fixed onto the cylinder 36, assuming that the number k of the block lines BL is five. The n light beams LB (FIG. 14) spirally scan the film 35 at the inclination angle θ, whereby the block lines BL and the scanning line areas SL are also inclined at the inclination angle θ in the main scanning direction Y or the subscanning direction X. FIG. 23 illustrates the cylinder 36 in a virtually developed manner. Broken lines Ej (j=1, 2, . . . , k+2) appearing in FIG. 23 show boundaries between adjacent ones of the scanning line areas SL. The broken line E1, corresponding to a virtual boundary due to absence of a corresponding scanning line area SL, blocks an end (start line) of a block line BL1.

The image recording apparatus 200 is a spiral scanning type recording apparatus employing the interlace scanning system of scanning unexposed portions corresponding to portions between respective second half scanning lines in a precedingly scanned/exposed block line BL in scanning of a next block line. Therefore, an end point A of the broken line E1 must coincide with a start point B of the broken line E2, while a scanning line area SL(i–1) belonging to an i-th block line BLi (1≦i≦k) is scanned with {(n–1)/2} light beams which are emitted from first to {(n–1)/2}-th light emitting diodes LED1 to LED{(n–1)/2} and another scanning line area SLi is scanned with {(n+1)/2} light beams which are emitted from {(n+1)/2}-th to n-th light emitting diodes LED {(n+1)/2} to LEDn so that such scanning is repeated every block line BL. A line AB is parallel to the main scanning direction Y, and has a length of 2πR. Assuming that a point C denotes an intersection between a perpendicular from the point A and the broken line E2, a line AC has a length of L/2 (=(n·d)/2=n/M), where d=2/M. Noting a triangle ABC, it is understood that the inclination angle θ is expressed as follows:

$$\theta = \sin^{-1}\left(\frac{L}{4\pi R}\right) = \sin^{-1}\left(\frac{n-d}{4\pi R}\right) \quad (7)$$

Thus, the inclination angle θ depends on the width L of the block line BL, i.e., the resolution M (or the beam-to-beam pitch d) and the number n of the light emitting diodes. The number n of the light emitting diodes generally remains unchanged and hence the inclination angle θ depends only on the resolution M (or the beam-to-beam pitch d) in this case.

The scanning line areas SL1, SL2, SL3, and SL4 are exposed by double scanning operations in relation to the block lines BL1 and BL2, BL2 and BL3, BL3 and BL4, and BL4 and BL5 respectively. A white image is formed on a virtual scanning line area SL0 by single scanning in relation to the block line BL1.

② As to Amount of Displacement Correction of Scanning Line Area

Figure 24:
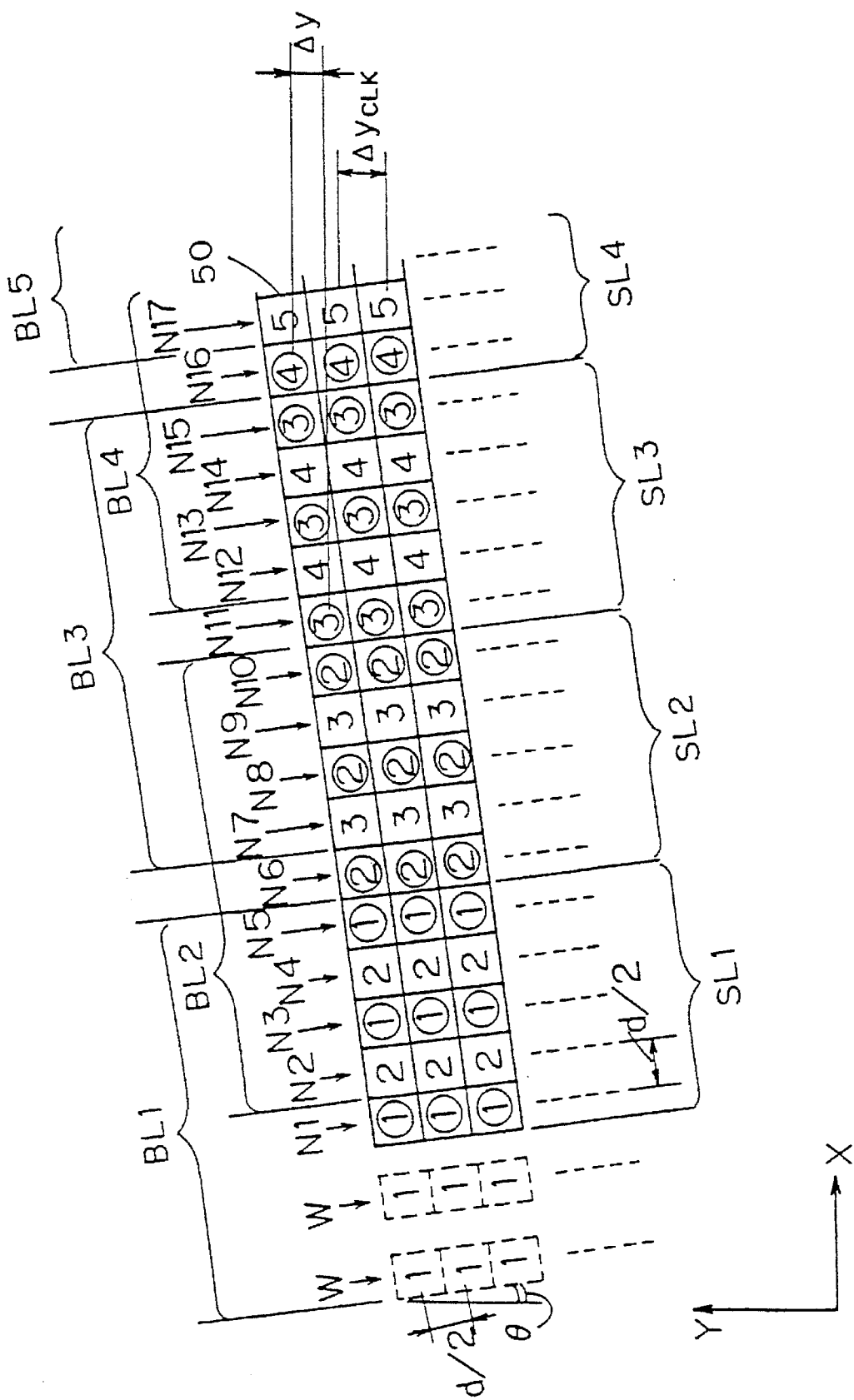
FIG. 24 illustrates the relation between block lines and scanning line areas.

The amount of displacement correction is hereafter derived on the basis of FIG. 24. FIG. 24 illustrates the relation between the respective block lines BL and the respective scanning line areas SL on the assumption that the direction of arrangement of exposure pixels 50 with respect to the main scanning direction Y is at the inclination angle θ. In order to simplify the description, it is assumed that the number n of the light beams is five. Symbols N1 to N17 denote the numbers of the scanning lines respectively. Symbol W denotes virtual scanning lines, which draw white images in practice. The respective scanning lines are hereafter denoted by W, N1, . . . , N17.

Referring to FIG. 24, further, numerals 1 to 5 are provided on the respective pixels 50, in order to facilitate easy understanding. These numerals show the numbers of the block lines BL which are scanned for forming the exposure pixels 50 belonging to the scanning lines W, W and N1 to N17. In particular, encircled numerals show that the respective exposure pixels 50 are formed by imaging of light beams which are emitted from (n+1)/2-th to n-th light emitting diodes LED{(n+1)/2} to LEDn in scanning of i-th (1≦i≦k) block lines BLi.

In more concrete terms in relation to this embodiment (n=5), the respective light beams LB (FIG. 14) which are emitted from the third to fifth light emitting diodes LED3 to LED5 from the exposure pixels 50 on the scanning lines N1, N3 and N5, those on the scanning lines N6, N8 and N10 and those on the scanning liens N11, N13 and N15 in scanning of the block lines BL1, BL2 and BL3 respectively. On the other hand, the first and second light emitting diodes LED1 and LED2 draw white images on the scanning lines W in scanning of the block line BL1, and form the exposure pixels 50 on the unexposed scanning lines N2 and N4, N7 and N9, and N12 and N14 in scanning of the block lines BL2, BL3 and BL4 respectively. In scanning of the last block line BLk, the light beams which are emitted from the third to fifth light emitting diodes LED3 to LED5 from white images in a virtual scanning line area SL(m+1) similarly to those emitted from the first and second light emitting diodes LED1 and LED2 in scanning of the block line BL1, although this is not shown in FIG. 24.

As clearly understood from FIG. 24, a time interval (cycle of the printing reference clock signal $V_{SCLK}$ (cycle shown in FIG. 22)) $t_{CLK}$ for outputting the light beams, which is an amount associated with a component $\Delta Y_{CLK}$ of the center-to-center distance between an adjacent pair of exposure pixels 50 belonging to a single scanning line in the main scanning direction Y, is expressed as follows:

$$t_{CLK} = d - T - \cos\theta/(4\pi R) \quad (8)$$

$$= T - \cos\theta/(M - 2\pi R)\left(\because \frac{d}{2} = \frac{1}{M}\right)$$

The amount Δy of displacement between the adjacent block lines BL in the main scanning direction Y is expressed as follows:

$$\Delta y = \frac{L}{2}\sin\theta = \frac{n-d}{2}\sin\theta = \frac{n}{M}\sin\theta \quad (9)$$

Hence, the time Δt (also called a displacement time of delay timing) required for rotating the cylinder 36 (FIG. 14)

by the aforementioned amount Δy of displacement is related to the resolution M as follows:

$$\begin{aligned}\Delta t &= T - \Delta y/(2\pi R) \\ &= T - n - d - \sin\theta/(\pi R) \\ &= T - n - \sin\theta/(M - 2\pi R)\end{aligned} \quad (10)$$

Hence, the exposure starting time for each block line BL in the main scanning direction Y may be delayed by the aforementioned time Δt. Further, the current moving speed $V_X$ of the exposure head 20 (FIG. 14) in the subscanning direction X is related to the resolution M by the following expression 11. However, the moving speed $V_X$ slightly fluctuates in practice as hereinabove described (see FIG. 16), and hence the moving speed $V_X$ provided by the expression 11 has meaning as an average value.

$$V_X = \frac{L}{2 - \cos\theta} \cdot \frac{1}{T} = \frac{n - d}{2 - T - \cos\theta} \quad (11)$$
$$= \frac{n}{M - T - \cos\theta}$$

Hence, it is necessary to properly adjust the inclination angle θ, the displacement time Δt of the delay timing in the main scanning direction Y and the moving speed $V_X$ of the exposure head 20 every time the magnification of the zoom lens 24 shown in FIG. 14 is changed. It is possible to record images having no displacement between the adjacent block lines BL in the prescribed image forming region 34 (FIG. 14) by this adjustment.

③ Method of Correcting Δy

A method of correcting the amount Δy of displacement is now described with reference to FIGS. 25(a) to 25(l). FIGS. 25(a) to 25(l) are timing charts showing the relative relation of the printing clock signal $V_{CLK}$ every block line BL.

In order to correct the amount Δy, outputs of image signals $V_1$ to $V_n$ required for printing the exposure pixels may be successively quickened every block line BL, i.e., every rotation of the cylinder 36 (FIG. 14). With reference to the first block line BL1, output timing for image signals in the second block line BL2 may be quickened by the time Δt than that in the block line BL1, that in relation to the third block line BL3 may be quickened by a time (2·Δt), and that in relation to each of the subsequent block lines BL may be quickened by the time Δt than that in the preceding block line BL. As to the last block line BLk (=BL (m+1)), it is thus necessary to quicken the output timing by a time Δt·(k−1) [=Δt·m] as compared with the block line BL1.

FIGS. 25(a) to 25(l) clearly illustrate such relation. FIGS. 25(a), 25(b), 25(c) and 25(d) show the zero pulse signal $V_{ZP}$, the printing reference clock signal $V_{SLK}$, the trimming mask signal $V_{TM}$ and the reference signal $V_0$ respectively. The trimming mask signal $V_{TM}$ goes high at constant intervals regardless of the block lines BL. FIGS. 25(e), 25(g), 25(i) and 25(k) show the printing clock signals $V_{CLK}$ in the block lines BL1, BL2, BL3 and BLk respectively. Further, FIGS. 25(f), 25(h), 25(j) and 25(l) show data of image signals in relation to the block lines BL1, BL2, BL3 and BLk respectively.

The delay time for the printing clock signal $V_{CLK}$ can be set utilizing the AND gate circuit 15 receiving the trimming mask signal $V_{TM}$ and the printing reference clock signal $V_{SCLK}$ and the delay signal $V_{DLY}$ commanding the delay time, as shown in FIG. 22. The delay signal $V_{DLY}$ provides a delay time $\Delta t_{di}$ ($\Delta t_{d1}, \ldots, \Delta t_{dk-2}, \Delta t_{dk-1}, \Delta t_{dk}$) on the basis of the expression 4 every block line BL1, ..., BL(k−2), BL(k−1), BLk.

According to this embodiment, the image recording apparatus 200 is properly formed and made to carry out proper operations on the basis of the results of the aforementioned study ①', ②' and ③'.

(3) Operation of Image Recording Apparatus 200

Figure 26:
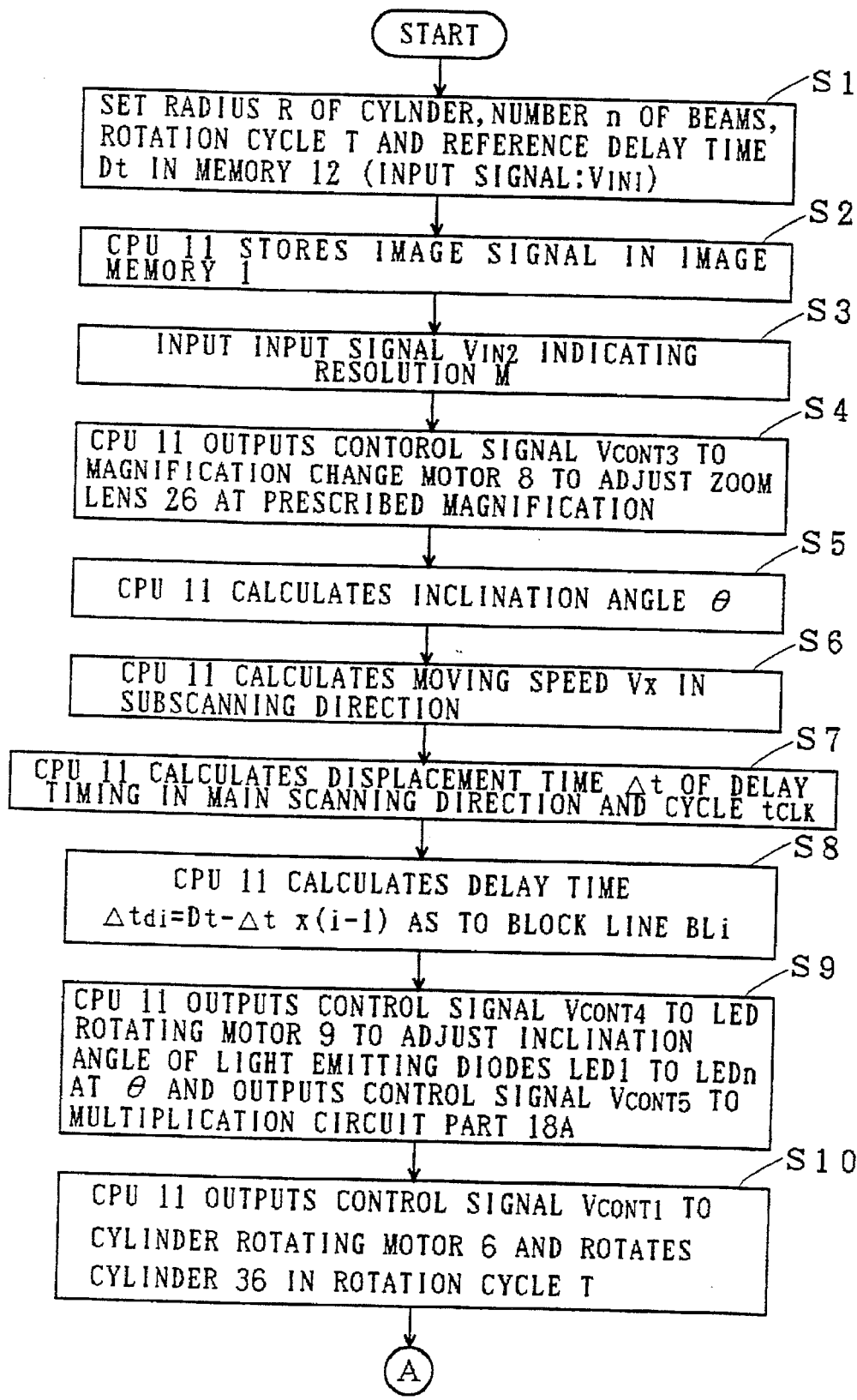
FIG. 26 is a flow chart showing the operation of the image recording apparatus.
Figure 27:
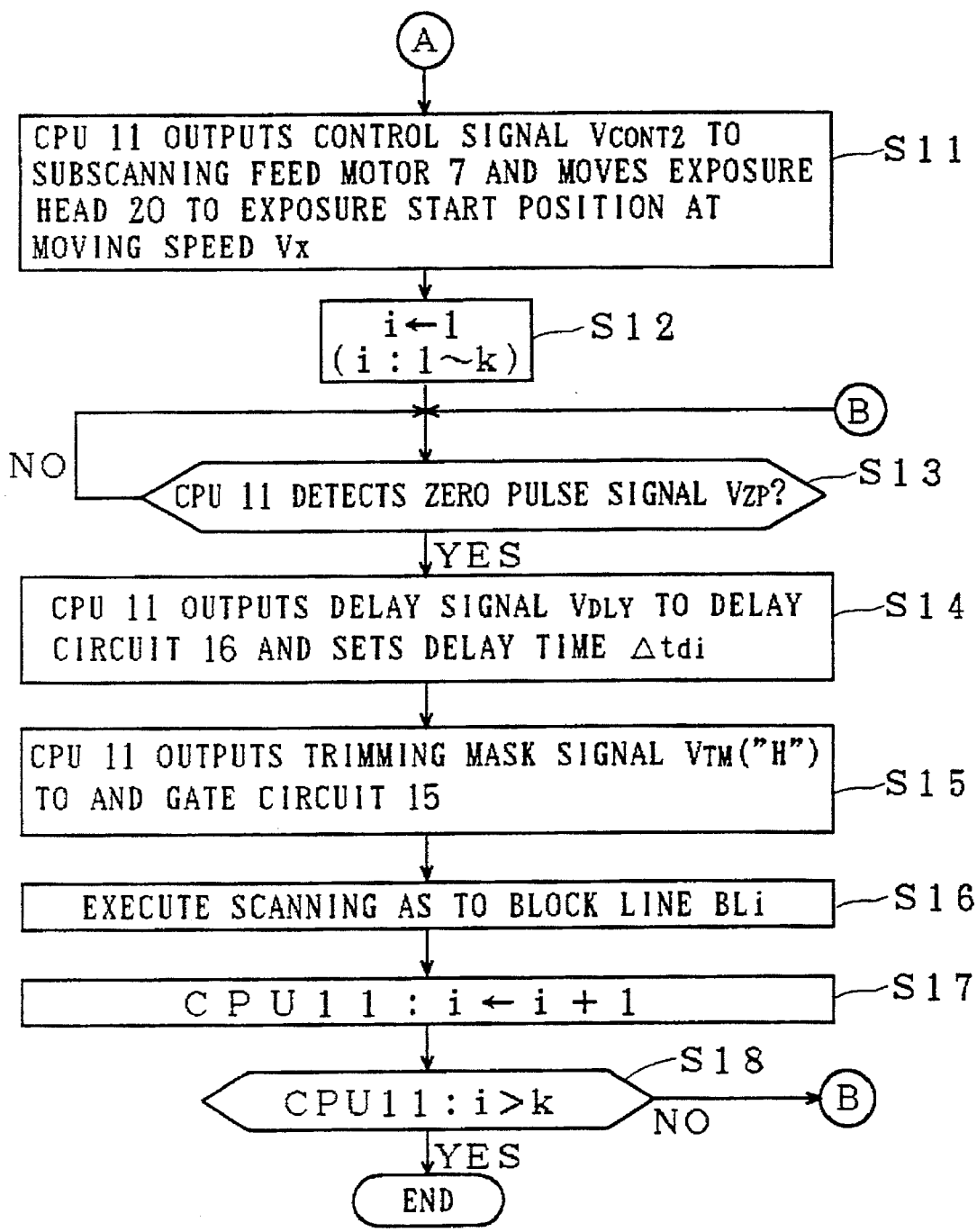
FIG. 27 is a flow chart showing the operation of the image recording apparatus.

An operation procedure of the image recording apparatus 200 (FIG. 14) is now described on the basis of flow charts shown in FIGS. 26 and 27, with reference to FIGS. 14, 19 and 22.

A. Preparation Step

Steps S1 to S10 are steps indicating preparation stages for image recording scanning.

At the step S1, various data which are required for image recording are inputted in the CPU 11 as the input signal $V_{IN1}$. Namely, the radius R of the cylinder 36, the number n (corresponding to the number of the light emitting diodes) of the beams, the rotation cycle T of the cylinder 36 and the reference delay time $D_r$ are inputted from the operating part 17 as the input signal $V_{IN1}$, and stored in the memory 12 through the CPU 11. The reference delay time $D_1$, which indicates a scanning start position of the block line BL1, is so set that the delay time $\Delta t_{dk}$ for the last block line BLk is at zero or a positive value. These data are required in arithmetic processing described later.

At the step S2, the image signal $V_{IMA}$ to be recorded are stored in the image memory 1. This storage operation is processed in the work station 19.

At the step S3, the input signal $V_{IN2}$ indicating the resolution M is inputted by the operating part 17, and the CPU 11 stores the resolution M in the memory 12. This resolution M, which corresponds to the value twice the inverse number of the beam-to-beam pitch d as described above, decides the magnification of the zoom lens 24.

At the step S4, an operator drives a scanning start switch (not shown) provided in the operating part 17, whereby the CPU 11 decides the control signal $V_{CONT3}$ providing a magnification corresponding to the aforementioned resolution M, and outputs the control signal $V_{CONT3}$ to the motor 8. The motor 8 is driven in response to the control signal $V_{CONT3}$, for adjusting the zoom lens 24 to a prescribed magnification.

At the step S5, the CPU 11 calculates the inclination angle θ on the basis of the expression 7. Further, the CPU 11 calculates the moving speed $V_x$ in the subscanning direction X from the expression 11 (step S6), and calculates the displacement time Δt of delay timing in the main scanning direction Y on the basis of the expression 10. Further, the CPU 11 calculates the cycle $t_{CLK}$ on the basis of the expression 8 (step S7).

At the step S8, the CPU 11 calculates a delay time $\Delta t_{di}$ for an i-th block line BLi (1≦i≦k) on the basis of the reference delay time $D_r$, the displacement time Δt of the delay timing and the number m of the block lines stored in the memory 12. This delay time $\Delta t_{tH}$ is calculated as follows:

$$\Delta t_{di} = D_r - \Delta t \times (i-1) \quad (12)$$

At the step S9, the CPU 11 generates the control signal $V_{CONT4}$ providing the calculated inclination angle θ, and outputs the control signal $V_{CONT4}$ to the motor 9. Thus, the LED holder 30 is inclined at the inclination angle θ with respect to the central axis 37. Further, the CPU 11 calculates a multiplication number which implements the printing reference clock signal $V_{SCK}$ having the cycle $t_{CLK}$, and outputs the control signal $V_{CONT5}$ commanding this multiplication number to the multiplication circuit part 18A.

At the step S10, the CPU 11 generates the control signal $V_{CONT1}$ providing the inputted rotation cycle T, and outputs the control signal $V_{CONT1}$ to the motor 6. Thus, the cylinder 36 rotates in the main scanning direction Y in the rotation cycle T.

Further, the CPU 11 generates the control signal $V_{CONT2}$ providing the calculated moving speed $V_X$, and outputs the control signal $V_{CONT2}$ to the motor 7. Thus, the exposure head 20 moves in the subscanning direction X at the moving speed $V_X$ (step S11). Thereafter the rotation speed of the cylinder 36 is stabilized and the position of the exposure head 20 in the subscanning direction X reaches an exposure start position. This reaching is detected by the aforementionted rotary encoder 33. The preparation stage is completed through the aforementioned steps.

B. Scanning Procedure

In order to generalize the following description, it is assumed here that an i-th (i=1, 2, . . . , m) block line BL is to be scanned (step S12). Therefore, the first block line BL1 is first set as the block line BLi. The following steps S13 to S16 show only the scanning procedure in relation to the block line BLi. In practice, however, the CPU 11 carries out the following three procedures in parallel during the steps S13 to S16. First, the CPU 11 writes remaining image signals in relation to the block line BL(i+2) in a corresponding one of the three line memories 2A to 2C provided in the toggle line memory 2', second, the CPU 11 writes a part of image signals in relation to the block line BL (i+3) in one of the remaining two line memories, and third, the CPU 11 reads the image signals $V_{IMA1}$ to $V_{IMAn}$ in relation to the block line BL(i+1) from the remaining one of the line memories storing these signals, to store the same in the corresponding latch circuits $3_l$ to $3_n$. These three operations are described not now but later with reference to timing charts shown in FIGS. 28(a) to 28(k) and 29(a) to 29(k).

First, the CPU 11 detects the zero pulse signal $V_{ZP}$ which is outputted from the rotary encoder 18, so that the process advances to the step S14 (step S13).

At the step S14, the CPU 11 generates the delay signal $V_{DLY}$ providing the delay time $\Delta t_{di}$, and outputs the signal $V_{DLY}$ to the delay circuit 16, to set the delay time $\Delta t_{di}$.

Thereafter the CPU 11 detects that the cylinder 36 reaches a start position of a trimming region from the result of counting of the printing reference clock signal $V_{SCLK}$ at the step S15, and outputs the result of the detection as the trimming mask signal $V_{TM}$. In synchronization with rise of the trimming mask signal $V_{TM}$ from a low level to a high level, the printing reference clock signal $V_{SCLK}$ also rises from a low level to a high level and repeats such rise at the time interval $t_{CLK}$ provided by the expression 8, whereby the reference signal $V_O$ and the AND gate circuit 15, i.e., an undelayed printing clock signal, is at a low level in a period between rise of the zero pulse signal $V_{ZP}$ and that of the trimming mask signal $V_{TM}$ and thereafter obtains the cycle $t_{CLK}$ in synchronization with the printing reference clock signal $V_{SCLK}$.

The CPU 11 also detects an end position of the trimming range, and outputs the result as the trimming mask signal $V_{TM}$ (corresponding to fall from a high level to a low level).

The delay circuit 16 receives the reference signal $V_O$ and the delay signal $V_{DLY}$, produces a signal which is delayed by the delay time $\Delta t_{di}$ with respect to the reference signal $V_O$, and outputs this signal as the printing clock signal $V_{CLK}$.

The printing clock signal $V_{CLK}$ is inputted in the latch circuits $3_l$ to $3_n$ and the P-S converters $4_l$ to $4_n$ respectively. The latch circuits $3_l$ to $3_n$ have the corresponding image signals $V_{IMA l1}$ to $V_{IMn}$ in units of eight bits (for eight pixels) as hereinabove described, so that the latch circuits $3_l$ to $3_n$ output 8-bit image signals in response to the timing of a block signal $V_{DCLK}$ obtained by frequency-dividing the printing clock signal $V_{CLK}$ by 8.

On the other hand, the P-S converters $4_l$ to $4_n$ convert the image signals for 8 pixels to 1-bit (for one pixel) image signals $V_l$ to $V_n$ (serial signals) respectively in response to the printing clock signal $V_{CLK}$. The serial-converted image signals $V_l$ to $V_n$ (1-bit signals) are applied to the light emitting diodes LED1 to LEDn respectively through the driver 5. As the result, the light emitting diodes LED1 to LEDn emits light beams in response to the levels of the driving signals $V_{DR1}$ to $V_{DRn}$, thereby exposing the respective scanning lines belonging to the block line BLi. At this time, the scanning lines belonging to the block line BLi are made spiral since the exposure head 20 moves in the subscannning direction X at the moving speed $V_X$ (step S17).

When scanning in the block line BLi is completed through the aforementionted steps, "1" is added to the variable i at the step S17 and the process returns to the step S13 if i≦k (step S18), to carry out scanning in the next block line BL(i+1). The scanning procedure in the next block line BL(i+1) is also carried out through the steps S13 to S17. The operation of the image recording apparatus 200 is terminated upon completion of scanning in the last block line BLk (k=m+1) (step S18).

In order to further clarify the aforementioned operation procedure, description is now made on the basis of timing charts shown in FIGS. 28(a) to 28(k) and 29(a) to 29(k), on the assumption that the number n of the light emitting diodes is five. FIGS. 28(a) and 29(a) show the image signals $V_{IMA}$ inputted in the memory 2A, while symbol W and numerals 1, 3 and 5 denote the aforementioned numbers of the scanning lines. This also applies to FIGS. 28(b), 28(c) and 28(f) and 29(b), 29(c) and 29(f). FIGS. 28(b), 28(c), 29(b) and 29(c) show the image signals $V_{IMA}$ which are inputted in the memories 2B and 2C respectively, FIGS. 28(d), 28(c), 29(d) and 29(e) show the selector signals $V_{S1}$ and $V_{S2}$ respectively, and FIGS. 28(f) and 29(f) show the image signals $V_{IM1}$ to $V_{IM5}$ successively outputted from the toggle line memory 2' respectively. FIGS. 28(g) and 29(g), 28(h) and 29(h), 28(i) and 29(i), 28(j) and 29(j) and 28(k) and 29(k) show the zero pulse signal $V_{ZP}$, the trimming mask signal $V_{TM}$, the image signal $V_{IMA1}$ outputted from the latch $3_1$ in particular, the printing clock signal $V_{CLK}$, and the time base respectively.

It is assumed that the rotary encoder 18 (FIG. 14) detects a reference position and the zero pulse signal $V_{ZP}$ rises from a low level to a high level at a time $t_{01}$. In synchronization with this rise, the CPU 11 (FIG. 22) outputs the address signals $V_{ADR1}$ and $V_{ADR2}$ to the image memory 1 and the toggle line memory 2' respectively. Then, the selector signal $V_{S1}$ rises from a low level to a high level. In synchronization with this rise of the selector signal $V_{S1}$, the switching circuit S1 shown in FIG. 20 connects the input terminal T1 with the terminal T2, while the switching circuit S2 connects the terminal T14 with the output terminal T16. At this time, the terminals T5 and T6, the terminals T8 and T9 and the terminals T11 and T10 are connected with each other in the switching circuit S3. Consequently, the image signals $V_{IMA}$ (FIG. 20) related to the scanning lines W, W and N1 transmitted from the image memory 1 (FIG. 19) are successively written in the line memory 2A during a period $t_0$ to $t_{01}$.

At the time $t_{01}$, the selector signal $V_{S2}$ rises from a low level to a high level, whereby the switching circuits S4, S5 and S6 shown in FIG. 20 are switched toward the terminals T7, T10 and T12 respectively in synchronization with this rise.

The zero pulse signal $V_{ZP}$ again rises to a high level at a time $t_1$ immediately after single rotation of the cylinder 36, and the selector signal $V_{S1}$ also again rises in response to this. Consequently, the switching circuits S1 and S2 shown in FIG. 20 are switched toward the terminals T3 and T15 respectively, whereby the image signal $V_{IMA}$ related to the scanning line N2 is stored in the line memory 2B. Thereafter the selector signal $V_{S2}$ repeats rise to a high level at times $t_{11}$, $t_{12}$, $t_{13}$ and $t_{14}$, whereby the switching circuits S3, S4 and S5 shown in FIG. 20 carry out switching operations. Consequently, the image signals $V_{IMA}$ related to the scanning lines N3 and N5 are written in the line memory 2A during periods $t_{11}$ to $t_{12}$ and $t_{13}$ to $t_{14}$ respectively. On the other hand, the image signals $V_{IMA}$ related to the scanning lines N4 and N6 are written during the periods $t_{12}$ to $t_{13}$ and $t_{14}$ and $t_{15}$ respectively. Namely, all image signal signals $V_{IMA}$ related to the first block line BL1 are written in the line memory 2A (FIG. 20) during the period $t_0$ to $t_{14}$ in order of the scanning lines W, W, N1, N3 and N5.

At a time $t_2$ when the cylinder 36 (FIG. 14) again completely rotates, the zero pulse signal $V_{ZP}$ again rises to a high level, whereby the selector signal $V_{S1}$ also rises in synchronization with this, so that the switching circuits S1 and S2 shown in FIG. 2 are switched toward the terminals T4 and T13 respectively. Thus, the output terminal of the line memory 2A is connected to the output terminal T16, thereby enabling reading of the image signals $V_{IMA}$ related to the block line BL1 from the line memory 2A. Namely, the respectively image signals $V_{IMA}$ related to the scanning lines W, W, N1, N3 and N5 are successively read during the period $t_2$ to $t_{2S}$, and outputted from the toggle line memory 2' to the corresponding latch circuits $3_t$ to $3_n$ (FIG. 19). Then, the latch circuits $3_t$ to $3_n$ latch the corresponding image signals $V_{IMA}$ at the timing of the address signal $V_{ADR2}$. On the other hand, the selector signal $V_{S2}$ repeats rise to a high level during the period $t_2$ to $t_{2S}$, whereby the line memories 2B and 2C shown in FIG. 20 store the image signals $V_{IMA}$ related to the scanning lines N8 and N10 and those related to the scanning lines N7, N9 and N11 respectively. Thus, all image signals $V_{IMA}$ related to the block line BL2 are written in the line memory 2B over the period $t_1$ to $t_{24}$.

Write and read operations for image signals $V_{IMA}$ related to the respective block lines BL after a time $t_3$ corresponding to a starting time for fourth rotation of the cylinder 36 (FIG. 14) are identical to the aforementioned operations with respect to the period $t_1$ to $t_3$. Therefore, redundant description is omitted.

At the time $t_3$, the rotary encoder 18 (FIG. 14) detects the reference position, and the zero pulse signal $V_{ZP}$ rises from a low level to a high level. Thereafter the trimming mask signal $V_{TM}$ rises from a low level to a high level at a time $t_{TM1}$. The delay time $\Delta t_{d1}$ in the block line BL1 is provided by $\Delta t_{d1}=D_1$, so that the printing block signal $V_{CLK}$ is outputted at a time $t_{1S}$ which is delayed from the time $t_{TM1}$ by the aforementioned delay time $\Delta t_{d1}$. Thus, the image signals related to the scanning lines W, W, N1, N3 and N5 are read from the respective latch circuits $3_1$ to $3_5$, converted to serial signals, and applied to the respective light omitting diodes LED1 to LED5 through the driver 5 (FIG. 19). Consequently, scanning/exposure in the block line BL1 is started from a time $t_{1S}$, and this scanning/exposure is terminated at a time $t_{1E}$.

At a time $t_4$ when the cylinder 36 (FIG. 14) rotates, the zero pulse signal $V_{ZP}$ again rises from a low level to a high level and the trimming mask signal $V_{TM}$ again rises from a low level to a high level at a time $t_{TM2}$, whereby the printing clock signal $V_{CLK}$ rises to a high level at a time $t_{2S}$ which is delayed from the time $t_{TM2}$ by a delay time $\Delta t_{d2}$ ($\Delta t_{d2}<\Delta t_{d1}$) and repeats high and low levels in the cycle $t_{CLK}$. The block line BL2 is scanned from a time $t_{2S}$ to a time $t_{2E}$. The delay time $\Delta t_{d2}$ is provided by $\Delta t_{d2}=D_r-\Delta_r$. This also applies to scanning of the respective block lines BL following the block line BL3. In this case, respective delay times $\Delta t_{d3}$ to $\Delta t_{dk-1}$ satisfy the relation of $\Delta t_{d3}>\Delta t_{d4}>\ldots>\Delta t_{dk-1}$, and the delay time for the last block line BLk is $\Delta t_{dk}=D_r-\Delta t \cdot (k-1)$ $=D_r-\Delta t \cdot m$.

The reference delay time, i.e., the delay time $D_r$ for the block line BL1 must be set at a value exceeding $\Delta t \cdot (k-1)$. Further, the number k of the block lines and the displacement time $\Delta k$ of the delay timing are varied with the size of the image forming region in the subscanning direction X, the inclination angle $\theta$ and the like, and hence the reference delay time $D_r$ may be set in consideration of these points, or may be varied in response to changes thereof.

Figure 30:
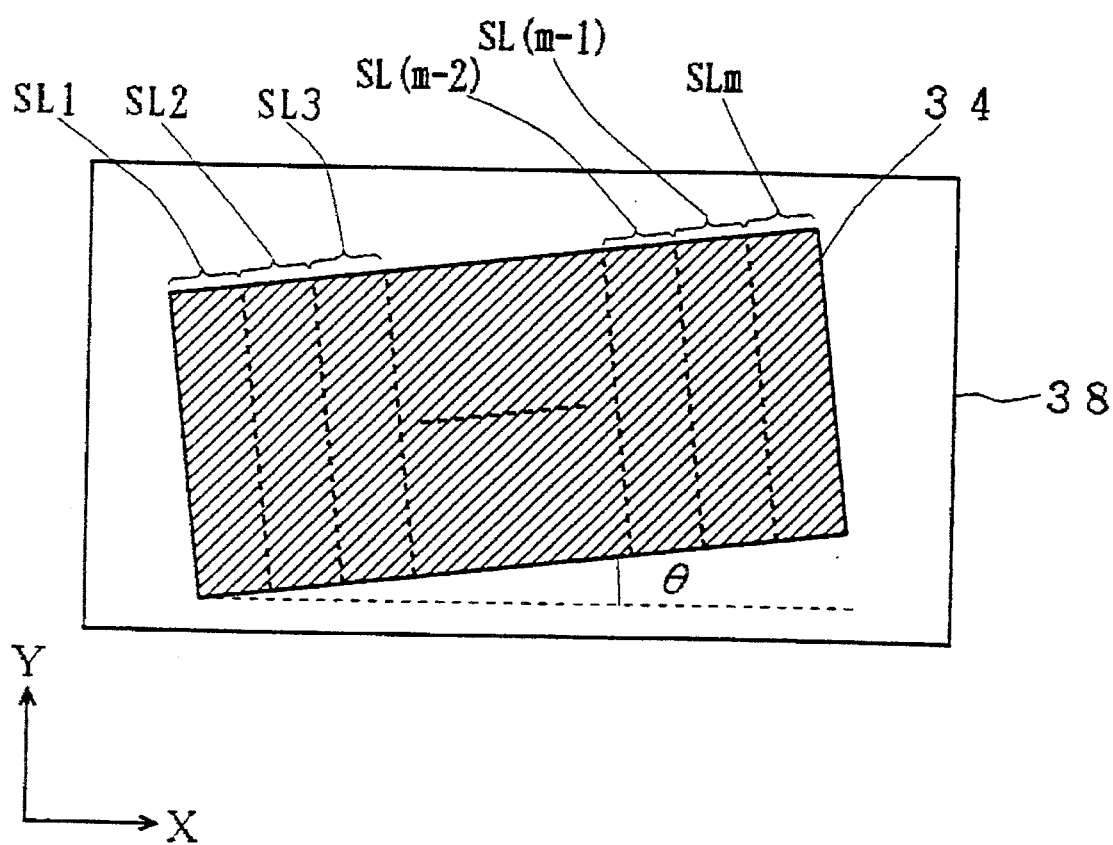
FIG. 30 illustrates an image forming region as obtained.

Through the aforementioned structure and procedure, it is possible to carry out scanning of m by n scanning lines in the main scanning direction while the moving speed $V_x$ and the amount $\Delta y$ of displacement are made properly controllable to be capable of coping with change of the magnification, whereby it is possible to record images with no displacement between boundaries between adjacent scanning lines areas SL. Further, the so-called interlace scanning system is applied to the spiral multibeam scanning, whereby odd scanning lines are first exposed in each scanning line area SL so that even scanning lines are exposed by scanning of a next block line BL, or the even scanning lines are first exposed so that the odd scanning lines are exposed by scanning of the next block line BL. Therefore, a certain scanning line area SL is not simultaneously exposed along all scanning lines belonging thereto. Thus, even if the rotation cycle T or the moving speed $V_x$ slightly fluctuates during scanning, image irregularity is irregularly caused and such irregular portions sometimes cancel with each other, whereby such image irregularity is made inconspicuous on the overall images which are recorded in the image forming region and it is possible to prevent quality deterioration of the recorded images. The image forming region 34 as obtained is inclined at the inclination angle $\theta$ with respect to the central axis 37 (FIG. 14) of the cylinder 36, as shown in FIG. 30. Although the image forming region 34 is thus inclined, no distortion is caused in the images formed in this region 34. Even if the rotation cycle of the rotator or the moving speed of the light emitting means in the subscanning direction fluctuates, it is possible to sufficiently reduce image irregularity caused in boundaries between adjacent scanning line areas for recording images with no quality deterioration according to the second embodiment of the present invention.

In particular, the inclination angle $\theta$ is decided on the basis of the resolution. Also when the resolution is changed, therefore, it is possible to correctly incline images formed by n light beams at a proper inclination angle $\theta$ corresponding to the new resolution with respect to the subscanning direction.

Further, the moving speed $V_x$ is decided on the basis of the resolution, whereby it is possible to regularly move the light emitting unit at a proper moving speed $V_x$ corresponding to new resolution also when the resolution is changed.

In addition, the time $\Delta t$ is decided on the basis of the resolution, whereby the application time of each image signal can be regularly quickened by a proper time $\Delta t$ corresponding to new resolution also when the resolution is changed and it is possible to prevent displacement between adjacent scanning line areas.

Further, it is possible to incline the direction of arrangement of imaging of n light beams at the inclination angle $\theta$ with respect to the subscanning direction by simply mechanically rotation the light emitting unit itself.

III. Modifications

① In each of the first and second embodiments, the moving speed $V_x$ and the like are adjusted in response to the value of the resolution M on the premise that the rotation cycle T of the cylinder 36 is at a constant value (rotation speed is constant, with slight fluctuation about the constant value). Alternatively, a method of controlling the rotation cycle T of the cylinder is also possible in the present invention since the moving speed of the exposure head 20 (FIG. 1 or 14) may be adjusted with respect to the rotation speed of the cylinder 36. In other words, it is possible to change the rotation cycle T in response to change of the resolution M while maintaining the moving speed $V_X$ at a constant value (see expression 5 or 11). In this case, the rotation cycle T is changed in response to the resolution M, and it is necessary to also change the time interval $t_{CLK}$ and the displacement time $\Delta t$ of the delay timing, as clearly understood from the expressions 2 and 4 or 8 and 10.

② While the reference signal $V_0$ is delayed by the delay circuit 16 (FIG. 5 or 22) from the start value indicated by the trimming mask signal $V_{TM}$ by the delay time $t_{d1}$ for producing the printing clock signal $V_{CLK}$ in each of the first and second embodiments, the present invention is not restricted to this. For example, the following delay method is also available: It is assumed that k represents a value obtained by dividing the delay time $\Delta t_{di}$ in the block line BLi by the cycle $t_{CLK}$ of the printing clock signal $V_{CLK}$, and $t_{EXT}$ represents the current remainder. A time required for a lapse of that corresponding to the aforementioned value k from a time (time for detecting the start position) when the trimming mask signal $V_{TM}$ rises from a low level to a high level is measured by counting the pulse number of the reference clock signal $V_{SCLK}$, to output the trimming mask signal $V_{TM}$ to the AND gate circuit after the counting while outputting a delay signal indicating the time $t_{EXT}$ corresponding to the remainder to the delay circuit 16 shown in FIG. 5 or 22, thereby outputting the printing clock signal $V_{CLK}$ from the delay circuit 16. In this case, the delay circuit 16 may have a maximum delay time corresponding to the time $t_{CLK}$, whereby the same can be implemented by a low-priced circuit.

Figure 31:
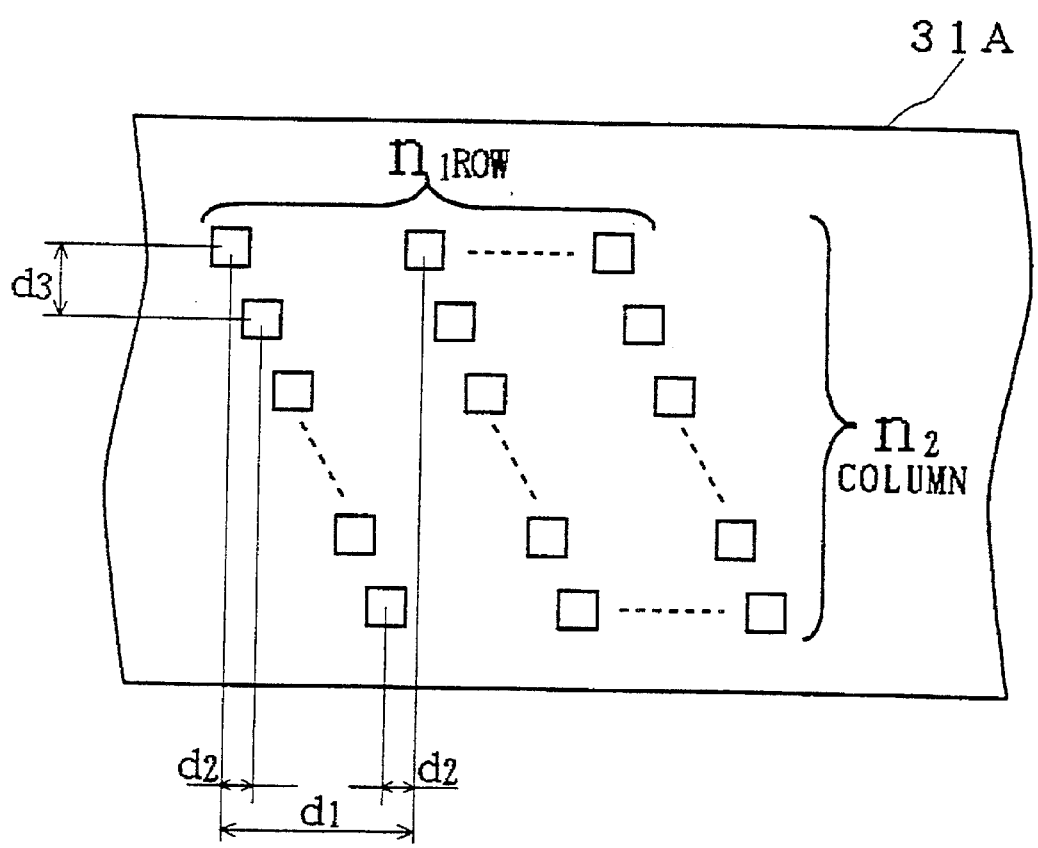
FIG. 31 illustrates an exemplary structure of an LED holder.

③ While the light emitting diodes LED1 to LEDn are aligned with each other in each of the first and second embodiments as shown in FIG. 2 or 17, the light emitting diodes are not restricted to such arrangement. For example, $n_1$ by $n_2$ light emitting diodes may be arranged in a staggered manner, as shown in FIG. 31. A central portion 31A of the LED holder 30 shown in FIG. 1 or 14 comprises a light emitting diode array in which $n_2$ light emitting diodes aligned with each other at intervals $d_1$ are arranged to be successively displaced at intervals $d_2$ by $n_2$ columns along the central axis 37 (FIG. 1 or 14) of the cylinder 36. It is assumed that the intervals between the respective columns are $d_3$. In this case, $n_1$ by $n_2$ exposure pixels must be aligned with each other when images are formed on the film 35 shown in FIG. 1 or 14, and hence it is necessary to relatively shift light emission timing of each column on the basis of the interval $d_3$. This point can be implemented by additionally providing a further latch and a further delay circuit.

Figure 32:
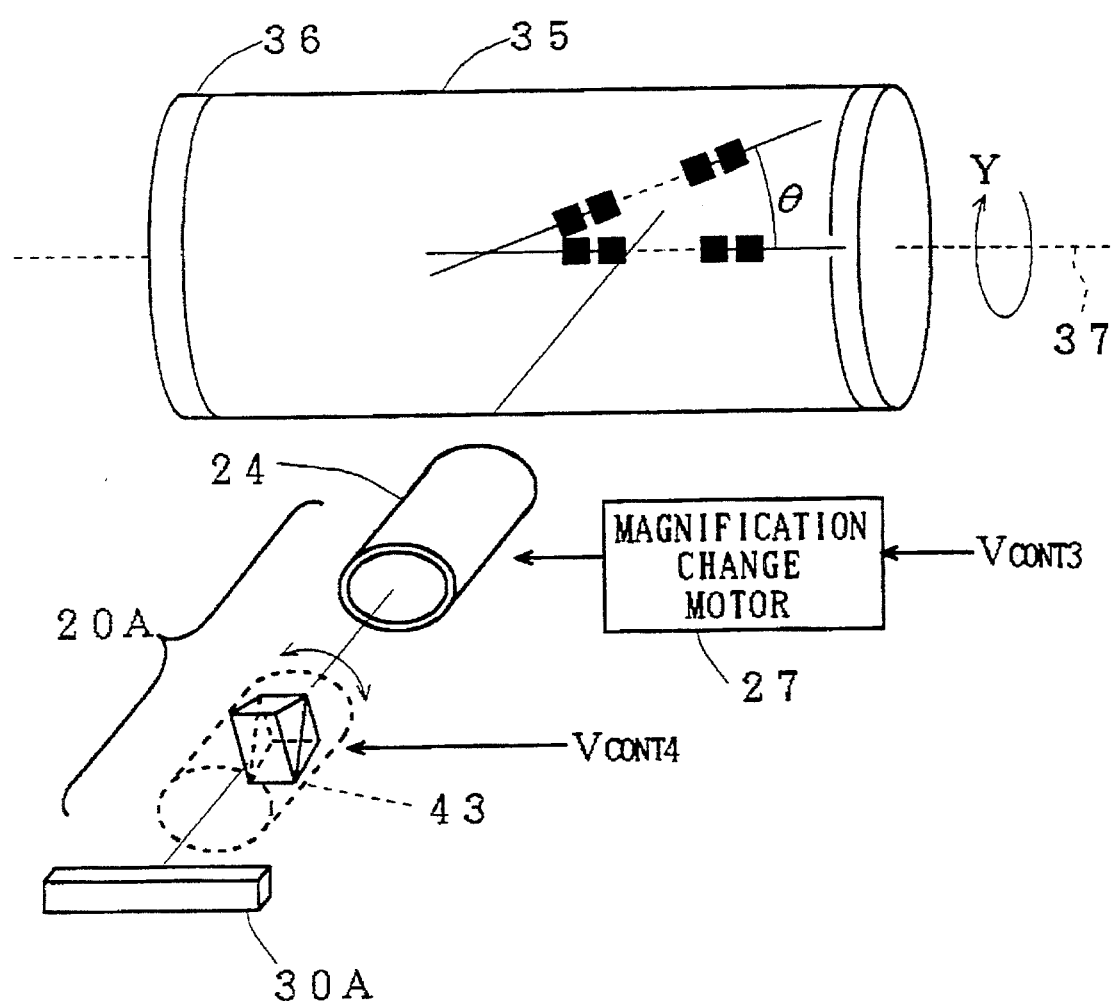
FIG. 32 illustrates an optical method for inclining the direction of arrangement of exposure pixels.
Figure 33A:
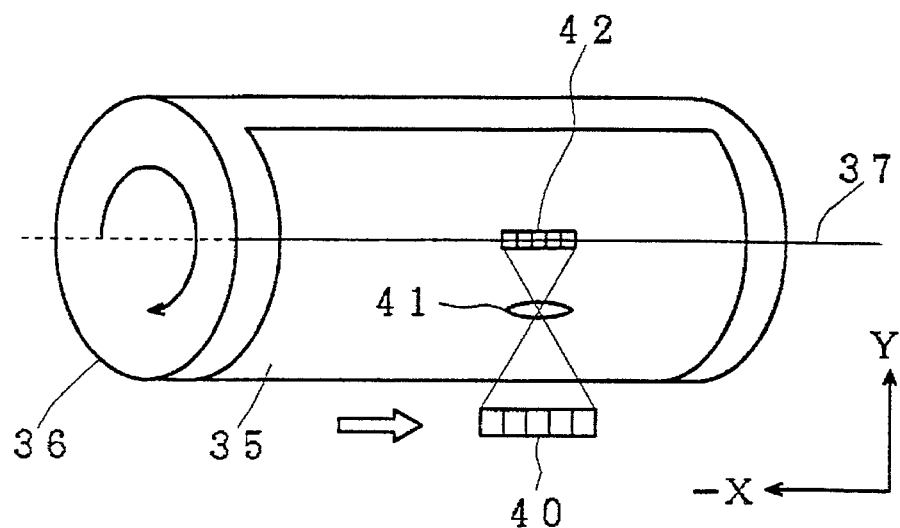
FIGS. 33(a) and 33(b) are perspective views showing exemplary prior art.
Figure 33B:
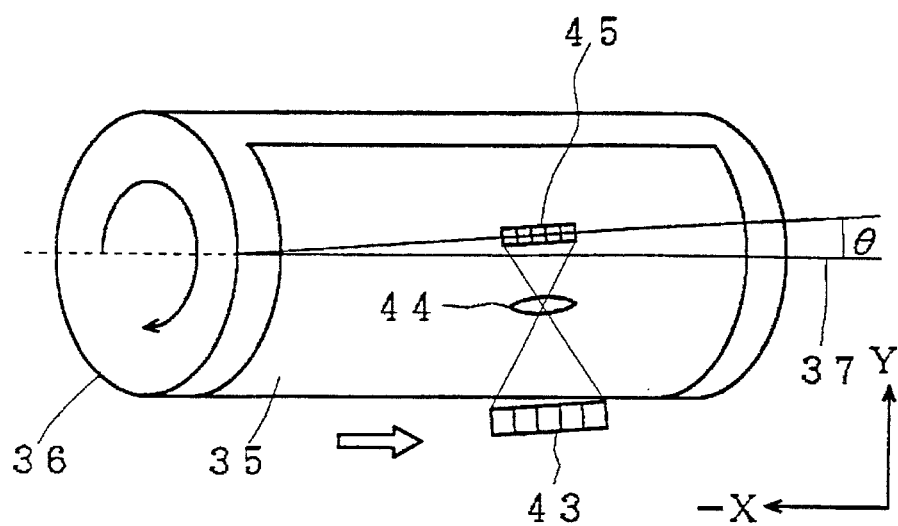
Figure 34A:
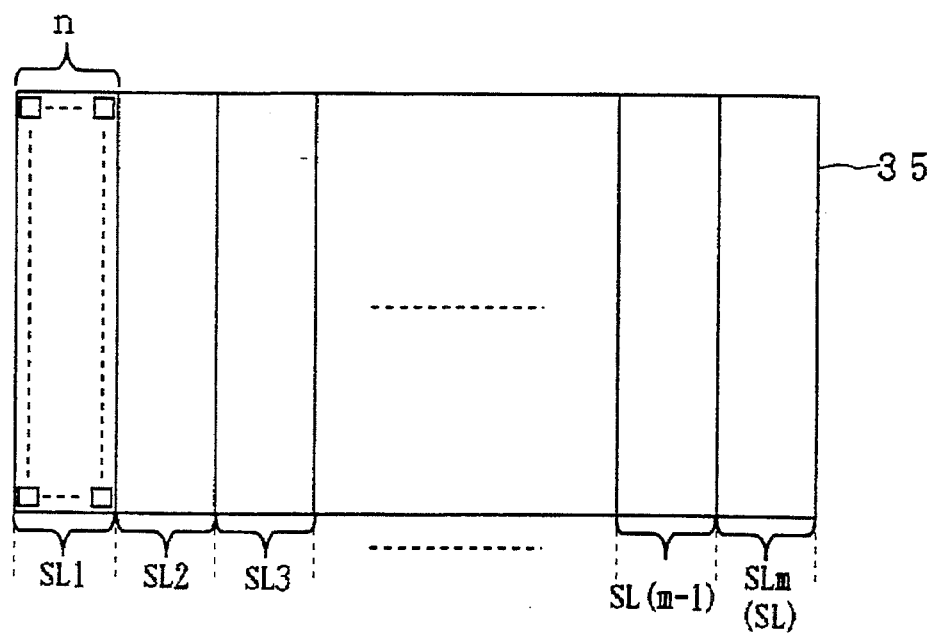
FIGS. 34(a) and 34(b) illustrate a problem in the prior art.
Figure 34B:
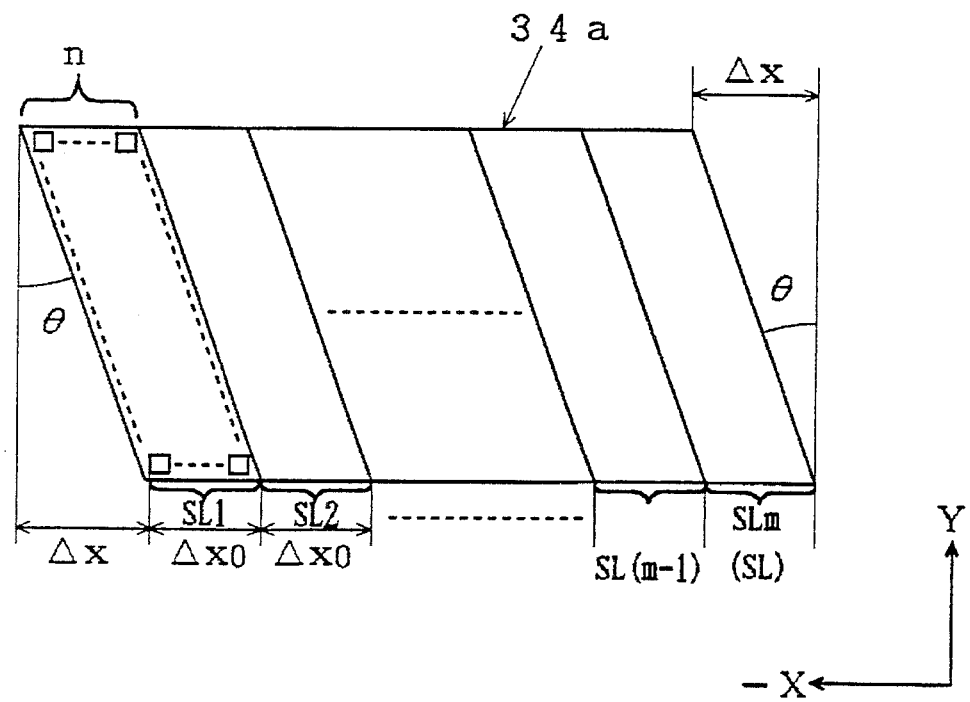
Figure 35A:
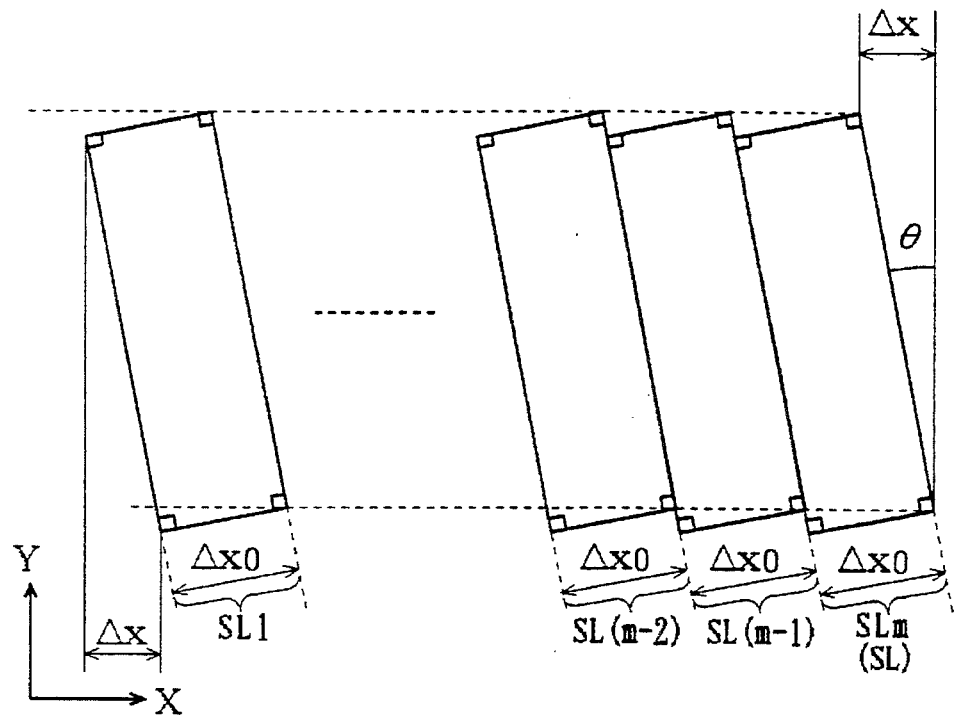
FIGS. 35(a) and 35(b) illustrate another exemplary prior art.
Figure 35B:
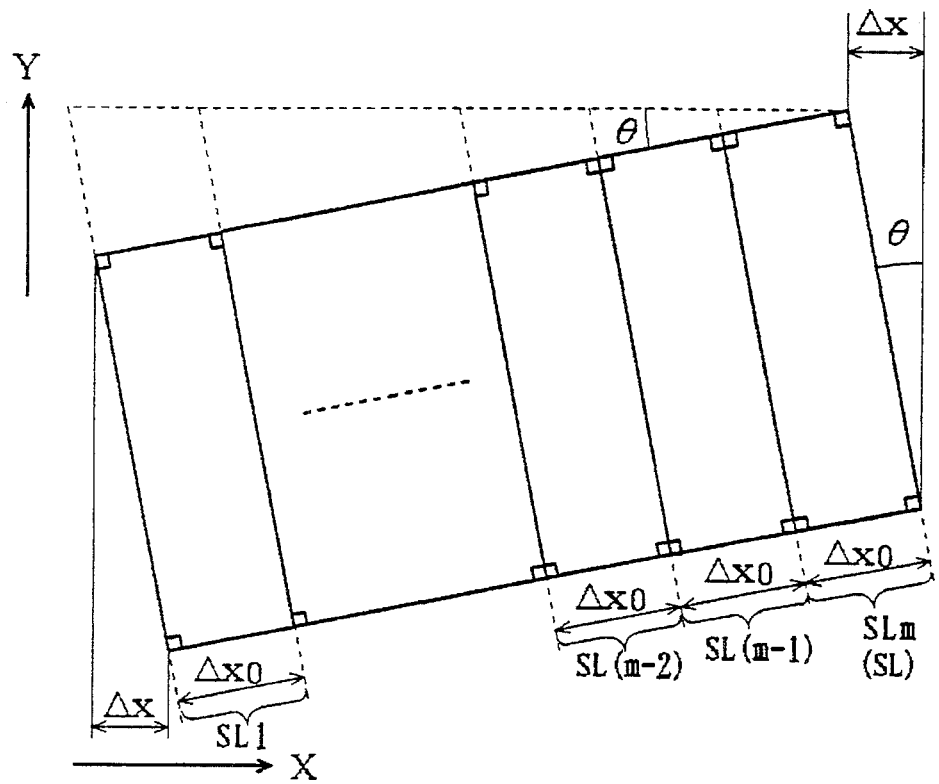

④ In each of the first and second embodiments, a method of mechanically rotating the LED holder 30 is employed as shown in FIG. 1 or 14, in order to incline the direction of arrangement of the exposure pixels at the inclination angle θ. However, the present invention is not restricted to such a mechanical method, but is also implementable by an optical method, as follow:

FIG. 32 is a perspective view showing an example of such an optical method. According to this modification, an exposure head 20A comprises an LED holder 30 having n light emitting diodes which are arranged to be in parallel with a central axis 37, and an image rotating prism (image rotator) 43 which is arranged between the LED holder 30A and a zoom lens 24. The image rotating prism 43 rotates in response to a control signal $V_{CONT4}$ which is outputted by a CPU 11. When the image rotating prism 43 rotates at an angle α, for example, the direction of arrangement of the exposure pixels which are imaged on a film 35 through the image rotating prism 43 and the zoom lens 24 is inclined at an angle 2α with respect to the central axis 37. In order to incline the direction of arrangement of the exposure pixels (direction of inclination of scanning line areas) at an angle θ with respect to the central axis 37, the image rotating prism 43 may be controlled to rotate at an angle θ/2.

In order to incline block lines at the angle θ, the central axis 37 of the cylinder 36 shown in FIG. 1 or 14 itself may be inclined.

⑤ Although the light emitting elements are formed by the light emitting diodes in each of the aforementioned embodiments, the light emitting diodes may be replaced by laser diodes, for example. In this case, apertures are preferably provided on outgoing sides of the respective diodes, to adjust diameters of light beams which are emitted from the respective laser diodes.

⑥ The light emitting elements may be formed by gas lasers such as He-Ne lasers, so that light beams emitted from the gas lasers are introduced into a modulator such as an acoustic optical element and the modulated light beams outgoing from the modulator are introduced into the aforementioned image rotating prism. In this case, binarized image signals are applied to the modulator.

⑦ As hereinabove described, the inclination angle θ, the moving speed $V_X$ and the delay time $\Delta t$ are decided by the resolution M, the number n of the light beams, the rotation cycle T and the radius R of the rotator, whereby various data of the inclination angle θ, the moving speed $V_X$ and the delay time $\Delta t$ with respect to each resolution M may be previously stored in the memory so that the aforementioned data such as the inclination angle θ are read every change of the resolution M for controlling the inclination angle of the direction of arrangement of imaging of the light beams and the like.

While the invention has been shown and described in detail, the foregoing description is in all aspects illustrative and not restrictive. It is therefore understood that numerous modifications and variations can be devised without departing from the scope of the invention.

What is claimed is:

1. A spiral scanning image recording apparatus comprising:

(a) a rotator continuously rotating in a main scanning direction;

(b) a photosensitive material being mounted on a major surface of said rotator;

(c) means for storing an image signal;

(d) means being movable in a subscanning direction being perpendicular to said main scanning direction for emitting a plurality of light beams being modulated in response to said image signal being outputted from said (c) means;

(e) means for inputting an input resolution signal corresponding to a number of exposure pixels to be imaged on said photosensitive material, to be finally included per unit length in a direction of arrangement thereof;

(f) means for deciding a magnification, an inclination angle between a direction of arrangement of imaging of said plurality of light beams on said photosensitive material and said subscanning direction and a moving speed of said (d) means in said subscanning direction with respect to a rotation speed of said rotator, said magnification and said inclination angle and said moving speed corresponding to said resolution on a basis of said input resolution signal, for generating a magnification control signal, an inclination angle control signal and a moving speed control signal as decided respectively;

(g) means being movable in said subscanning direction for imaging said plurality of light beams on said photosensitive material in response to said magnification control signal;

(h) means being movable in said subscanning direction for inclining said direction of arrangement of said plurality of light beams being emitted from said (d) means with respect to said subscanning direction in response to said inclination angle control signal so that said direction of imaging arrangement of said plurality of light means is inclined at said inclination angle with respect to said subscanning direction; and (i) means for continuously moving said (d) means with said (g) means and said (h) means in said subscanning direction at said moving speed in response to said moving speed control signal.

2. A spiral scanning image recording apparatus in accordance with claim 1, further comprising:

(j) means for deciding a time $\Delta t$ required for rotating said rotator by a length of a cross-directional size of a scanning region, being a region including a plurality of scanning lines corresponding to respective regions on said photosensitive material being exposed by respective ones of said plurality of light beams during single rotation of said rotator, in said main scanning direction on the basis of said input resolution signal, and (k) means for quickening output timing of said image signal from said (c) means by said time $\Delta t$ being decided by said (j) means every rotation of said rotator.

3. A spiral scanning recording apparatus in accordance with claim 2, wherein said rotator includes a cylindrical body having a radius R, said (e) means comprises:

(e-1) means for inputting a first input signal representing said resolution as resolution M, and (e-2) means for inputting a second input signal representing said radius R of said rotator and a number n of said plurality of light beams, and said (f) means comprises:

(f-1) means for receiving said first and second input signals for deciding said inclination angle $\theta$ as a function of the following relational expression:

$$\theta = \sin^{-1}[n/(2\pi R - M)]$$

and generating said inclination angle control signal representing said inclination angle as $\theta$.

4. A spiral scanning image recording apparatus in accordance with claim 3, wherein said (e) means further comprises:

(e-3) means for inputting a third input signal representing a rotation cycle T of said rotator, and said (f) means further comprises:

(f-2) means for receiving said first input signal, said second input signal, said third input signal and a data signal indicating said inclination angle $\theta$ being outputted from said (f-1) means for deciding said moving speed $V_x$ as a function of the following relational expression:

$$V_x = n/(M \cdot T \cdot \cos\theta)$$

and generating said moving speed control signal commanding said moving speed $V_x$.

5. A spiral scanning image recording apparatus in accordance with claim 4, wherein said (j) means comprises:

(j-1) means for receiving said first input signal, said second input signal, said third input signal and said data signal indicating said inclination angle $\theta$ being outputted by said (f-1) means, for deciding said time $\Delta t$ as a function of the following relational expression:

$$\Delta t = n \cdot T \cdot \sin\theta / (2\pi R - M).$$

6. A spiral scanning image recording apparatus in accordance with claim 5, wherein said (d) means comprises:

(d-1) a plurality of light emitting elements for emitting said light beams by said image signal serving as a driving signal therefor, and said (k) means is means for quickening timing for applying said image signal being read from said (c) means to corresponding said plurality of light emitting elements by said time $\Delta t$ every rotation of said rotator subsequent to said reference rotation, and (k-2) means for reading said image signal from said (c) means in response to said clock signal every rotation of said rotator for applying said image signal to corresponding said plurality of light emitting elements respectively.

7. A spiral scanning image recording apparatus in accordance with claim 6, wherein said (k) means further comprises:

(k-1) means for generating a clock signal for quickening a reference delay time Dt, being a time between starting of single rotation of said rotator serving as reference rotation and a level change thereof in said rotation of said rotator, by said time $\Delta t$ every rotation of said rotator subsequent to said reference rotation, and (k-2) means for reading said image signal from said (c) means in response to said clock signal every rotation of said rotator for applying said image signal to corresponding said plurality of light emitting elements respectively.

8. A spiral scanning image recording apparatus in accordance with claim 7, wherein said (e) means further comprises:

(e-4) means for inputting a fourth input signal representing said reference delay time Dt, and said (k-1) means comprises:

(k-1A) means for generating a reference clock signal providing reference timing for successively reading said image signal from said (c) means, (k-1B) means for receiving said fourth input signal and a data signal providing said time $\Delta t$ being outputted from said (j-1) means for deciding a delay time $\Delta t_{di}$ providing a starting time of level change of said clock signal in i-th ($i \geq 1$) rotation of said rotator on the assumption that said reference rotation of said rotator is the first rotation as a function of the following relational expression:

$$\Delta t_{di} = D_t - \Delta t \times (i-1)$$

and generating a delay control signal commanding said delay time $\Delta t_{di}$ every rotation of said rotator, and (k-1C) means for receiving said reference clock signal and said delay control signal every rotation of said rotator and delaying said reference clock signal by said delay time $\Delta t_{di}$ being provided by said delay control signal, thereby generating said clock signal.

9. A spiral scanning image recording apparatus in accordance with claim 8, wherein said (k-1A) means comprises:

(k-1A-1) means for receiving said first input signal, said second input signal, said third input signal and a data signal indicating said inclination angle θ being outputted from said (f-1) means for deciding a cycle $t_{CLK}$ of said reference clock signal corresponding to a unit time of a time interval for emitting said light beams from respective said light emitting elements as a function of the following relational expression:

$t_{CLK} = T \cdot \cos\theta / (2\pi R - M)$ for generating a fourth control signal representing said cycle $t_{CLK}$, and (k-1A-2) means for generating said reference clock signal having said cycle $t_{CLK}$ in response to said fourth control signal.

10. A spiral scanning image recording apparatus in accordance with claim 9, wherein said (f) means further comprises:

(f-3) means for deciding such said magnification that the relation between a center-to-center distance d between exposure pixels of said plurality of light beams being imaged on said photosensitive material and said resolution M is provided in the following relational expression:

$d = 1/M$ and outputting said magnification control signal representing said magnification to said (g) means.

11. A spiral scanning image recording apparatus in accordance with claim 9, wherein the number of said light emitting elements provided in said (d-1) means is an odd number of at least 3, and said (f) means further comprises:

(f-3) means for deciding such said magnification that the relation between a center-to-center distance d between exposure pixels of said plurality of light beams being imaged on said photosensitive material and said resolution M is provided in the following relational expression:

$d = 2/M$ and outputting said magnification control signal representing said magnification to said (g) means.

12. A spiral scanning image recording apparatus in accordance with claim 1, wherein said (f) means further comprises:

(f-1) means for deciding such said magnification that the relation between a center-to-center distance d between exposure pixels of said plurality of light beams being imaged on said photosensitive material and said resolution M is provided in the following relational expression:

$d = 1/M$ and generating said magnification control signal representing said magnification, and (f-2) means for deciding said moving speed on the basis of said input resolution signal so that each of said (d) means and said (h) means is movable during single rotation of said rotator by a distance obtained by multiplying a cross-directional size of a scanning region, being a region including a plurality of scanning lines corresponding to respective regions of said photosensitive material being exposed by respective ones of said plurality of light beams in single rotation of said rotator, by an inverse number of the cosine of said inclination angle.

13. A spiral scanning image recording apparatus in accordance with claim 2, wherein the number of said light beams being emitted from said (d) means is an odd number of at least 3, and said (f) means further comprises:

(f-1) means for deciding such said magnification that the relation between a center-to-center distance d between exposure pixels of said plurality of light beams being imaged on said photosensitive material and said resolution M is provided in the following relational expression:

$d = 2/M$ and generating said magnification control signal representing said magnification, and (f-2) means for deciding said moving speed on the basis of said input resolution signal so that each of said (d) means, said (g) means and said (h) means is movable during single rotation of said rotator by a distance provided by (said cross-direction size of said scanning region) ×[n/(2n−1)]×(inverse number of the cosine of said inclination angle).

14. A spiral scanning image recording apparatus in accordance with claim 1, wherein said (d) means is arranged with respect to said (g) means so that said plurality of light beams as emitted are incident upon said (g) means in such a state that respective beam axes thereof are in parallel with an optical axis of said (g) means, and (h-1) means for rotating said (d) means about an axis being parallel to said optical axis of said (g) means at said inclination angle in response to said inclination angle control signal.

15. A spiral scanning image recording apparatus in accordance with claim 14, wherein said (d) means, said (g) means and said (h) means are arranged in an exposure head being movable in said subscanning direction, and said (i) means comprises:

(i-j) means for moving said exposure head in said subscanning direction at said moving speed in response to said moving speed control signal.

16. A spiral scanning image recording apparatus in accordance with claim 1, wherein said (d) means is arranged with respect to said (g) means to that said plurality of light beams as emitted are incident upon said (g) means in such a state that respective beam axes thereof are in parallel with an optical axis of said (g) means, and (h-1) means being arranged on said optical axis of said (g) means located between said (d) means and said (g) means for rotating said plurality of light beams being emitted from said (d) means about an axis being parallel to said optical axis of said (g) means at said inclination angle in response to said inclination angle control signal and introducing said plurality of light beams into said (g) means.

17. A spiral scanning image recording apparatus in accordance with claim 16, wherein said (f) means further comprises:

(f-1) means for receiving said inclination angle control signal and generating a half angle control signal for providing an angle half said inclination angle, and said (h-1) means comprises:

(h-1-1) means for rotating about an axis being parallel to said optical axis of said (g) means at said angle being half said inclination angle in response to said half angle control signal and reflecting said plurality of light beams as being incident.

18. A spiral scanning image recording apparatus in accordance with claim 17, wherein said (d) means, said (g) means and said (h) means are arranged in an exposure head being movable in said subscanning direction, and said (i) means comprises:

(i-1) means for moving said exposure head in said subscanning direction at said moving speed in response to said moving speed control signal.

19. An image recording method of recording an image by spirally scanning a photosensitive material, being mounted on a first major surface of a rotator continuously rotating in a main scanning direction, with a plurality of light beams being modulated by an image signal, said method comprising:

(a) a step of arranging a light emitting unit emitting said plurality of light beams, an arrangement direction control unit being capable of inclining an arrangement direction of said plurality of light beams emitted from said light emitting unit, corresponding to an arrangement direction of an image being formed by applying said plurality of light beams onto a virtual screen, with respect to a subscanning direction being perpendicular to said main scanning direction, and an imaging unit, being variable in magnification, for imaging said plurality of light beams being inclined in arrangement by said arrangement direction control unit on said photosensitive material, on a second major surface of an exposure head having said second major surface and being movable in said subscanning direction;

(b) a step of preparing a memory unit storing said image signal;

(c) a step of inputting an input signal commanding resolution corresponding to a number of exposure pixels, to be imaged on said photosensitive material, to be included per unit length in an arrangement direction thereof;

(d) a step of setting a magnification value corresponding to said resolution in said imaging unit on the basis of said input signal;

(e) a step of electrically deciding an inclination angle, corresponding to an intersection angle between said arrangement direction of said plurality of light beams and said subscanning direction, and a moving speed of said exposure head, said inclination angle and said moving speed corresponding to said resolution, on the basis of said input signal for generating first and second control signals providing said inclination angle and said moving speed respectively;

(f) a step of controlling said arrangement direction control unit for inclining said arrangement direction of said plurality of light beams with respect to said subscanning direction at said inclination angle on the basis of said first control signal;

(g) a step of moving said exposure head in said subscanning direction at said moving speed on the basis of said second control signal; and (h) a step of reading said image signal from said memory unit and applying said image signal to said light emitting unit every rotation of said rotator, thereby scanning said photosensitive material with modulated said plurality of light beams.

20. An image recording method in accordance with claim 19, wherein said (e) step comprises:

(e-1) a step of electrically deciding said inclination angle and said moving speed on the basis of said input signal, and (e-2) a step of electrically deciding a time $\Delta t$ required for rotating said rotator by a length of a cross-directional size of a scanning region, being a region including a plurality of scanning lines corresponding to regions on said photosensitive material being exposed by respective said plurality of light beams, in said main scanning direction every rotation of said rotator on the basis of said input signal, and said (h) step comprises:

(h-1) a step of quickening timing for reading said image signal from said memory unit by said time $\Delta t$ every rotation of said rotator.

21. An image recording method in accordance with claim 20, wherein said rotator includes a cylindrical body of a radius R having a side surface corresponding to said first major surface, said (c) step comprises:

(c-1) a step of inputting a first input signal representing said resolution M, and (c-2) a step of inputting a second input signal representing said radius R of said rotator and the number n of said light beams, and said (c-1) step includes:

(e-1-1) a step of electrically calculating said inclination angle $\theta$ being provided by the following relational expression:

$$\theta = \sin^{-1}[n/(2\pi R-M)]$$

said (e-1) step includes:

(e-1-1) a step of electrically calculating said inclination angle $\theta$ being provided by the following relational expression:

$$\theta = \sin^{-1}[n/(2\pi R-M)]$$

on the basis of said first and second input signals.

22. An image recording method in accordance with claim 21, wherein said (c) step further comprises:

(c-3) a step of inputting a third input signal representing a rotation cycle T of said rotator, and said (e-1) step further includes:

(e-1-2) a step of electrically calculating said moving speed $V_x$ being provided by the following relational expression:

$$V_x = n/(M \cdot T \cdot \cos\theta)$$

on the basis of said first to third input signals and said first control signal providing said inclination angle θ being calculated in said (e-1-1) step.

23. An image recording method in accordance with claim 22, wherein said (e-2) step includes:

(e-2-1) a step of electrically calculating said time Δt being provided by the following relational expression:

$$\Delta t = n - T - \sin\theta / (2\pi R - M)$$

on the basis of said first to third input signals and said first control signal providing said inclination angle θ being calculated in said (e-1-1) step.

24. An image recording method in accordance with claim 23, wherein said light emitting unit has light emitting elements receiving said image signal as a driving signal and emitting said plurality of light beams, and said (h-1) step is a step of quickening timing for applying said image signal being read from said memory unit to corresponding said light emitting element by said time Δt every rotation of said rotator.

25. A image recording method in accordance with claim 24, wherein said (c) step further comprises:

(c-4) a step of inputting a fourth input signal representing a reference delay time $D_r$ being a time from starting of single rotation of said rotator to level change thereof in said single rotation, said (e-2) step further comprises:

(c-2-2) a step of electrically calculating a delay time $\Delta t_{di}$ corresponding to a time interval from starting of single rotation of said rotator to reading of said image signal every said single rotation of said rotator on the basis of the following relational expression:

$$\Delta t_{di} = D_r - \Delta t \times (i-1)$$

where symbol i represents i-th rotation of said rotator on the assumption that single rotation of said rotator serving as reference rotation is the first rotation, and said (h-1) step comprises:

(h-1-1) a step of generating a clock signal being delayed from starting of a single rotation of said rotator by said delay time $\Delta t_{di}$ corresponding to a time interval from starting of single rotation of said rotator to reading of said image signal every said signal every said single rotation of said rotator on the basis of the following relational expression:

$$\Delta t_{di} = D_r - \Delta t \times (i-1)$$

where symbol i represents i-th rotation of said rotator on the assumption that single rotation of said rotator serving as reference rotation is the first rotation, and said (h-1) step comprises:

(h-1-1) a step of generating a clock signal being delayed from starting of single rotation of said rotator by said delay time $\Delta t_{di}$ every said single rotation, and (h-1-2) a step of reading said image signal from said memory unit in synchronization with said clock signal and applying the same to said light emitting elements every single rotation of said rotator.

26. An image recording method in accordance with claim 25, wherein said (e) step further comprises:

(e-3) a step of electrically calculating a cycle $t_{CLX}$ being provided by the following relational expression:

$$t_{CLK} = T - \cos\theta / (2\pi R - M)$$

on the basis of said first to third input signals and said first control signal and generating a third control signal representing said cycle $t_{CLK}$, and said (h-1-1) step comprises:

(h-1-1A) a step of generating a reference clock signal being synchronous with rotation of said rotator and having said cycle $t_{CLK}$ on the basis of said third control signal, and (h-1-1B) a step of delaying said reference clock signal by said delay time $\Delta t_{di}$ for generating said clock signal every rotation of said rotator.

27. An image recording method in accordance with claim 26, wherein said step (d) step comprises:

(d-1) a step of electrically deciding said magnification value so that a center-to-center distance d between said exposure pixels being imaged on said photosensitive material is provided by a relational expression d=1/M with respect to said resolution M.

28. An image recording method in accordance with claim 26, wherein said (d) step comprises:

(d-1) a step of electrically deciding said magnification value so that a center-to-center distance d between said exposure pixels being imaged on said photosensitive material is provided by a relational expression d=2/M with respect to said resolution M.

29. An image recording method in accordance with claim 19, further comprises the step of rotating said light emitting unit about an axis being parallel to an optical axis of said imaging unit in response to an applied signal by said arrangement direction control unit, and said (f) step comprises:

(f-1) a step of outputting said first control signal to said arrangement direction control unit as said applied signal, and (f-2) a step of rotating said light emitting unit about said axis being parallel to said optical axis of said imaging unit at said inclination angle by said arrangement direction control unit.

30. An image recording method in accordance with claim 19, further including a step of arranging a reflecting surface of said arrangement direction control unit between said imaging unit and said light emitting unit on an optical axis of said imaging unit and rotatable about an axis being parallel to said optical axis of said imaging unit in response to an applied signal for reflecting said plurality of light beams as being incident to a direction of said imaging unit, and said (f) step comprises:

(f-1) a step of generating said applied signal providing an angle being half said inclination angle on the basis of said first control signal, and (f-2) a step of outputting said applied signal to said arrangement direction control unit for rotating said reflecting surface at said angle being half said inclination angle, thereby rotating said plurality of light beams being reflected by said reflecting surface about said axis being parallel to said optical axis of said imaging unit at said inclination angle.

* * * * *